US007748606B2

(12) United States Patent
Mikolajczyk et al.

(10) Patent No.: US 7,748,606 B2
(45) Date of Patent: Jul. 6, 2010

(54) CLUSTER BOX MAIL DELIVERY UNIT HAVING SECURITY FEATURES

(75) Inventors: Ryszard K. Mikolajczyk, Chicago, IL (US); Taurris D. Baskerville, Schaumburg, IL (US)

(73) Assignee: United States Postal Service, Washington, DC (US)

( * ) Notice: Subject to any disclaimer, the term of this patent is extended or adjusted under 35 U.S.C. 154(b) by 769 days.

(21) Appl. No.: 11/168,302

(22) Filed: Jun. 29, 2005

(65) Prior Publication Data

US 2006/0151588 A1 Jul. 13, 2006

Related U.S. Application Data

(60) Provisional application No. 60/583,419, filed on Jun. 29, 2004.

(51) Int. Cl.
*B65G 11/04* (2006.01)

(52) U.S. Cl. ............................ 232/45; 232/25; 49/367; 70/416

(58) Field of Classification Search .................. 232/24, 232/25, 45; 16/355, 356; 312/292, 324; 49/367, 369; 70/416–418; 292/300, 346
See application file for complete search history.

(56) References Cited

U.S. PATENT DOCUMENTS

| | | | | |
|---|---|---|---|---|
| 843,200 | A | | 2/1907 | Fessler |
| 894,754 | A | * | 7/1908 | Snaman ......................... 49/33 |
| 1,823,514 | A | * | 9/1931 | Shrauger ..................... 160/26 |
| 1,932,468 | A | | 10/1933 | Knell |
| 2,097,504 | A | | 11/1937 | Wells |
| 2,518,141 | A | | 8/1950 | Hiler |

(Continued)

FOREIGN PATENT DOCUMENTS

| | | | |
|---|---|---|---|
| WO | 2006/004712 | A2 | 1/2006 |

(Continued)

OTHER PUBLICATIONS

U.S. Appl. No. 11/168,471, filed Jun. 29, 2005, Inventors: Ryszard K. Mikolajczky et al. (112 pages).

(Continued)

*Primary Examiner*—William L. Miller
(74) *Attorney, Agent, or Firm*—Lewis and Roca LLP

(57) ABSTRACT

An apparatus and method for enhancing the security of a cluster box unit which includes a protective enclosure, internal cabinetry, door, hinge and locking system. The cluster box unit may also include outgoing mail compartment doors that are heavily constructed and rigidly reinforced, with the locks carried thereon protectively shielded, and with the extensible bolts of these locks being engaged by brackets that not only lock the outgoing mail compartment doors but also the master loading doors of the cluster box units. The cluster box unit may also include master loading doors are provided with hinges that extend the full height of the doors—hinges that are defined by pivotally interfitting elements of extrusions that very sturdily mount the master loading doors, that prevent prying or bending the doors in the vicinities of their hinges. The interfitting elements of the hinge extrusions also permit the doors to be installed on their surrounding door frames quickly and easily, and permit one or both of the master loading doors to be quickly and easily removed for service or replacement when necessary.

9 Claims, 49 Drawing Sheets

U.S. PATENT DOCUMENTS

| | | | | |
|---|---|---|---|---|
| 2,803,512 | A | 8/1957 | Band | |
| 2,852,926 | A | 9/1958 | Chervenka | |
| 3,296,842 | A | 1/1967 | Auerbach et al. | |
| 3,696,463 | A * | 10/1972 | Watson | 16/356 |
| 3,722,236 | A | 3/1973 | Zelenko | |
| 4,500,122 | A | 2/1985 | Douglas | |
| 4,865,248 | A | 9/1989 | Barth | |
| 5,542,720 | A | 8/1996 | Fleming | |
| 5,794,844 | A | 8/1998 | Jenkins | |
| 6,247,641 | B1 | 6/2001 | Noblet et al. | |
| 6,681,604 | B1 | 1/2004 | Samsel | |
| 6,817,637 | B1 | 11/2004 | Anderson | |
| D536,155 | S | 1/2007 | Mikolajczyk et al. | |
| 7,178,716 | B2 | 2/2007 | Yong | |
| D543,335 | S | 5/2007 | Mikolajczyk et al. | |
| D547,025 | S | 7/2007 | Mikolajczyk et al. | |
| D549,424 | S | 8/2007 | Mikolajczyk et al. | |
| 7,318,632 | B2 | 1/2008 | Bidinger et al. | |
| 2002/0056296 | A1 | 5/2002 | Weinerman et al. | |
| 2006/0101874 | A1 | 5/2006 | Mikolajczyk et al. | |
| 2008/0223091 | A1 | 9/2008 | Kroening et al. | |
| 2009/0145956 | A1 | 6/2009 | Mikolajczyk et al. | |

FOREIGN PATENT DOCUMENTS

| | | | |
|---|---|---|---|
| WO | 2006/004712 | A3 | 1/2006 |
| WO | 2006/004713 | A2 | 1/2006 |
| WO | 2006/004713 | A3 | 1/2006 |

OTHER PUBLICATIONS

PCT Search Report and Written Opinion for Int'l Appln. No. PCT/US05/22857, mailed Dec. 21, 2005 (9 pages).

PCT Search Report and Written Opinion for Int'l Appln. No. PCT/US05/22856, mailed Oct. 12, 2007 (11 pages).

* cited by examiner

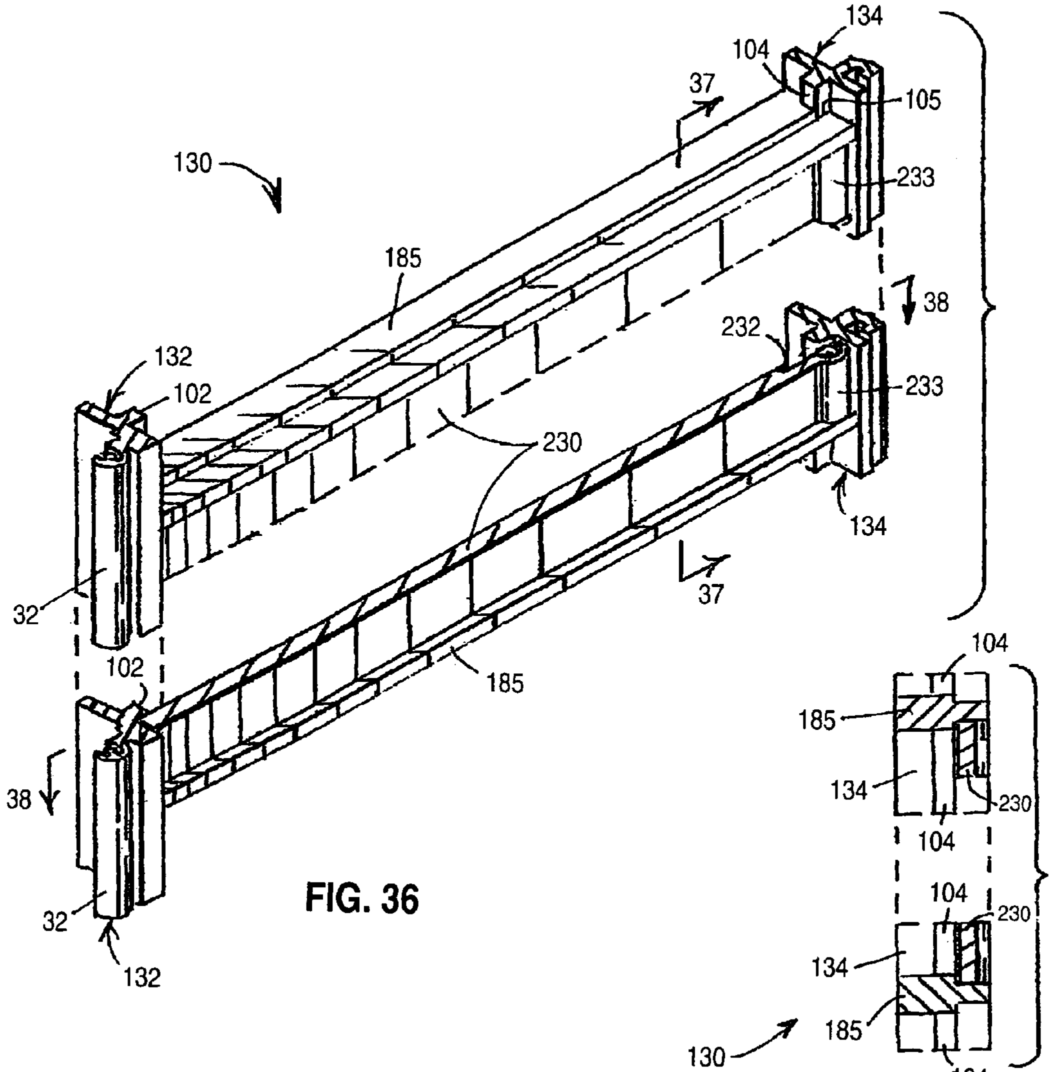
FIG. 36
FIG. 37
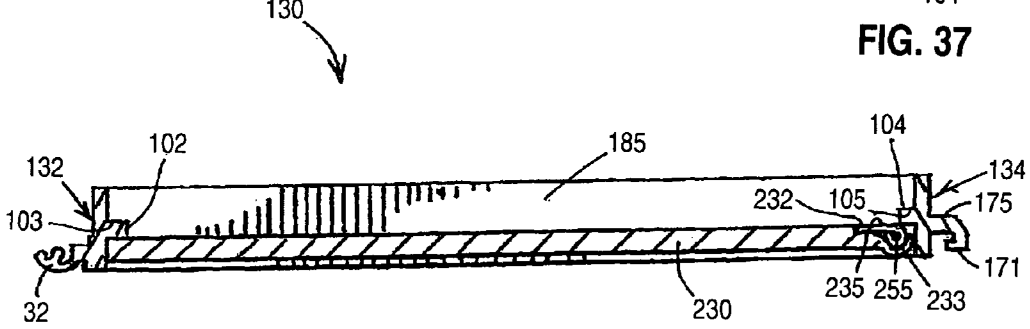
FIG. 38

CLUSTER BOX MAIL DELIVERY UNIT HAVING SECURITY FEATURES

PRIORITY

This application makes reference to and claims priority to provisional application 60/583,419, entitled, CLUSTER BOX MAIL DELIVERY RECEPTACLES, filed Jun. 29, 2004, the disclosure of which is incorporated herein by reference in its entirety.

FIELD OF THE INVENTION

The present invention relates generally to mail and parcel delivery receptacles of the general type referred to by the U.S. Postal Service (USPS) as "cluster box units." More particularly, a cluster box unit, or "CBU" as it often is called, typically takes the form of a free-standing structure having a protective outer cabinet or enclosure, the interior of which can be accessed by USPS personnel by unlocking and opening one or a pair of so-called "master loading doors" that define a majority of the front face of a CBU.

BACKGROUND OF THE INVENTION

In a cluster box unit of the type having a left master loading door (LMLD) and a right master loading door (RMLD), the left side of the left master loading door usually is coupled by a left hinge to the left side of the enclosure of the CBU, and the right side of the right master loading door usually is coupled by a right hinge to the right side of the enclosure of the CBU. When the LMLD and RMLD are unlocked and pivoted to their fully open positions, substantially unobstructed access is provided to the interior of the CBU so that USPS personnel can insert mail and parcels into delivered mail and delivered parcel compartments arranged in left and right "stacks." When the master loading doors are pivoted to their closed positions and locked, access to individual ones of the delivered mail and parcel compartments is gained by unlocking individual mail and parcel compartment doors that comprise door-within-a-door elements of the master loading doors.

Stated in another way, each delivered mail compartment and each delivered parcel compartment has its own, individual door, and these individual doors are elements of the left and right master loading doors—elements that normally are locked in closed positions so they pivot together with other elements of the master loading doors between closed and open positions of the master loading doors. Access to individual delivered mail compartments can be had by the customers, tenants or so-called "postal patrons" to whom the delivered mail compartments have been assigned when the postal patrons insert and turn individually assigned keys (that have been provided to them by the USPS or by managerial staff of apartment complexes, condominiums and the like) into locks found on the doors of delivered mail compartments so the doors can be opened to permit removal of compartment contents, thereafter the doors are closed and relocked, and the keys thereto removed by the postal patrons. A postal patron opens one of the delivered parcel compartments only when he or she finds a key to a delivered parcel compartment in his or her delivered mail compartment—a key that has been placed in the delivered mail compartment of the postal patron by a USPS delivery person who has inserted into a delivered parcel compartment one or more parcels (that will not fit in the patron's delivered mail compartment)—a key that can be used to open (on a onetime basis) the parcel compartment where the patron's parcel or parcels are waiting to be retrieved.

Within the interior of a CBU of the type having left and right master loading doors, are left and right shelved cabinet assemblies that define the left and right stacks of mail and parcel compartments, respectively. The left stack of compartments is separated from the right stack of compartments by a vertically extending central structure which prevents items from the left compartments from being mixed with items from the right compartments, and vice versa. Latch and lock components for retaining the left and right master loading doors closed and locked often are connected to the central structure which couples the left and right shelved cabinet assemblies that define the left and right stacks of delivered mail and delivered parcel compartments.

The interior of a cluster box unit also usually has a compartment for temporarily holding "outgoing mail," namely mail that is to be collected and processed by USPS personnel for delivery to other addresses and locations. Postal patrons who have outgoing mail to be collected and processed by the USPS may insert their outgoing mail into the outgoing mail compartment through a slot (that usually is protected by a louver) formed through one of the master loading doors, often the right master loading door.

A variety of locking systems and lock components have been proposed for retaining the master loading doors of a CBU closed and locked against unauthorized access (i.e., the master loading doors are only to be opened by authorized USPS personnel), and for retaining in closed and locked positions the individual door-within-a-door closures that provide individual access to the various delivered mail, delivered parcel and outgoing mail compartments of the CBU. Some CBU proposals employ outgoing mail compartment doors that are especially sturdy and resistant to attack, and that are held closed by a lock mechanism installed thereon by USPS personnel that can be unlocked by one of a group of restricted access USPS keys. These "hardened" outgoing mail compartment doors (sometimes referred to as "delivery doors" or as "collection doors"), when unlocked and opened, not only permit outgoing mail to be removed from the associated outgoing mail compartment but also permit the latches of the master loading doors to be released so the master loading doors can be opened to enable USPS personnel to insert mail and parcels into the delivered mail and delivered parcel compartments.

When a parcel is inserted into one of the delivered parcel compartments, the USPS delivery person locks the associated parcel door and inserts the key of the parcel door into the delivered mail compartment of the postal patron to whom the parcel is addressed. When the postal patron finds a parcel door key in his or her delivered mail compartment, he or she uses the key to open the associated parcel compartment and retrieves the parcel. When a parcel door key is turned to unlock the door of a parcel compartment, the lock mechanism of the parcel door "traps" or retains the key and prevents the tenant from relocking the parcel door, which can only be locked by USPS personnel. Key retaining lock mechanisms designed for use with delivered parcel lockers in the manner just described are known.

Although a number of cluster box unit proposals have been approved by the USPS and have functioned satisfactorily where installed to serve the mail and parcel delivery needs of a wide variety of multi-unit dwelling facilities, a need nonetheless remains for cluster box units designed to provide improved and enhanced security, corrosion resistance and longevity of service—cluster box units that are stronger and more resistant to unauthorized entry while, at the same time, being formed from reasonably priced, relatively easy to assemble components that can be serviced, maintained and replaced with a minimum of down time when damaged due to normal wear and tear, accident, vandalism or attack are needed. In these and other factors that merit consideration during product design, prior art proposals have left room for improvement.

The present invention addresses these and other needs and objectives as will become apparent from the disclosure that follows.

It is accordingly a primary aspect of the invention to provide a cluster box units which incorporates a wide variety of features that enhance security and attack resistance while utilizing components that can be assembled quickly and easily, and that can be serviced as needed in order to keep the unit functioning properly throughout its service life that last many years. Included among the many features disclosed herein are protective enclosure improvements, internal cabinetry improvements, door, hinge and locking system improvements, and a host of other features that are not found in present day cluster box units—features that are intended to provide units that function smoothly throughout lengthy service lives, that resist corrosion, offer good appearances, and that shield mail and parcels from inclement weather and from unauthorized access or attack.

The cluster box unit provides outgoing mail compartment doors that are heavily constructed and rigidly reinforced, with the locks carried thereon protectively shielded, and with the extensible bolts of these locks being engaged by brackets that not only lock the outgoing mail compartment doors but also the master loading doors of the cluster box units.

Master loading doors are provided with hinges that extend the full height of the doors—hinges that are defined by pivotally interfitting elements of extrusions that very sturdily mount the master loading doors, that prevent prying or bending the doors in the vicinities of their hinges. The interfitting elements of the hinge extrusions also permit the doors to be installed on their surrounding door frames quickly and easily, and permit one or both of the master loading doors to be quickly and easily removed for service or replacement when necessary.

SUMMARY OF THE INVENTION

The foregoing needs have been satisfied to a great extent by the present invention wherein, in one aspect an apparatus and method is provided that incorporates a protective enclosure, internal cabinetry, door, hinge and locking system, and a host of other features that are not found in present day cluster box units—features that are intended to provide units that function smoothly throughout lengthy service lives, that resist corrosion, offer good appearances, and that shield mail and parcels from inclement weather and from unauthorized access or attack.

Another aspect of the invention provides outgoing mail compartment doors that are heavily constructed and rigidly reinforced, with the locks carried thereon protectively shielded, and with the extensible bolts of these locks being engaged by brackets that not only lock the outgoing mail compartment doors but also the master loading doors of the cluster box units.

Yet another aspect of the invention provides master loading doors having hinges that extend the full height of the doors—hinges that are defined by pivotally interfitting elements of extrusions that very sturdily mount the master loading doors, that prevent prying or bending the doors in the vicinities of their hinges. The interfitting elements of the hinge extrusions also permit the doors to be installed on their surrounding door frames quickly and easily, and permit one or both of the master loading doors to be quickly and easily removed for service or replacement when necessary.

In accordance with the invention, one aspect of the invention provides a cluster box mail delivery unit comprising an enclosure comprising two sidewalls, a top wall, a bottom wall, a front face, and a back face; at least two door assemblies on the front face of the enclosure, wherein each door assembly comprises a first inner edge and a first outer edge; at least one compartment door within each door assembly configured to pivot relative to the door assembly; and at least one fastening member formed along the first inner edge of each door assembly for securing the at least two door assemblies in a closed position, wherein each door assembly pivots relative to the enclosure along the first outer edge of each door assembly, each fastening member further comprising an upright portion, an extending portion, and a hook portion, each upright portion further comprising a second inner edge and a second outer edge, and each hook portion protruding outward from the second inner edge of the upright portion and engaging with an opposing hook portion, forming a gap between at least one second inner edge of the upright portion and the engaged hook portions.

Another aspect of the invention provides a fastening apparatus for securing at least two door assemblies of a cluster box mail delivery unit comprising an upright portion; an extending portion; and a hook portion; wherein the upright portion comprises an inner edge and an outer edge; and wherein each hook portion protrudes outward from the inner edge of the upright portion and engages with an opposing hook portion, forming a gap between at least one inner edge of the upright portion and the engaged hook portions.

Yet another aspect of the invention provides a door with a rugged door hinge for pivotally mounting the door in a cluster box mail delivery unit, comprising an interfitting upright extrusion mounted on a door frame, wherein the extrusion has a complexly curved groove; a curved formation located on the door upright and extending into said complexly curved groove of the frame extrusion, and an elongated hinge rod extending through the full longitudinal length of the door, wherein the hinge further extends over the full longitudinal length of the door.

Yet still another aspect of the invention provides a master loading door of a cluster box mail delivery unit having a hinge pivotally mounting the door, comprising an interfitting upright extrusion on the door frame wherein the upright extrusion has a complexly curved groove; a curved formation of the door upright and extending into the curved groove of the upright extrusion; and an elongated hinge rod extending through the full longitudinal height of the door, wherein the hinge further extends over the full longitudinal length of the door.

Additional aspects and advantages of the invention will be set forth in part in the description which follows, and in part will be obvious from the description, or may be learned by practice of the invention. The aspects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 36 is an exploded perspective view showing selected portions of the frame assembly of the left master loading door together with portions of the second form of compartment door in closed position in a forwardly facing recess defined by elements of the frame assembly.

FIG. 37 is a cross-sectional view taken along line 37-37 of FIG. 36.

FIG. 38 is a cross-sectional view taken along line 38-38 of FIG. 36.

DETAILED DESCRIPTION OF THE INVENTION

Figure 1:
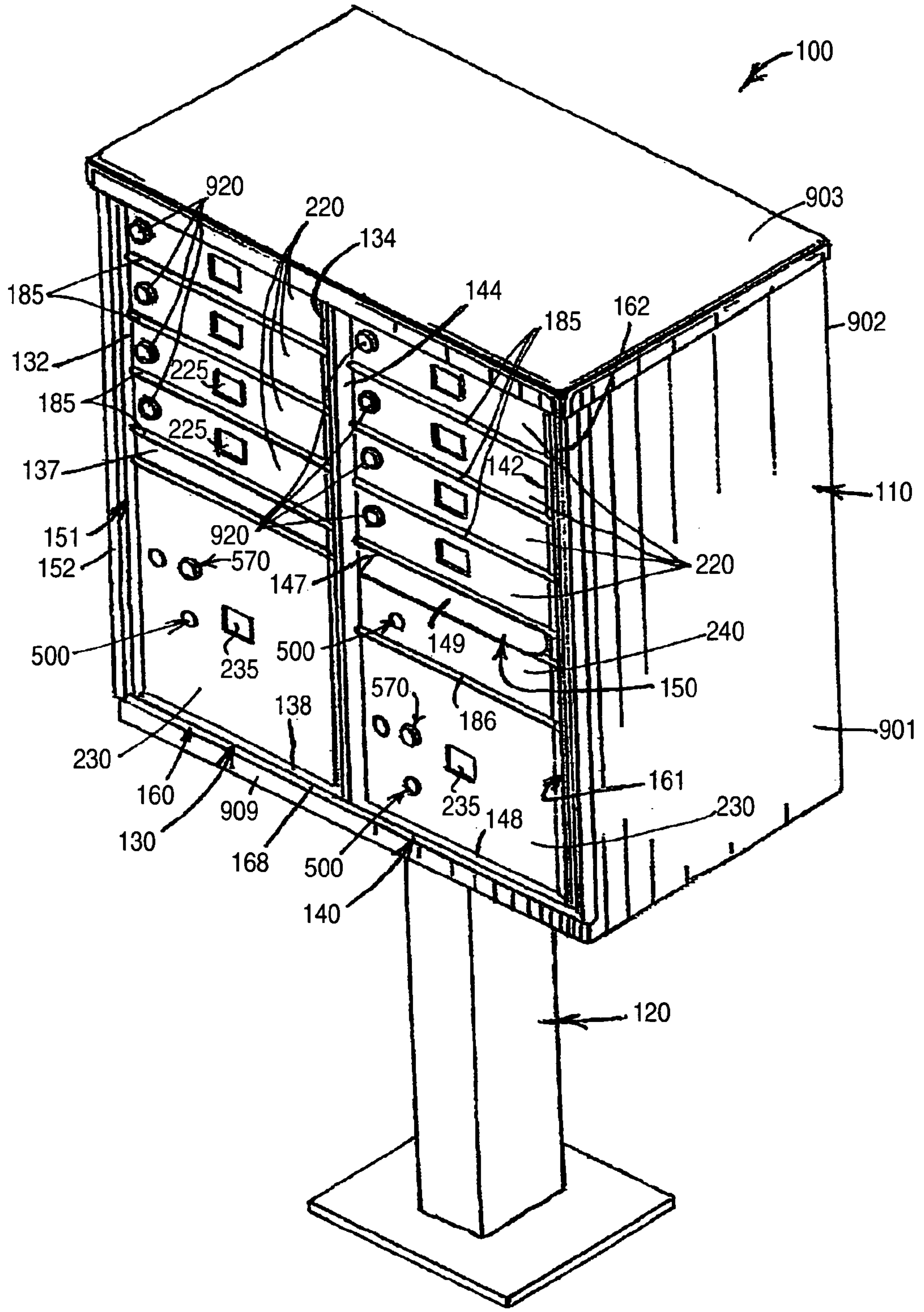
FIG. 1 is a perspective view showing front, top and right side portions of one form of cluster box unit (CBU) mail delivery receptacle.

Embodiments of the invention provide an apparatus and method which incorporates a protective enclosure, internal cabinetry, door, hinge and locking system. Reference will now be made in detail to the present embodiments of the invention, examples of which are illustrated in the accompanying drawings. Wherever possible, the same reference numbers will be used throughout the drawings to refer to the same or like parts.

Four types of multiple-box mail delivery receptacles are depicted in sequence in FIGS. 1, 3, 5 and 7. These multiple box receptacles, referred to in the art as "cluster box units" or individually as a "CBU," are indicated generally by the numerals 100, 1100, 2100, 3100. The CBU mail delivery receptacles 100, 1100, 2100, 3100 have generally rectangular protective outer cabinets 110, 1110, 2110, 3110 that are supported atop pedestal type stands 120, 1120, 2120, 3120. In FIGS. 2, 4, 6 and 8, the cluster box units 100, 1100, 2100, 3100 are depicted without their stands.

Because the four cluster box unit mail delivery receptacles 100, 1100, 2100, 3100 are assembled from components that are quite similar (i.e., components that tend to differ only in size if the components are not precisely identical), the construction and operation of all four of these cluster box units will be apparent from the description that follows even though, in some instances, the description concentrates principally on features of a selected one of the cluster box units, namely the unit 100.

In the drawings and in the description that follows, "corresponding reference numerals" (i.e., reference numerals that differ by magnitudes of one, two or three thousand) are used to designate components of the cluster box units 100, 1100, 2100, 3100 that correspond in function—many of which components differ only slightly in dimension unless they are, in fact, completely identical. Utilizing in the drawings reference numerals that correspond to designate components that correspond in function, permits corresponding components to be identified so their corresponding functions will be understood without requiring that the text include repetitive descriptions. Thus, unless explained to the contrary, if the reference numeral 101 is used to designate a component of the cluster box unit 100, the reader should understand that usages of the corresponding numerals 1101, 2101, 3101 (where found in the drawings) designate components of the cluster box units 1100, 2100, 3100 that correspond in function to the component 101 of the cluster box unit 100; and, unless explained to the contrary, if the reference numerals 102 is used to designate a component of the cluster box unit 100, the reader should understand that usages of the corresponding numerals 1102, 2102, 3102 (where found in the drawings) designate components of the cluster box units 1100, 2100, 3100 that correspond in function to the component 102 of the cluster box unit 100; and so on, for other so-called "corresponding" reference numerals found in the drawings that differ by magnitudes of one, two or three thousand.

Figure 2:
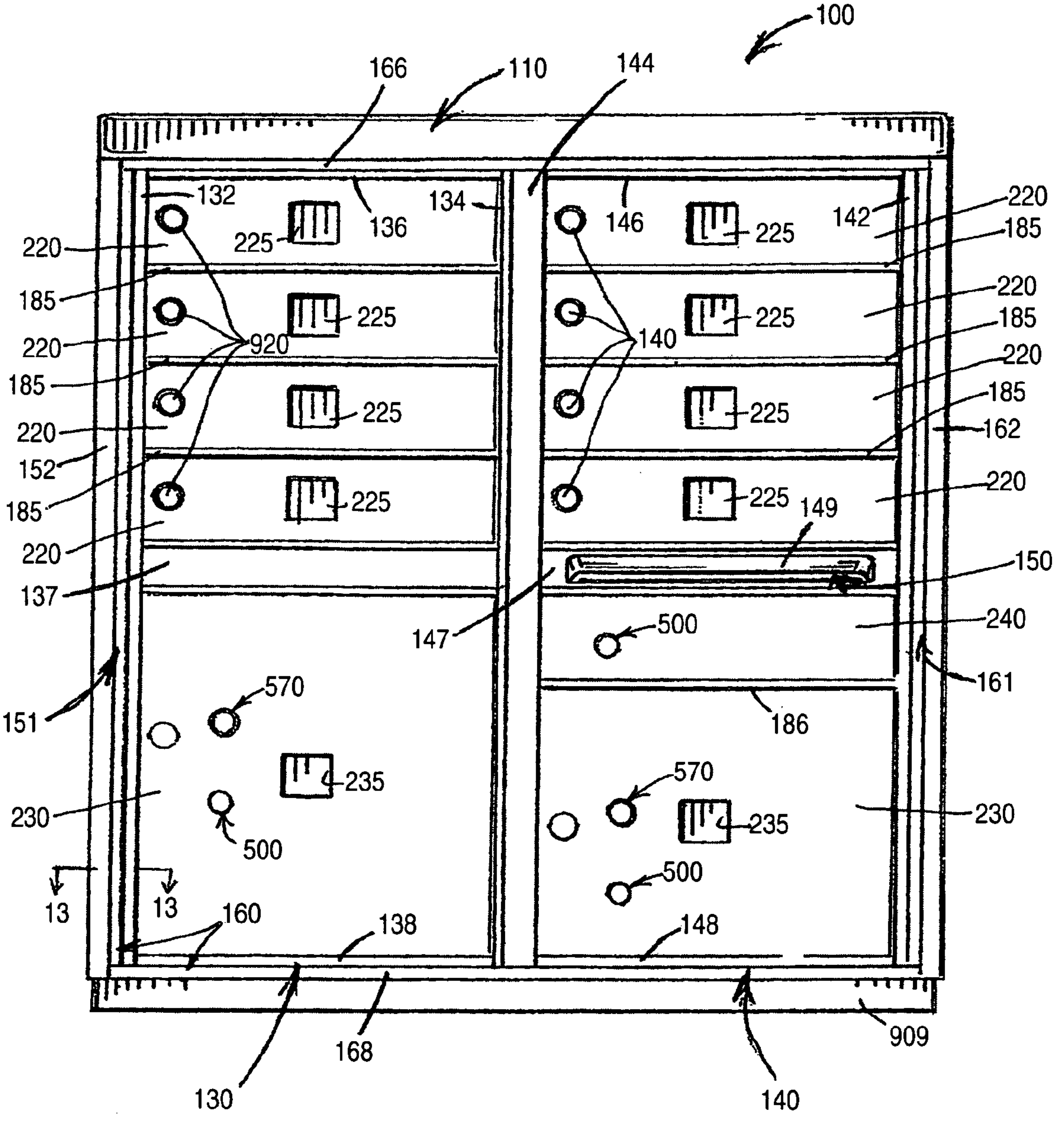
FIG. 2 is a front elevational view of FIG. 1 without the support pedestal.
Figure 3:
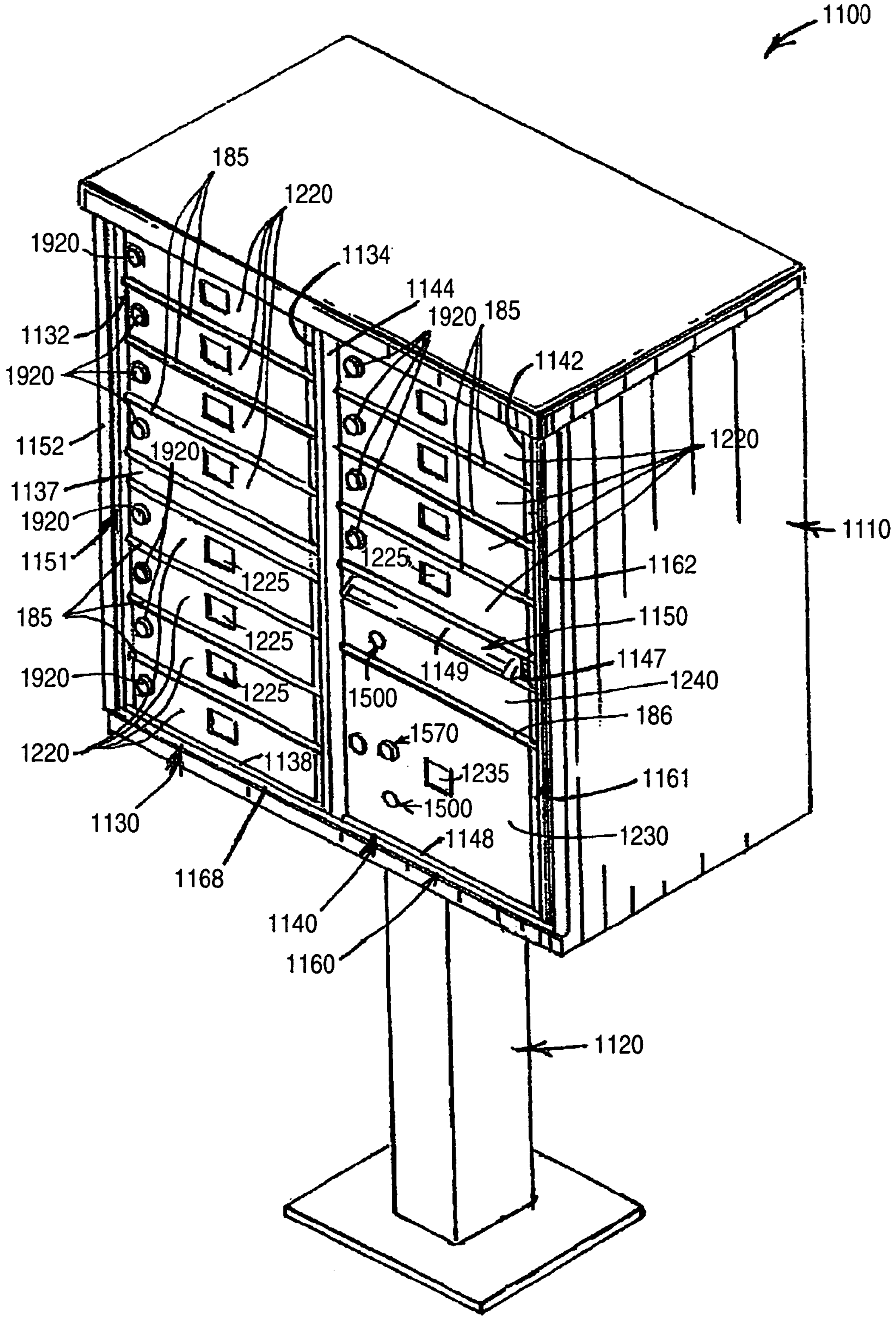
FIG. 3 is a perspective view showing front, top and right side portions of a second embodiment of cluster box unit mail delivery receptacle.
Figure 4:
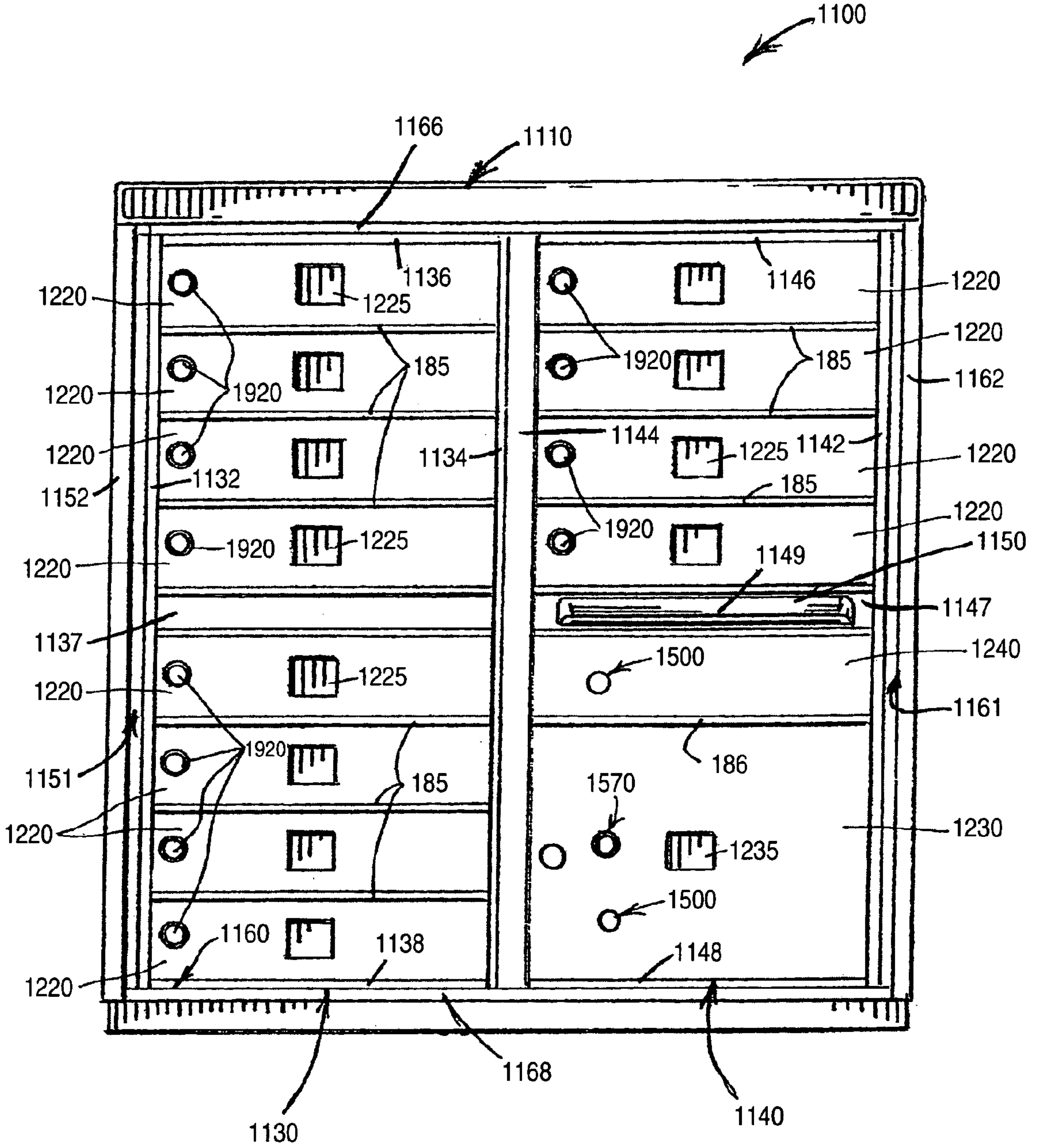
FIG. 4 is a front elevational view of FIG. 3 without the support pedestal.
Figure 5:
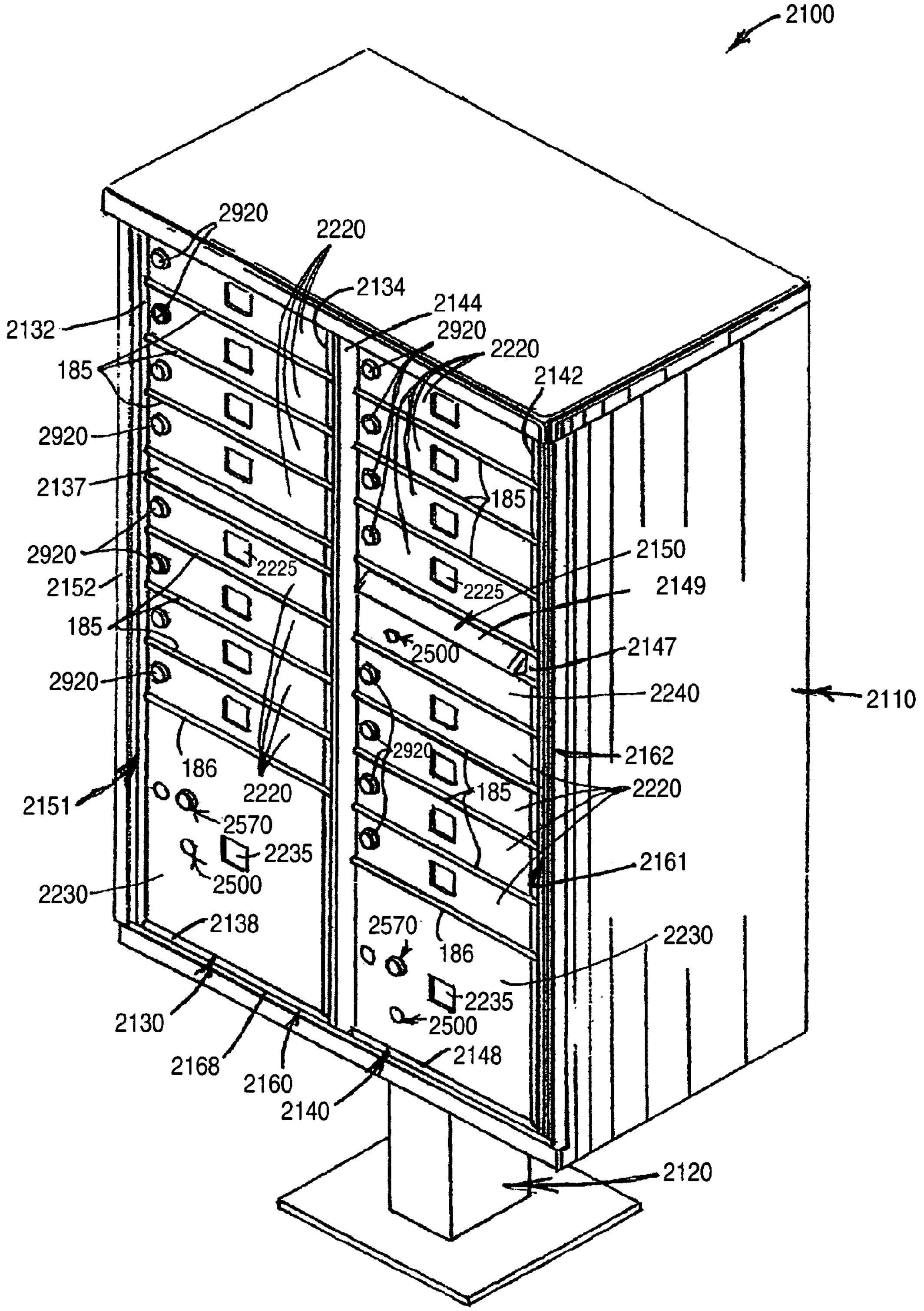
FIG. 5 is a perspective view showing front, top and right side portions of a third embodiment of cluster box unit mail delivery receptacle.
Figure 6:
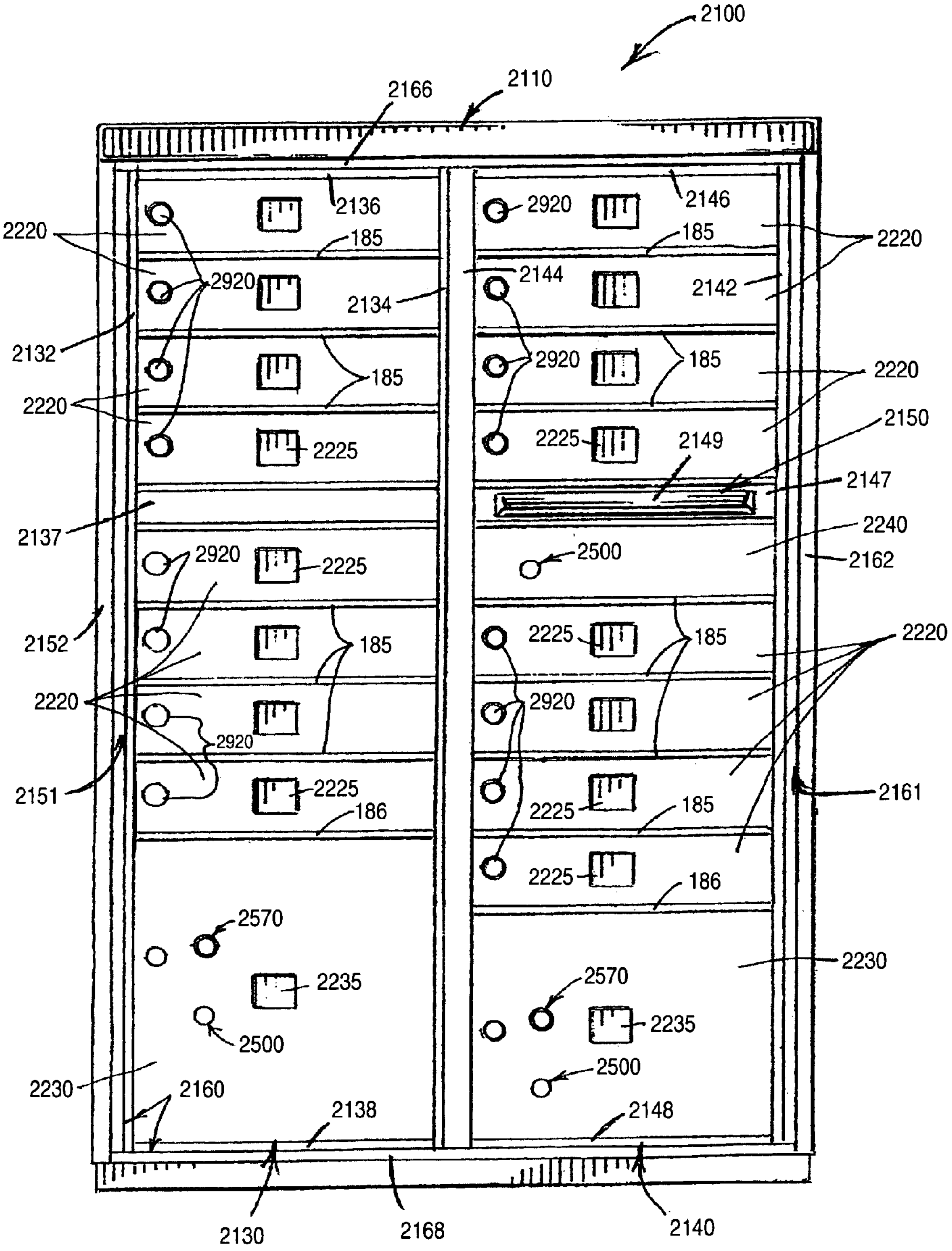
FIG. 6 is a front elevational view of FIG. 5 without the support pedestal.
Figure 7:
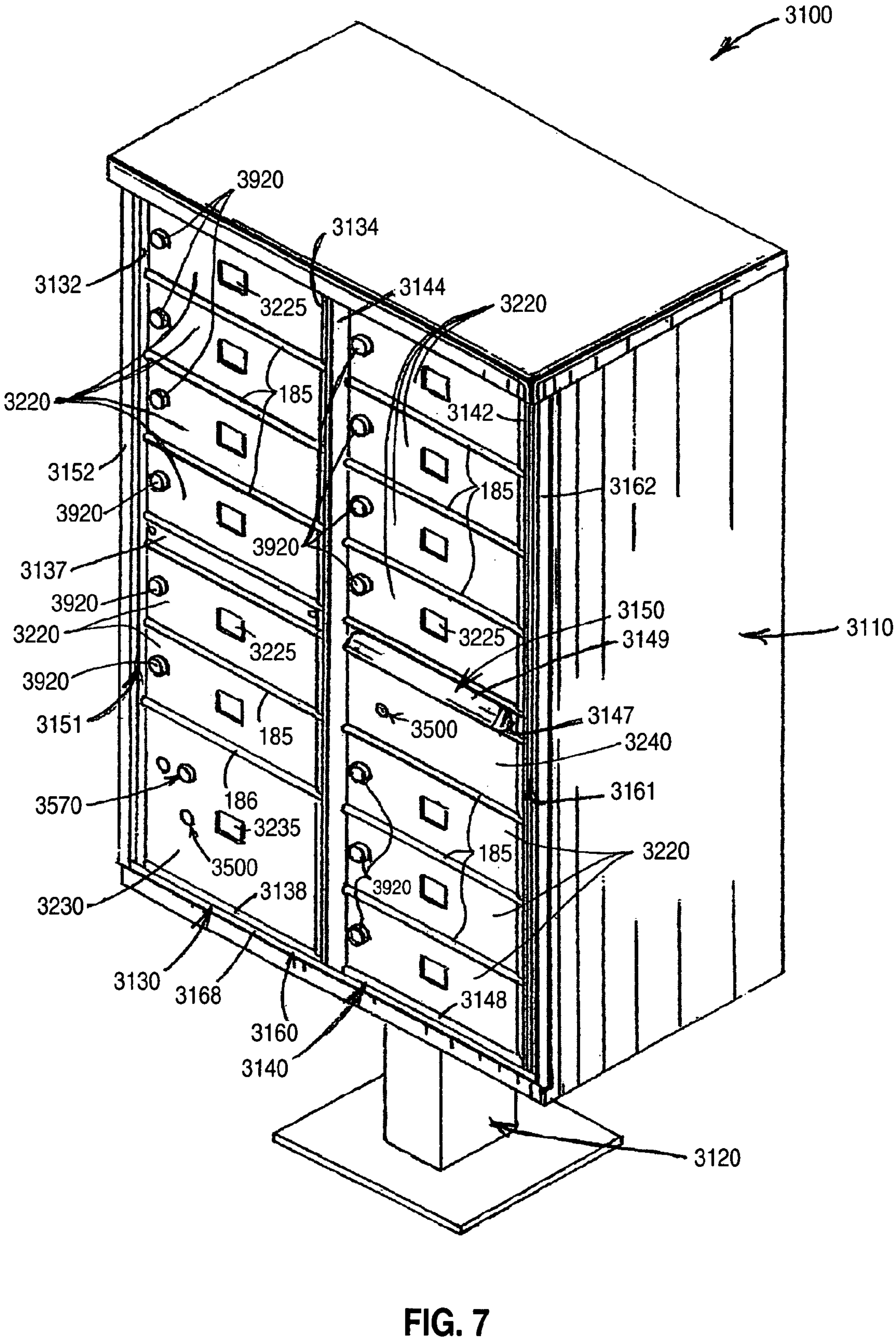
FIG. 7 is a perspective view showing front, top and right side portions of a fourth embodiment of cluster box unit mail delivery receptacle.
Figure 8:
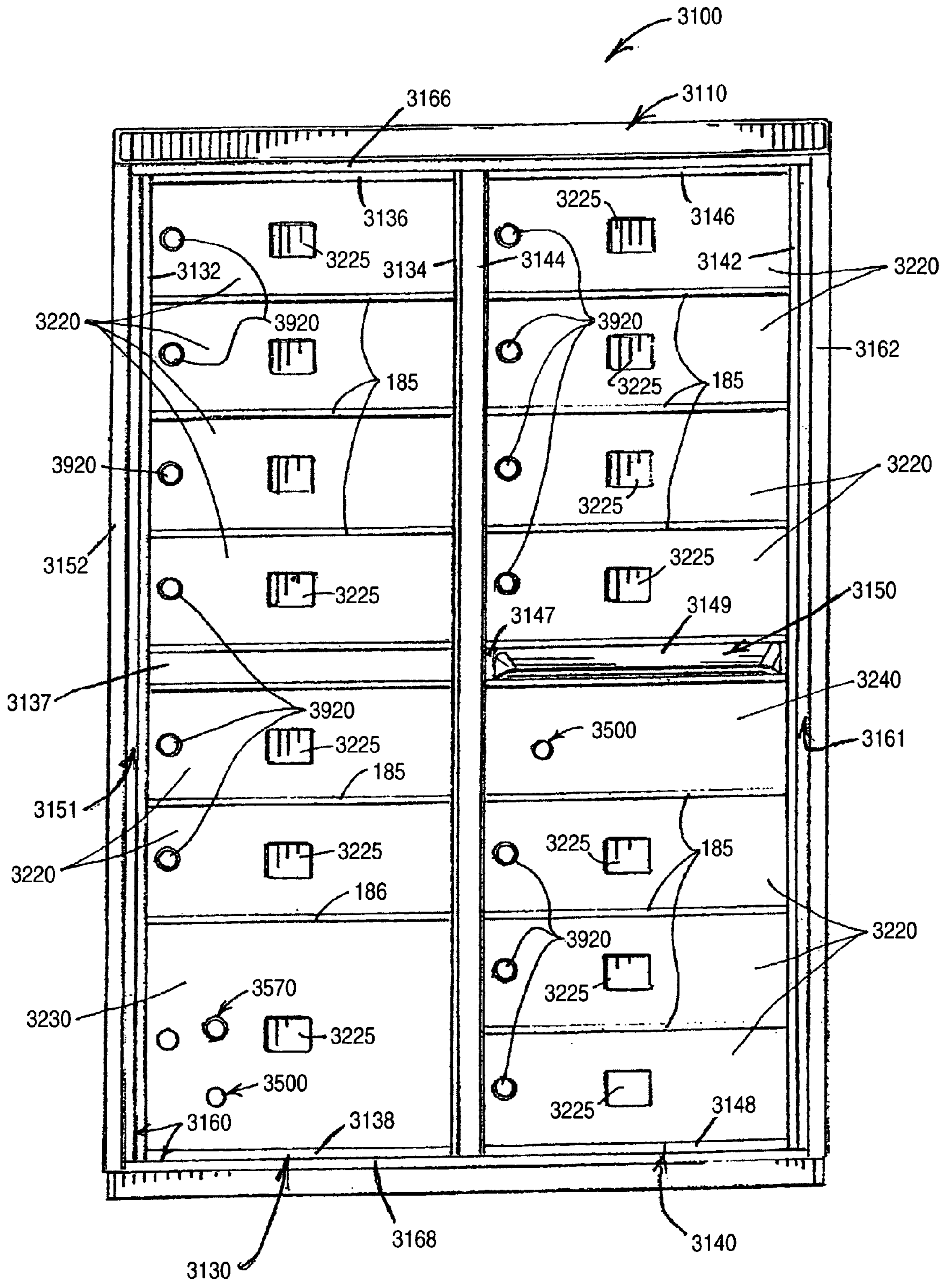
FIG. 8 is a front elevational view of FIG. 7 without the support pedestal.

Referring variously to FIGS. 1-8 (an expression that will be understood by the reader to mean that some views, such as FIGS. 1-2, should be referred to insofar as features of the CBU 100 are concerned; that other views, such as FIGS. 3-4, should be referred to insofar as features of the CBU 1100 are concerned; that other views, such as FIGS. 5-6, should be referred to insofar as features of the CBU 2100 are concerned; and, that still other views, such as FIGS. 7-8, should be referred to insofar as features of the CBU 3100 are concerned), the cabinets 110, 1110, 2110, 3110 have left front door assemblies 130, 1130, 2130, 3130 and right front door assemblies 140, 1140, 2140, 3140. U.S. Postal Service (USPS) personnel commonly refer to the left front door assemblies 130, 1130, 2130, 3130 as "left master loading doors," and to the right front door assemblies 140, 1140, 2140, 3140 as "right master loading doors."

Various optional features may be incorporated in the design of the protective outer enclosures 110, 1110, 2110, 3110 and/or in the design of other components of the cluster box units 100, 1100, 2100, 3100 such as the master loading doors 130, 140, 1130, 1140, 2130, 2140, 3130, 3140 to alter exterior and interior appearances of the CBUs 100, 1100, 2100, 3100 and their components. Likewise, various optional functional, utilitarian, structural and operational features also may be incorporated into the CBUs 100, 1100, 2100, 3100

The left master loading doors 130, 1130, 2130, 3130 are provided with hinges (indicated generally by the numerals 151, 1151, 2151, 3151) along their left sides, and the right master loading doors 140, 1140, 2140, 3140 are provided with hinges (indicated generally by the numerals 161, 1161, 2161, 3161) along their rights sides, so that master loading doors may be pivoted away from door closed positions depicted variously in FIGS. 1-8 to door open positions that provide unobstructed access to the interiors of the cabinets 110, 1110, 2110, 3110. For example, reference is made to FIG. 9 wherein the master loading doors 130, 140 of the cluster box unit 100 are shown pivoted to fully open positions that permit mail to be delivered into left and right mail compartments designated by numerals 131, 141, and so that parcels too large to fit into the mail delivery compartments 131, 141 can be delivered into left and right parcel compartments designated by numerals 133, 143.

Figure 9:
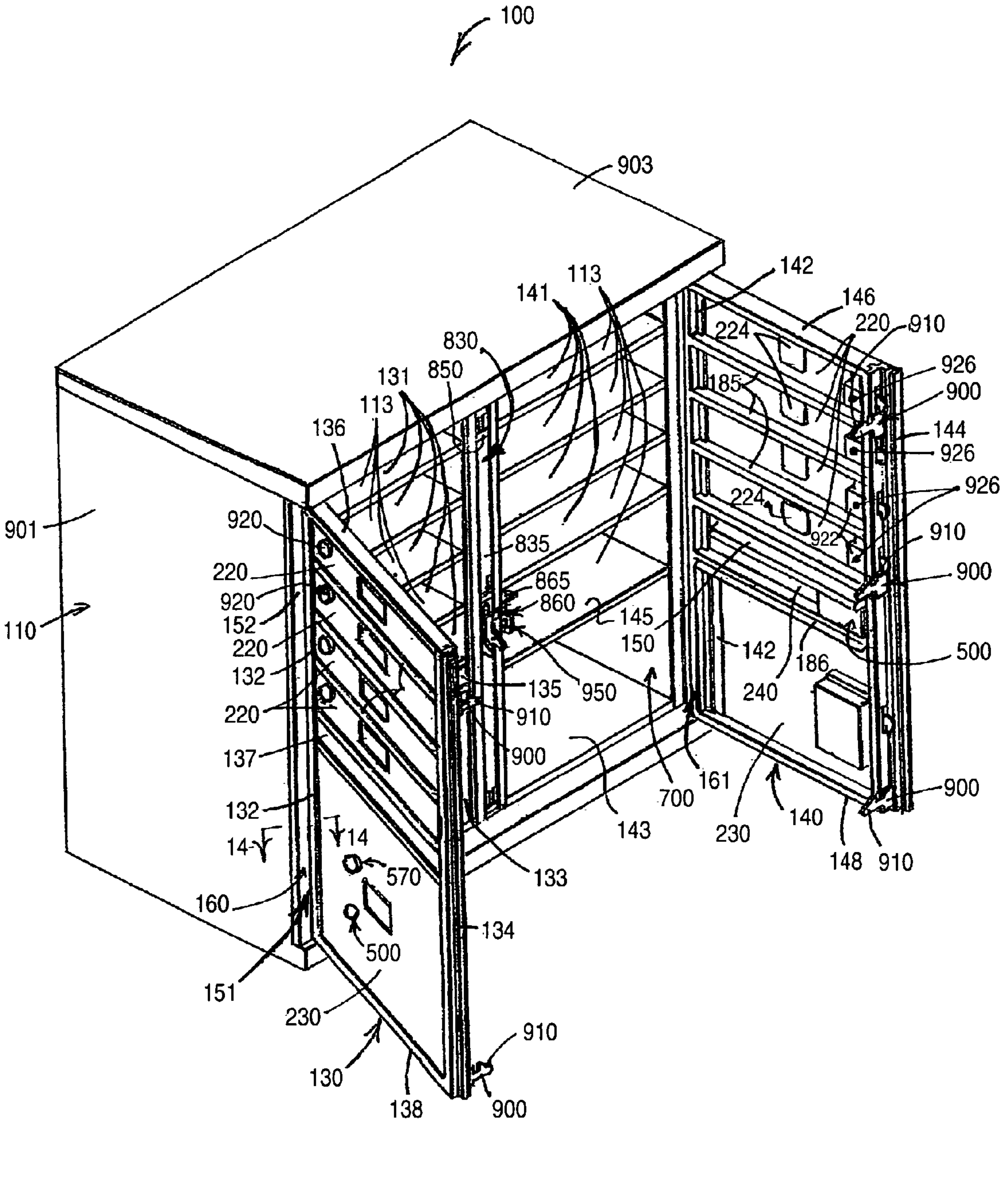
FIG. 9 is a perspective view of the CBU of FIGS. 1 and 2 with left and right master loading doors thereof in open positions, with door-within-a-door elements of the master loading doors locked closed so as to pivot with other elements of the master loading doors when the master loading doors move between their closed and open positions.

Referring still to FIG. 9, the interior of the CBU 100 also is provided with an outgoing mail compartment 145 at a location situated between an upper region of the right side of the interior of the CBU 100 where the right mail delivery compartments 141 are found, and a lower region of the right side of the interior of the CBU 100 where the right parcel delivery compartment 143 is found. So-called "outgoing mail," namely mail that is to be collected and processed by USPS personnel for delivery to other addresses and locations just as though it had been deposited in and collected from a conventional USPS mail collection box, can be inserted into the outgoing mail compartment 145 through a mail slot 129 (see FIGS. 11 and 12) of a louvered mail slot structure 150 that is defined by components of the right master loading door 140.

Figure 55:
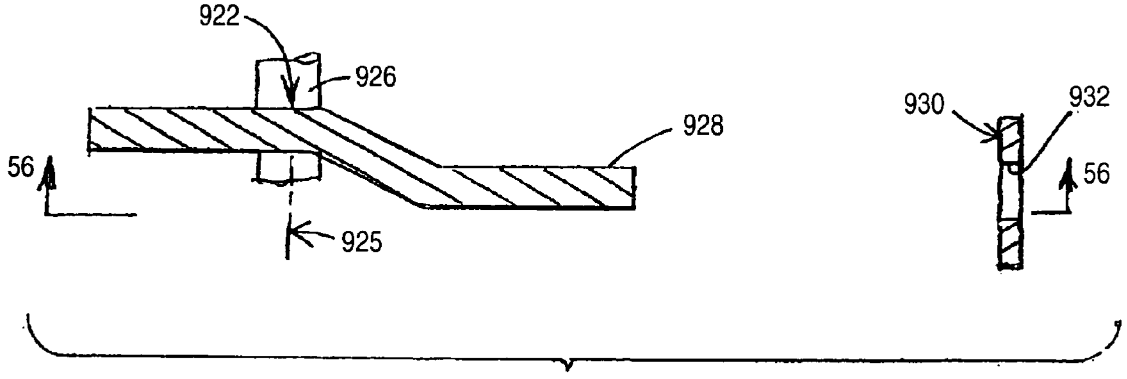
FIG. 55 is a cross-sectional view taken along line 55-55 of FIG. 54.

The left and right delivered mail compartments 131, 141 (depicted in FIG. 9) may be accessed by opening delivered mail compartment doors 220 when the master loading doors 130, 140 are closed and locked. The delivered mail compartment doors 220 have door-within-a-door relationships with the master loading doors 130, 140 (i.e., the doors 220 are elements of the master loading doors 130, 140—elements that can pivot relative to the frameworks of the master loading doors, such as the framework 180 depicted in FIG. 26). A discussion of features of the preferred form of construction for the doors 220 is provided later herein in conjunction with FIGS. 29-38 and 48-52. A discussion of locking systems for the doors 220 is provided later herein in conjunction with FIGS. 55-57.

The left and right delivered parcel compartments 133, 143 (depicted in FIG. 9) may be accessed by opening the delivered mail compartment doors 230 when the master loading doors 130, 140 are closed and locked. The delivered mail compartment doors 230 have door-within-a-door relationships with the master loading doors 130, 140 (i.e., the doors 230 are elements of the master loading doors 130, 140—elements that can pivot relative to the frameworks of the master loading doors, such as the framework 180 depicted in FIG. 26). A discussion of features of the preferred form of construction for the doors 230 is provided later herein in conjunction with FIGS. 33-38 and 58-62.

The outgoing mail compartment 145 (depicted in FIG. 9) may be accessed by opening an outgoing mail compartment door 240. The outgoing mail compartment door 240 has a door-within-a-door relationship with the right master loading door 140, and can pivot relative to the framework 180 of the right master loading door 140 (see FIG. 26). A discussion of features of the preferred form of construction for the door 240, and of a locking system preferably utilized to lock the door 240, is provided later herein in conjunction with FIGS. 67-72.

Again, referring to FIG. 9, located to the left of the outgoing mail compartment 145 and situated between an upper region of the left side of the interior of the CBU 100 where the left mail delivery compartments 131 are found and a lower region of the left side of the interior of the CBU 100 where the left parcel delivery compartment 133 is found, is a narrow spare compartment 135 that may be used by USPS personnel for a variety of purposes, for example to retain maintenance records pertaining to the CBU 100, or for other purposes such as storing spare mail and parcel door keys that may be needed as replacements for lost keys at some future time. The narrow spare compartment 135 provides a storage area that is secure from being accessed by those who make use of the left and right mail and parcel compartments 131, 141, 133, 143 because, when the left and right master loading doors 130, 140 are locked closed, the spare compartment 135 cannot be accessed from outside the CBU 100 through any of the openings formed through the master loading doors 130, 140.

Whereas the cluster box units 100, 2100 have both left and right delivered parcel compartments served by left and right parcel doors 130, 2130, respectively, the cluster box unit 1100 has only a right delivered parcel compartment served by a right parcel door 1130, and the cluster box unit 3100 has only a left delivered parcel compartment served by a left parcel door 3130. As those who are skilled in the art will readily understand, other cluster box unit configurations (employing delivered mail compartments and delivered parcel compartments that differ in size, number and location from those depicted in the drawings hereof) are possible—configurations that embody many of the inventive features hereof. For example, as a comparison of the cluster box units 100 and 1100 will illustrate, a plurality of delivered mail compartments can be substituted for one of the delivered parcel compartments, or vice versa; and, as a comparison of the cluster box units 2100, 3100 will illustrate, the sizes of delivered mail compartments and of other features of the cluster box units disclosed herein can differ while still employing many of the same inventive features.

A horizontally extending extrusion 137 (see FIGS. 1, 2 and 10) of the left master loading door 130 serves to cover the front of the spare compartment 135 when the left door 130 is closed. The extrusion 137 preferably is configured to provide an exterior appearance like that which is afforded by a corresponding horizontally extending extrusion 147 of the right master loading door 140—it being seen in FIGS. 11 and 12 that the right master loading door extrusion 147 has an elongate, slot-like opening formed therethrough, namely the opening of the slot structure 150 through which outgoing mail is inserted into the outgoing mail compartment 145. A hood element 149 depicted in FIGS. 1, 2 and 12, shields the slot 150 to prevent rain and snow from passing there-through.

Referring to FIGS. 1-8, it will be seen that the cluster box units 100, 1100, 2100, 3100 have substantially identical louvered slot structures 150, 1150, 2150, 3150 defined cooperatively by identical right master loading door extrusions 147, 1147, 2147, 3147 and identical hood elements 149, 1149, 2149, 3179. It should be noted that the features of and the appearance and construction of the louvered mail slot structures 150, 1150, 2150, 3150; of the identical extrusions 137, 147, 1137, 1147, 2137, 2147, 3137, 3147; and of the identical hood elements 149, 1149, 2149, 3149 are not limited to those shown in FIGS. 1-8.

Referring principally to FIGS. 2, 4, 6 and 8, the left master loading doors 130, 1130, 2130, 3130 have rectangular configurations bordered by left uprights 132, 1132, 2132, 3132; right uprights 134, 1134, 2134, 3134; top bars 136, 1136, 2136, 3136; and bottom bars 138, 1138, 2138, 3138. The right master loading doors 140, 1140, 2140, 3140 have rectangular configurations bordered by right uprights 142, 1142, 2142, 3142; left uprights 144, 1144, 2144, 3144; top bars 146, 1146, 2146, 3146; and bottom bars 148, 1148, 2148, 3148.

The left uprights 132, 1132, 2132, 3132 of the left master loading doors 130, 1130, 2130, 3130 preferably are defined by extrusions of identical cross-section that extend substantially the full heights of the left master loading doors 130, 1130, 2130, 3130. The left upright extrusions 132, 1132, 2132, 3132 which are of uniform cross-section along their lengths, define halves of hinges 151, 1151, 2151, 3151 that pivotally mount the left master loading doors 130, 1130, 2130, 3130 for pivotal movement (about an axis that is designated by the numeral 51 in FIGS. 13, 14, 18 and 24) between their closed positions as depicted in FIGS. 1-8 and 13, and open positions of the left master loading door 130 depicted in FIGS. 9, 14 and 24. The right master loading doors 140, 1140, 2140, 3140 are mounted for pivotal movement in the same way (about an axis that is designated by the numeral 52 in FIGS. 19 and 24) between their closed positions as depicted in FIGS. 1-8, and open positions depicted in FIGS. 9 and 24.

Figure 13:
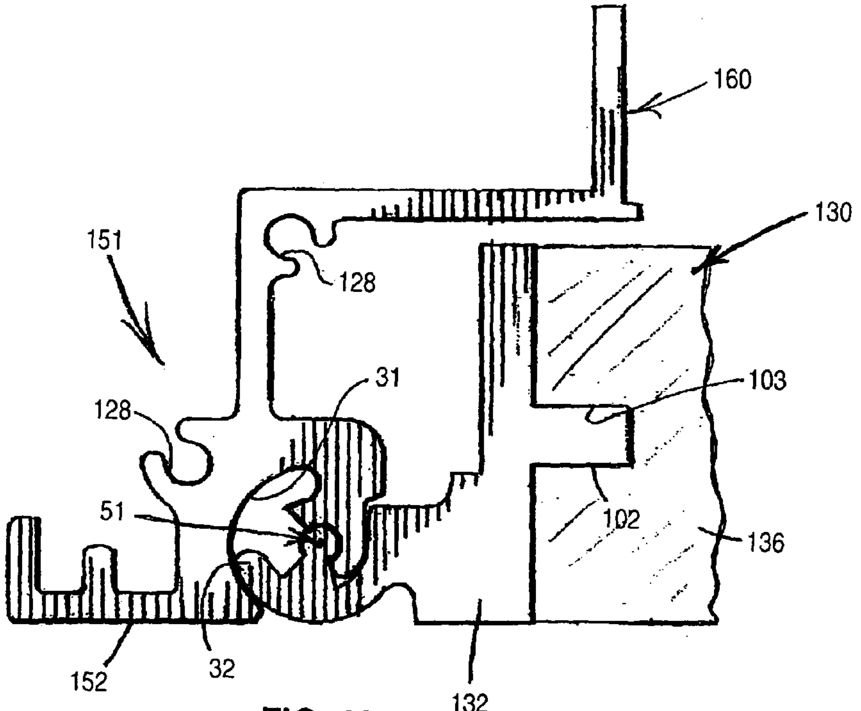
FIG. 13 is a cross-sectional view on an enlarged scale taken along line 13-13 of FIG. 2 with the left master loading door in its closed, locked position.
Figure 14:
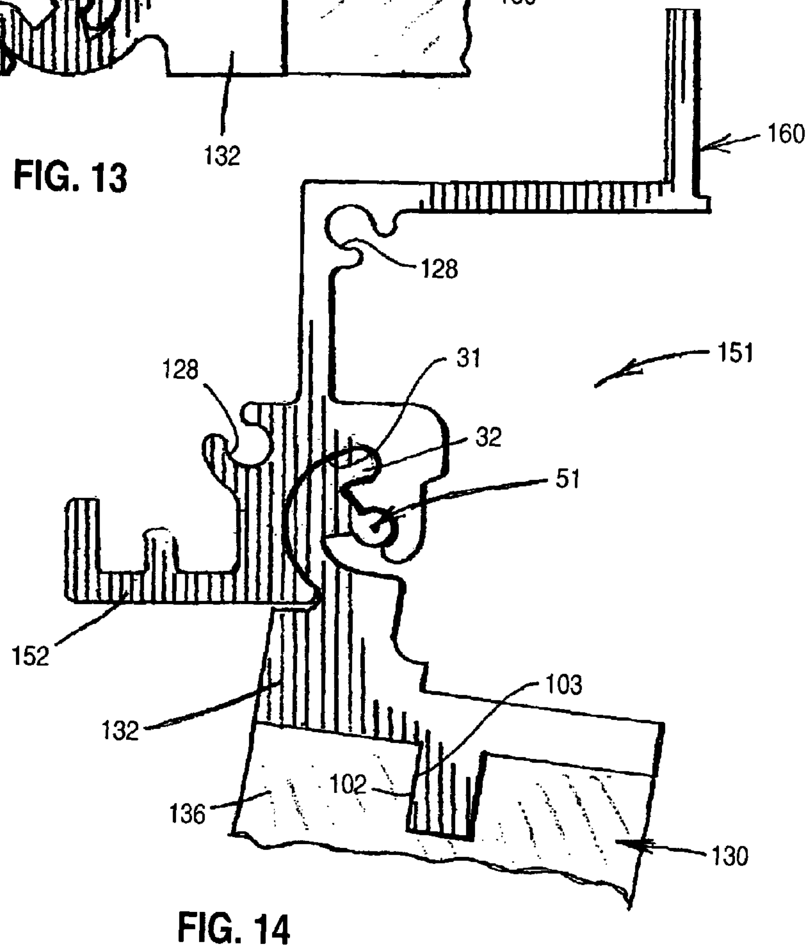
FIG. 14 is a cross-sectional view on an enlarged scale taken along line 14-14 of FIG. 9 with the left master loading door in its fully open position.
Figure 24:
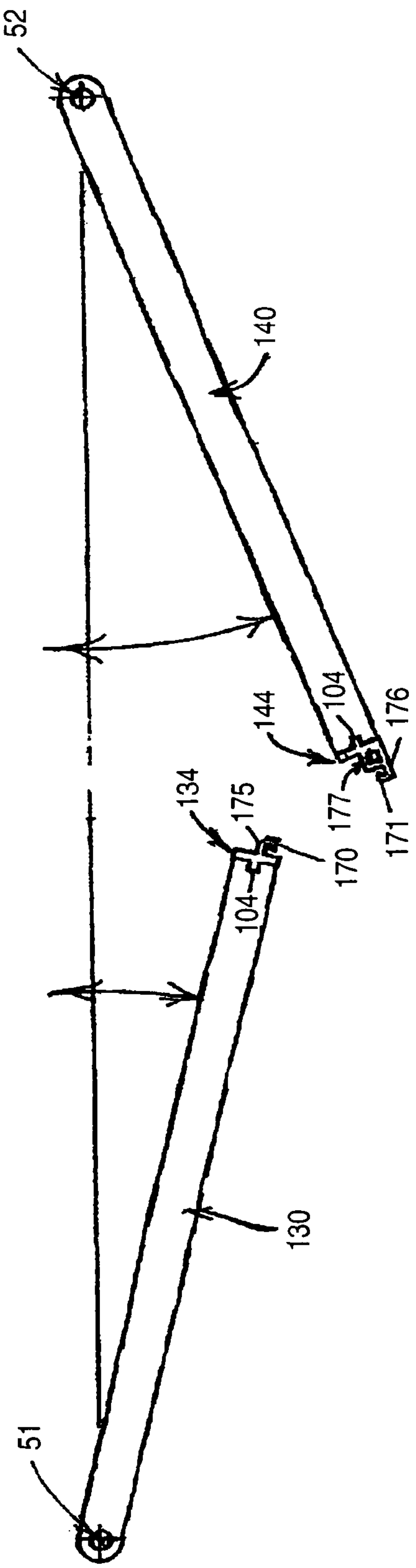
FIG. 24 is a schematic top view showing portions of the left and right master loading doors pivoted to an open position.

Referring to FIG. 13 wherein a cross-section of the left upright extrusion 132 is shown, the other half of the hinge that pivotally mounts the left master loading door 130 is defined by an extrusion 152 which has a groove 31 of complex cross-sectional configuration (also shown in FIG. 18) that receives in an interfitting relationship a curved formation 32 of the left master loading door upright extrusion 132 in a manner that permits the left master loading door 130 to pivot about the axis 51 (FIGS. 13, 14 and 24) between the closed position depicted in FIGS. 1-8 and 13, and open positions depicted in FIGS. 9, 14 and 24. Other views that also show the curved formation 32 include FIGS. 30, 32, 36 and 38.

Figure 18:
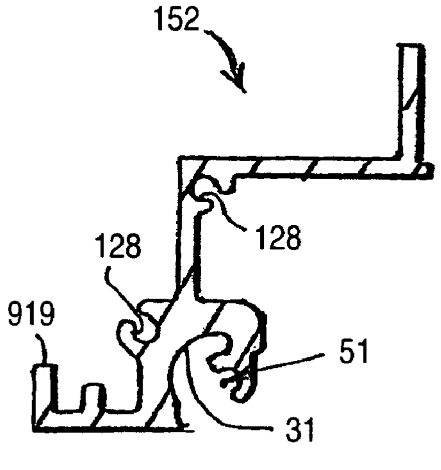
Figure 19:
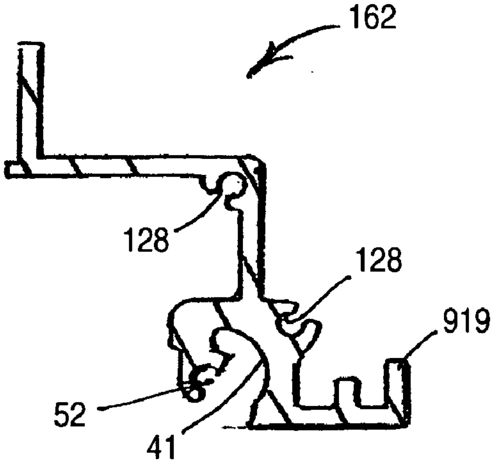

Referring to FIGS. 2, 4, 6 and 8, it will be seen that left door frame upright extrusions 152, 1152, 2152, 3152 (all having the same cross-section as is depicted in FIGS. 13, 14 and 18 where the cross-section of the extrusion 152 is shown) extend the full height along the left sides of the left master loading doors 130, 1130, 2130, 3130 to cooperate with the extrusions 132, 1132, 2132, 3132 to define the hinges 151, 1151, 2151, 3151 that extend for the full heights of the left master loading doors 130, 1130, 2130, 3130.

Figure 11:
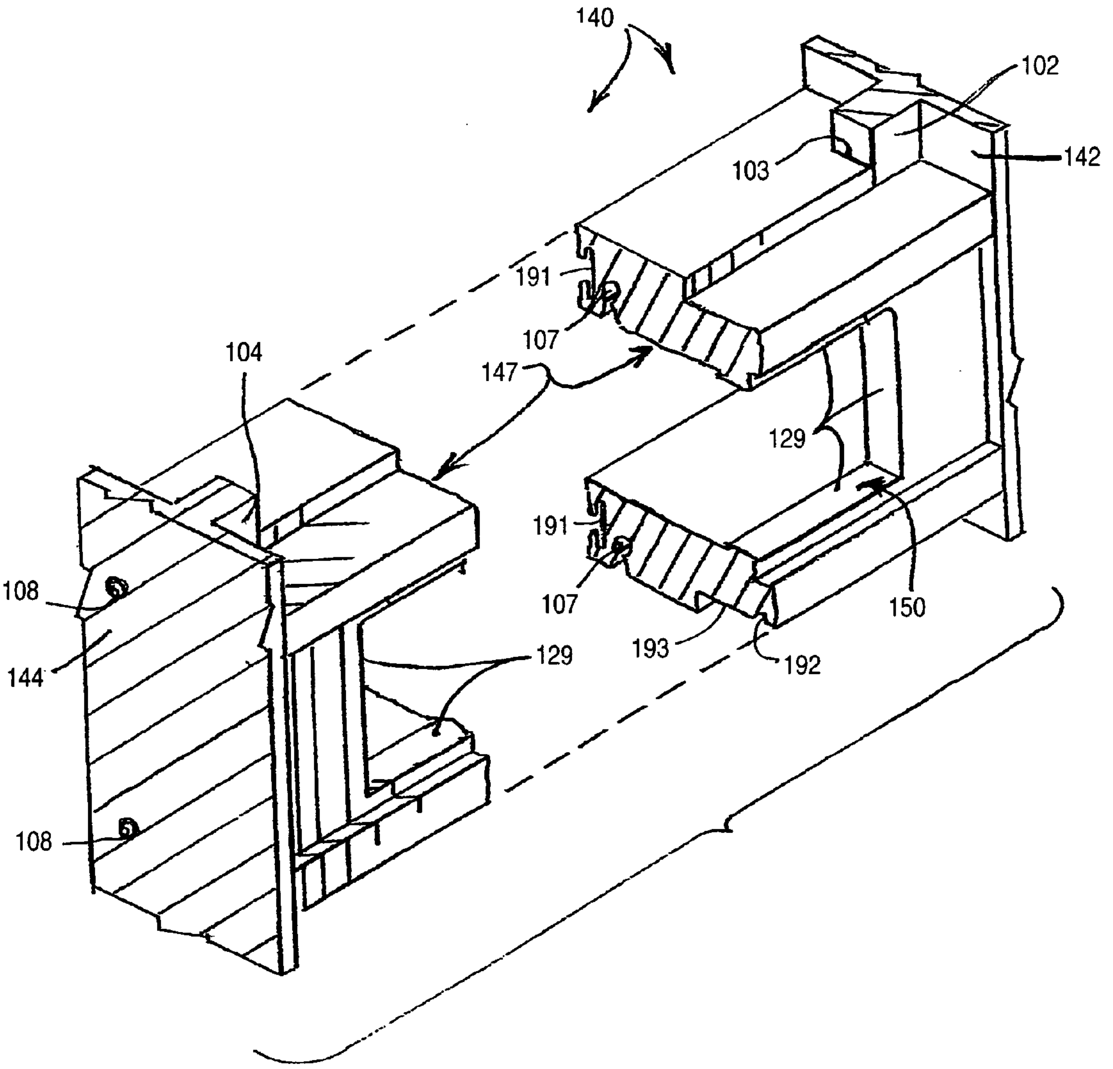
FIG. 11 is a perspective view on an enlarged scale showing selected front and left portions of the right master loading door of the CBU of FIGS. 1 and 2.

Likewise, referring to FIGS. 2, 4, 6 and 8, it will be understood that full-height door hinges 161, 1161, 2161, 3161 are defined by interfitting extrusions 142/162 (see FIG. 19 where the cross-section of the extrusion 162 is shown as having a complexly curved groove 41 that is a mirror image reversal of the cross-section of the curved groove 31 shown in FIG. 18),

1142/1162, 2142/2162 and 3142/3162 that have cross sections that are mirror images of the cross-sections of the interfitting extrusions 132, 152 depicted in FIGS. 13, 14—and which permit the right master loading doors 140, 1140, 2140, 3140 to pivot open just as the left master loading door 130 is depicted as pivoting open due to relative movement of the extrusions 132, 152 in FIG. 11 (see, for example, FIG. 24 wherein the right master loading door 140 is shown pivoted about an axis 52 to an open position).

A curved formation 42 of the right master loading door upright 142 that extends into the curved groove 41 of the frame extrusion 162 is shown in FIGS. 26, 27, 29, 33 and 35 to have a cross-section that is a mirror image reversal of the cross-section of the curved formation 32 of the left master loading door upright 132.

Figure 15:
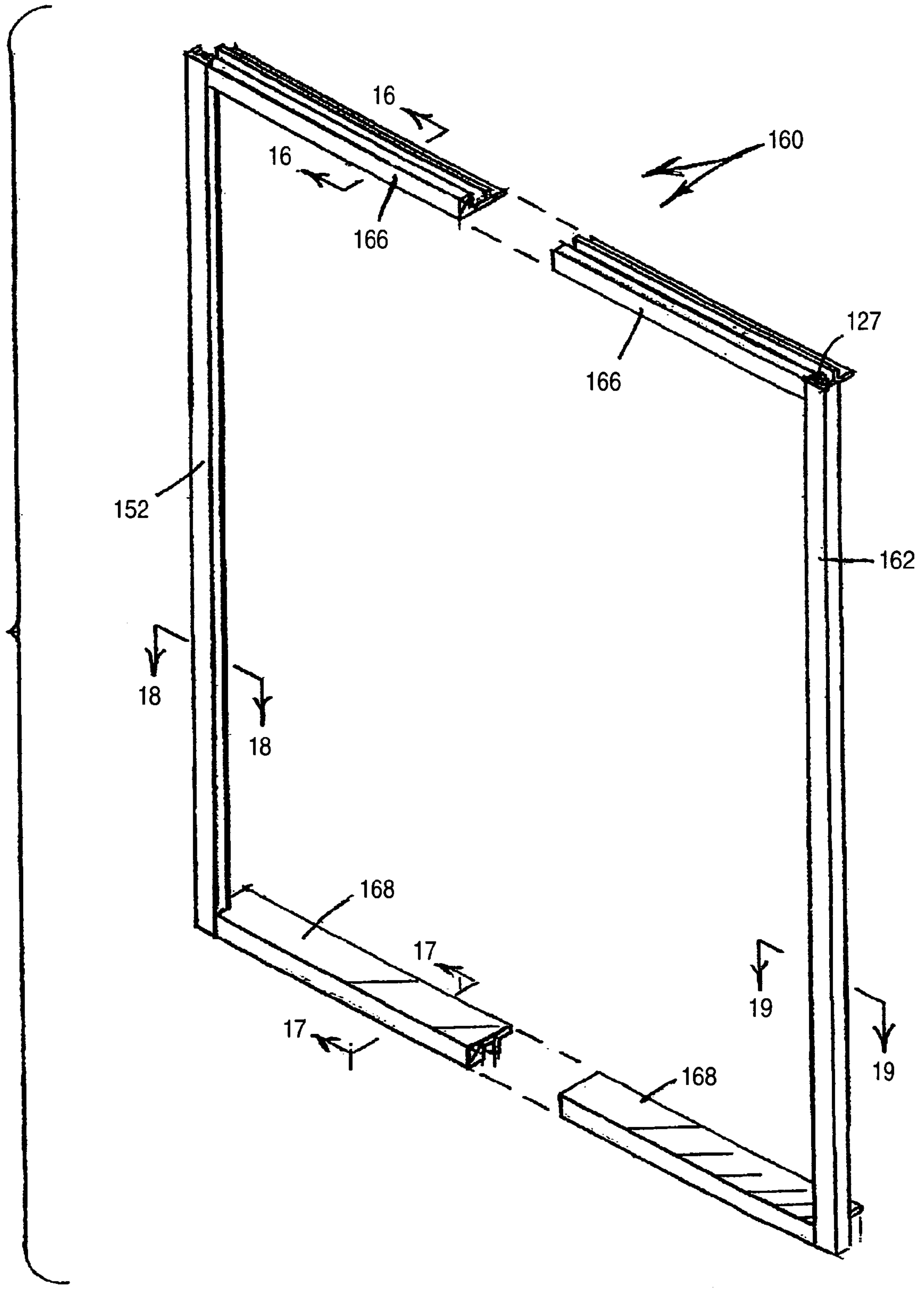
FIG. 15 is a perspective view of a rectangular frame structure that surrounds the master loading doors of the CBU of FIGS. 1-2.
Figure 16:
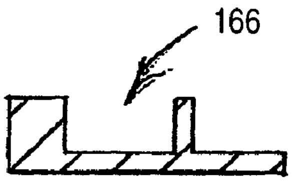
FIGS. 16-19 are cross-sectional views taken along lines 16-16, 17-17, 18-18 and 19-19 of FIG. 15.
Figure 17:
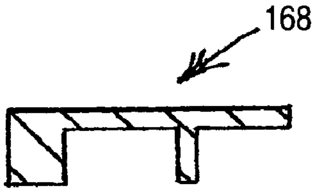

Referring to FIG. 15, the left and right uprights 152, 162 which form elements of the hinges 151, 161 that pivotally mount the left and right master loading doors 130, 140 are two of the four elements of a rectangular frame 160 that surrounds the master loading doors 130, 140. Top and bottom bars 166, 168 of generally F-shaped cross-section complete the frame 160. In FIGS. 16-19 the cross-sections of the four frame elements 152, 162, 166, 168 are depicted.

Figure 20:
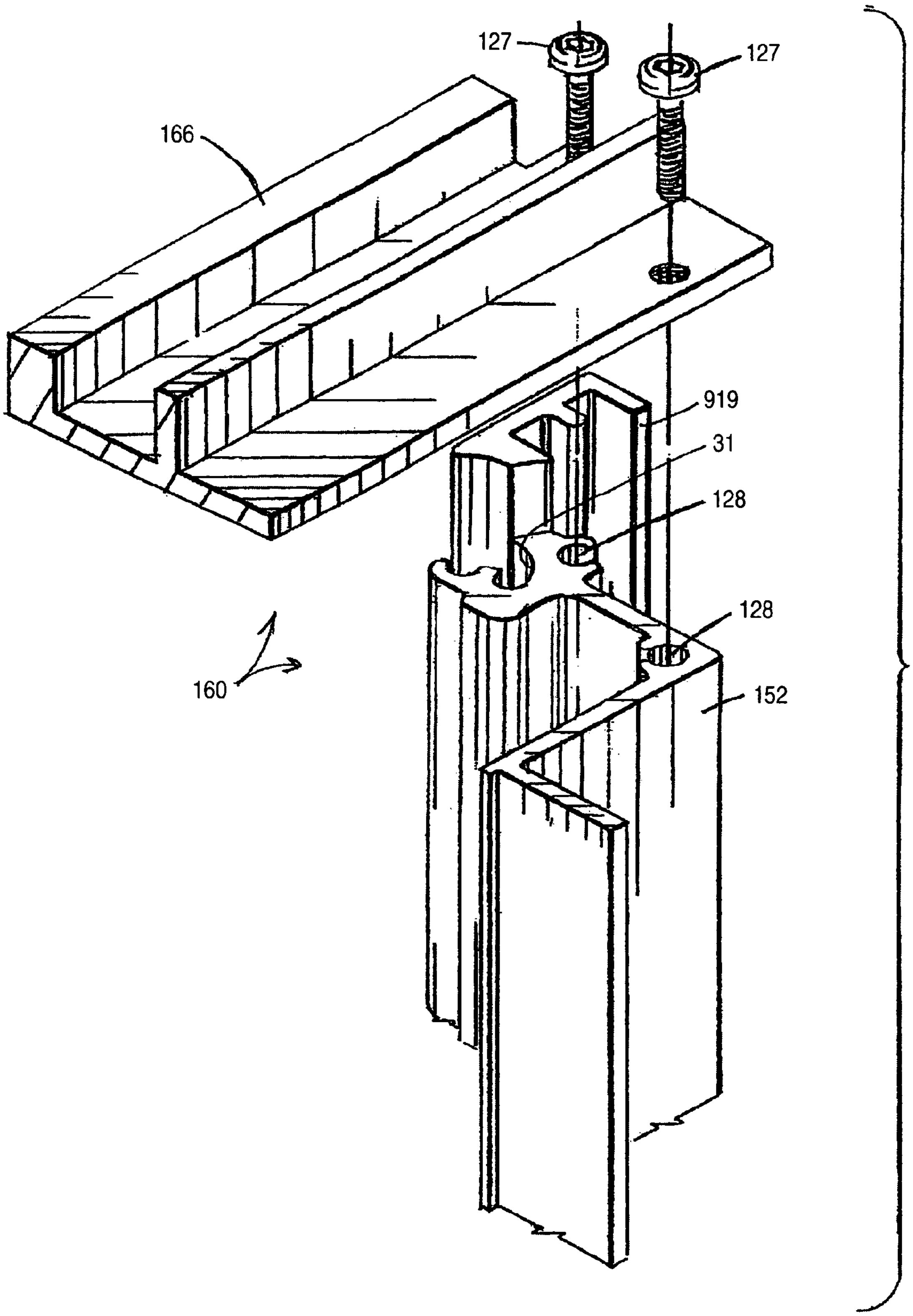
FIG. 20 is an exploded view on an enlarged scale showing components of a corner joint of the rectangular frame structure of FIG. 15.
Figure 21:
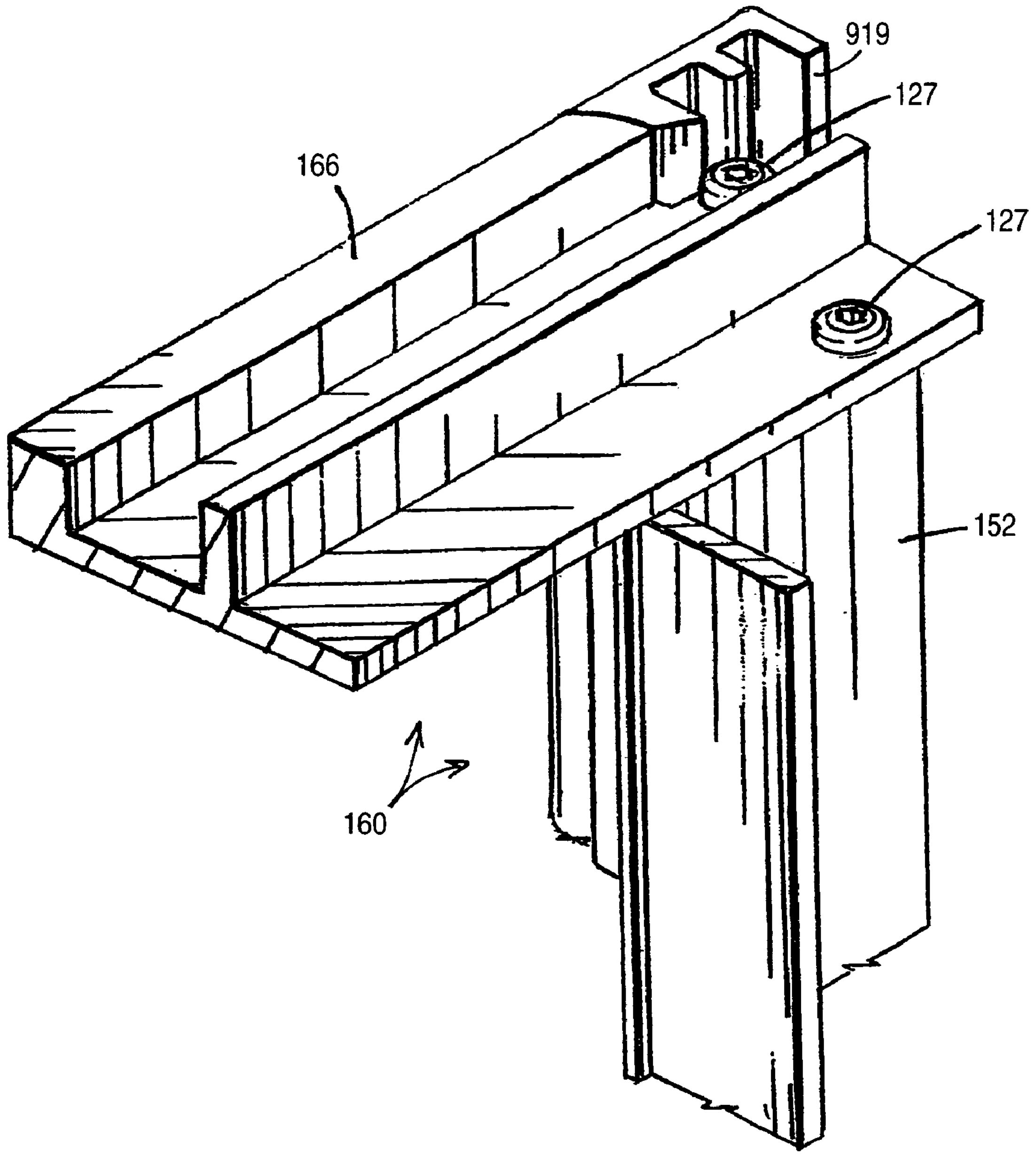
FIG. 21 is a perspective view showing in assembled form the components of FIG. 20.

In FIG. 20 an exploded view is provided showing how one of the four corner junctures of the frame 160 is formed, namely the corner juncture of the frame elements 152, 166 which is secured by screws 127 that extend through holes formed in the top bar 166 and are threaded into generally circular formations 128 of the cross-section of the upright 152. In FIG. 21, a completed corner juncture of the frame elements 152, 166 is depicted. The other three corner junctures of the frame 160 are formed in the same manner, and the cluster box units 1100, 2100, 3100 have similarly configured frames 1160, 2160, 3160 (see FIGS. 4, 6, 8) formed by top and bottom bars 1166, 1168, 2166, 2168, 3166, 3168 that join with the uprights 1152, 1162, 2152, 2162, 3156, 3162.

Figure 22:
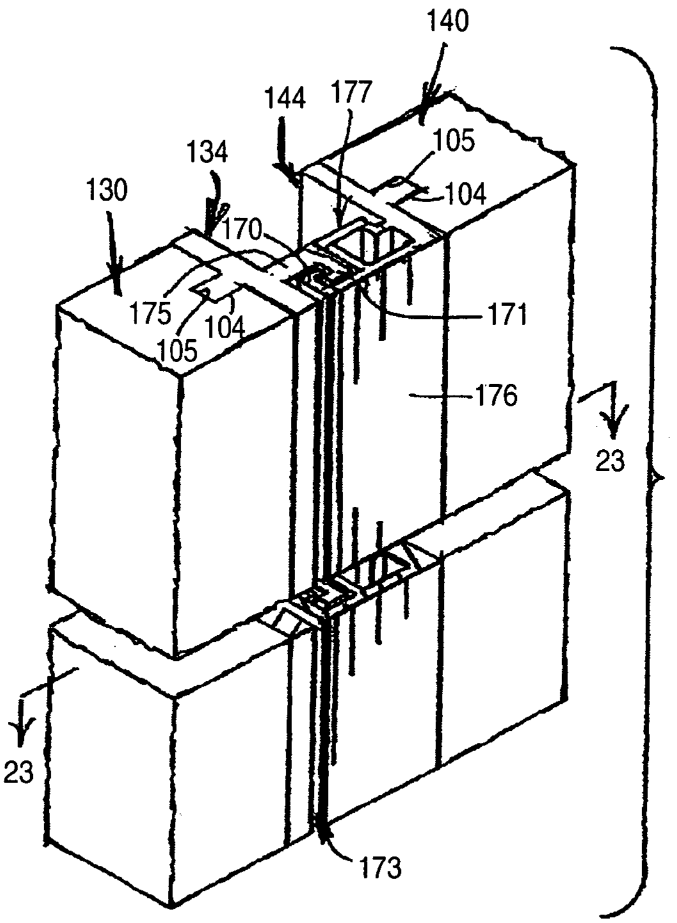
FIG. 22 is a perspective view of portions of the master loading doors of the CBU of FIGS. 1-2 showing how the depicted door portions come closely together when the left and right master loading doors are into engaging relationship when closed.
Figure 23:
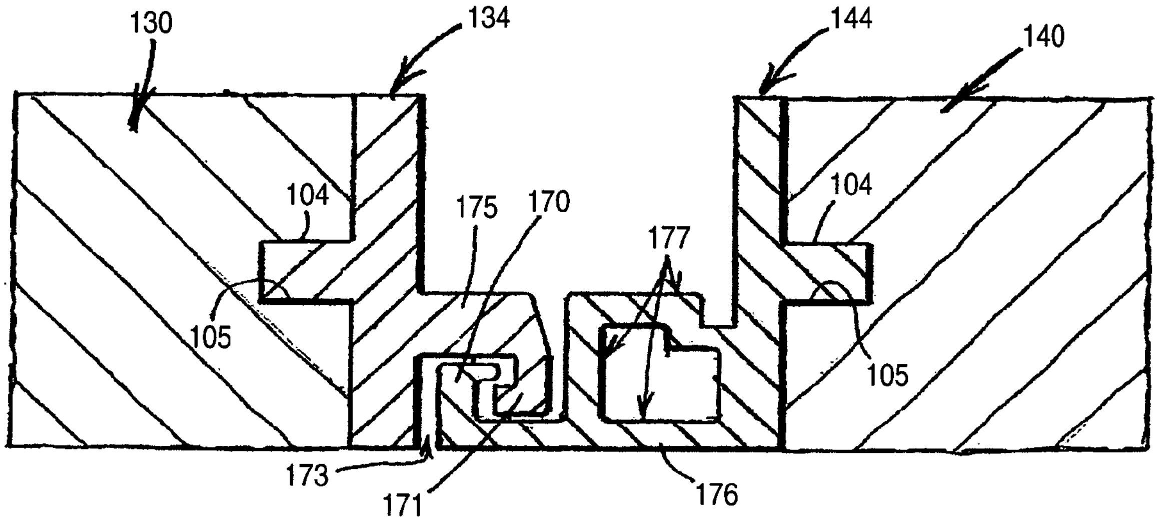
FIG. 23 is a cross-sectional view on an enlarged scale taken along line 23-23 of FIG. 22.

The right upright 134 of the left master loading door 130, and the left upright 144 of the right master loading door 140 are configured to move into close association with each other when the left master loading door 130 and the right master loading door 140 are pivoted to bring them to their closed positions, as depicted in FIGS. 1, 2, 22 and 23. Referring to FIGS. 22-24, it will be seen that the left upright 144 of the right master loading door 140 has a rearwardly turned hooked portion 170 that will be engaged by a forwardly turned hooked portion 171 of the right upright 134 of the left master loading door 130 such that even if a prybar or other pointed or edge tool is inserted into a space 173 (see FIG. 23) between the uprights 134, 144 of the master loading doors 130, 140 in an effort to pry the closed, locked master loading doors 130, 140 away from each other the hooked portions 170, 171 will remain sealed. While the hooked portions 170, 171 are effective in resisting attack, their presence does nothing to impede normal opening and closing of the master loading doors 130, 140, as is depicted in FIG. 24.

Thus, if a pry bar (not shown) is inserted into the space 173 in an effort to widen the space 173, the hooked portions 170, 171 will engage—which effectively strengthens the resistance of the CBU 100 to attack. Likewise, the fact that the space 173 is backed by a rightwardly extending portion 175 (see FIG. 23) of the upright 134, and the fact that the wide front face 177 (see FIG. 23) of the upright 144 is rigidified by a box-like cross-section 176 also help to defeat and fend off attack if force is applied to the master loading doors 130, 140 in an attempt to gain entry to the interior of the CBU 100.

Inasmuch as the master loading doors 1130, 1140, 2130, 2140, 3130, 3140 have uprights 1134, 1144, 2134, 2144, 3134, 3144 that are identical to the uprights 134, 144 depicted in FIGS. 22-24, the cluster box units 1100, 2100, 3100 also are resistant to attack if efforts are made to pry open the master loading doors 1130, 1140, 2130, 2140, 3130, 3140 from a closed configuration.

Figure 26:
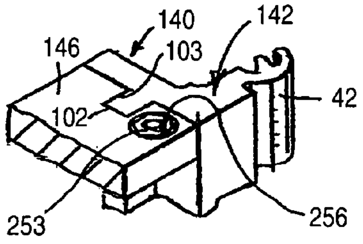
FIG. 26 is a perspective view on an enlarged scale of an upper right corner region of the frame assembly of FIG. 25, with the view permitting a recess to be seen that carries a hex nut threaded onto an upper end region of the hinge rod to secure the hinge rod in assembled position.
Figure 27:
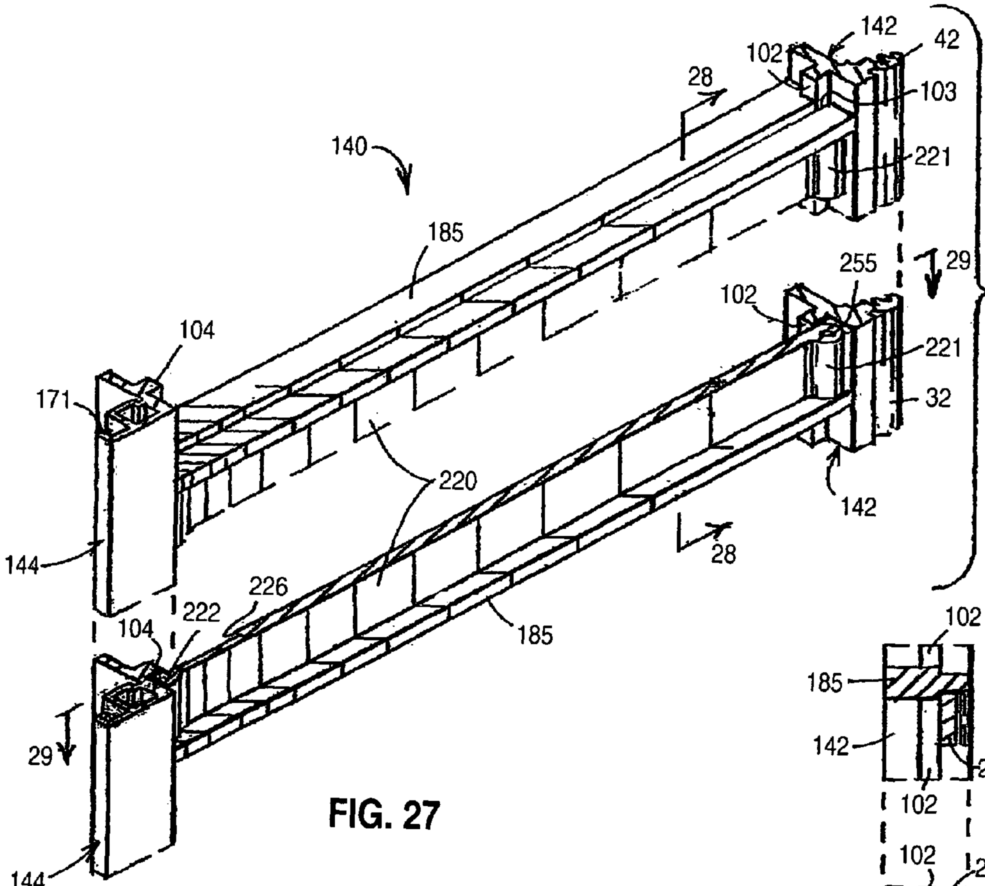
FIG. 27 is an exploded perspective view showing selected portions of the frame assembly of the right master loading door together with portions of a first form of compartment door that may be used with the frame assembly, with the compartment door in closed position in a forwardly facing recess defined by elements of the frame assembly.
Figure 28:
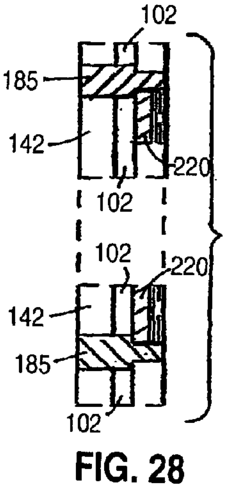
FIG. 28 is a cross-sectional view taken along line 28-28 of FIG. 27.
Figure 29:
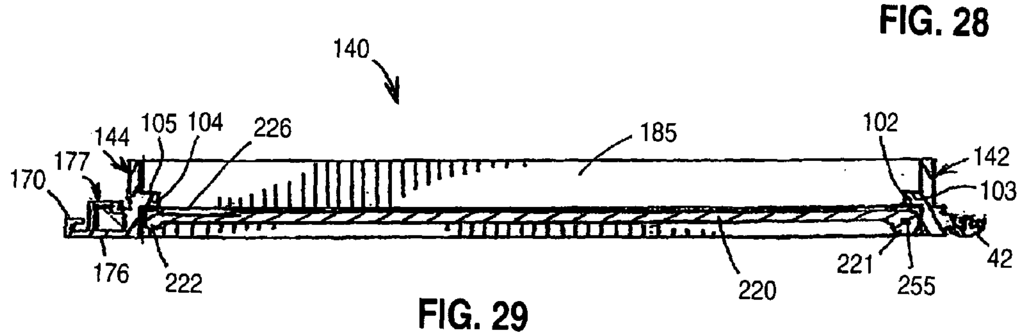
FIG. 29 is a cross-sectional view taken along line 29-29 of FIG. 27.
Figure 30:
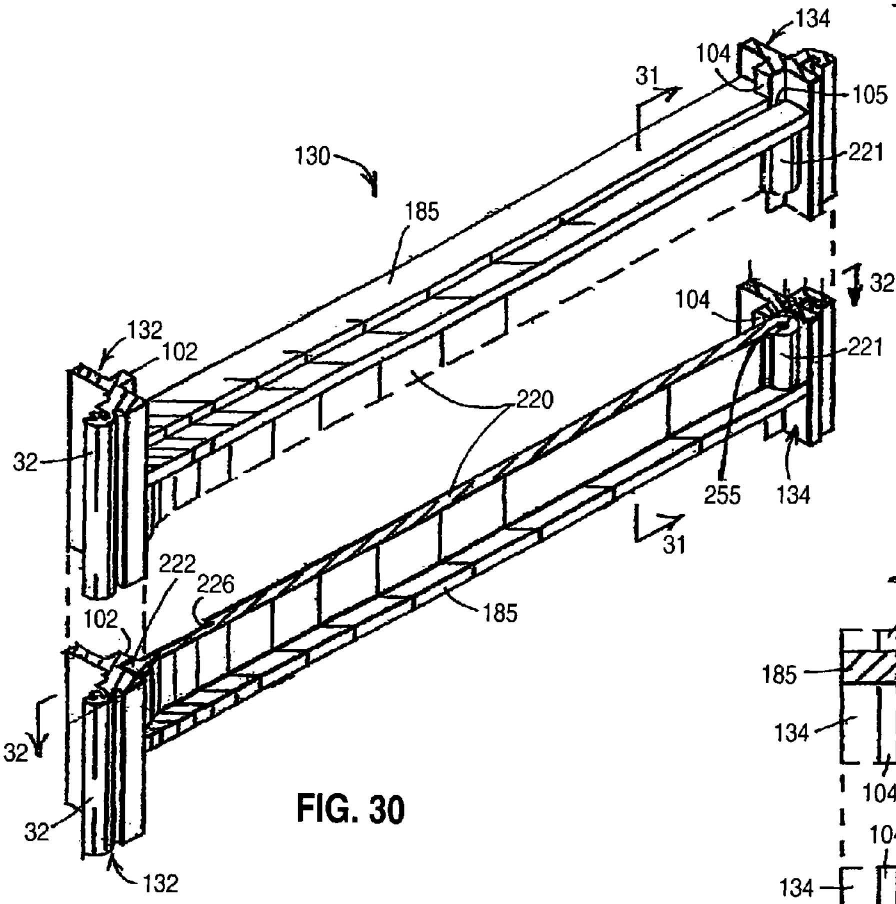
FIG. 30 is an exploded perspective view showing selected portions of the frame assembly of the left master loading door together with portions of the first form of compartment door in closed position in a forwardly facing recess defined by elements of the frame assembly.
Figure 31:
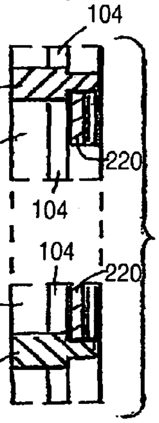
FIG. 31 is a cross-sectional view taken along line 31-31 of FIG. 30.
Figure 32:
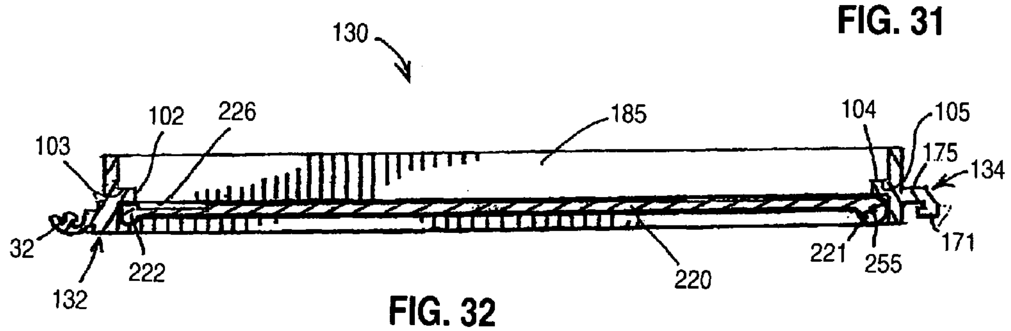
FIG. 32 is a cross-sectional view taken along line 32-32 of FIG. 30.
Figure 33:
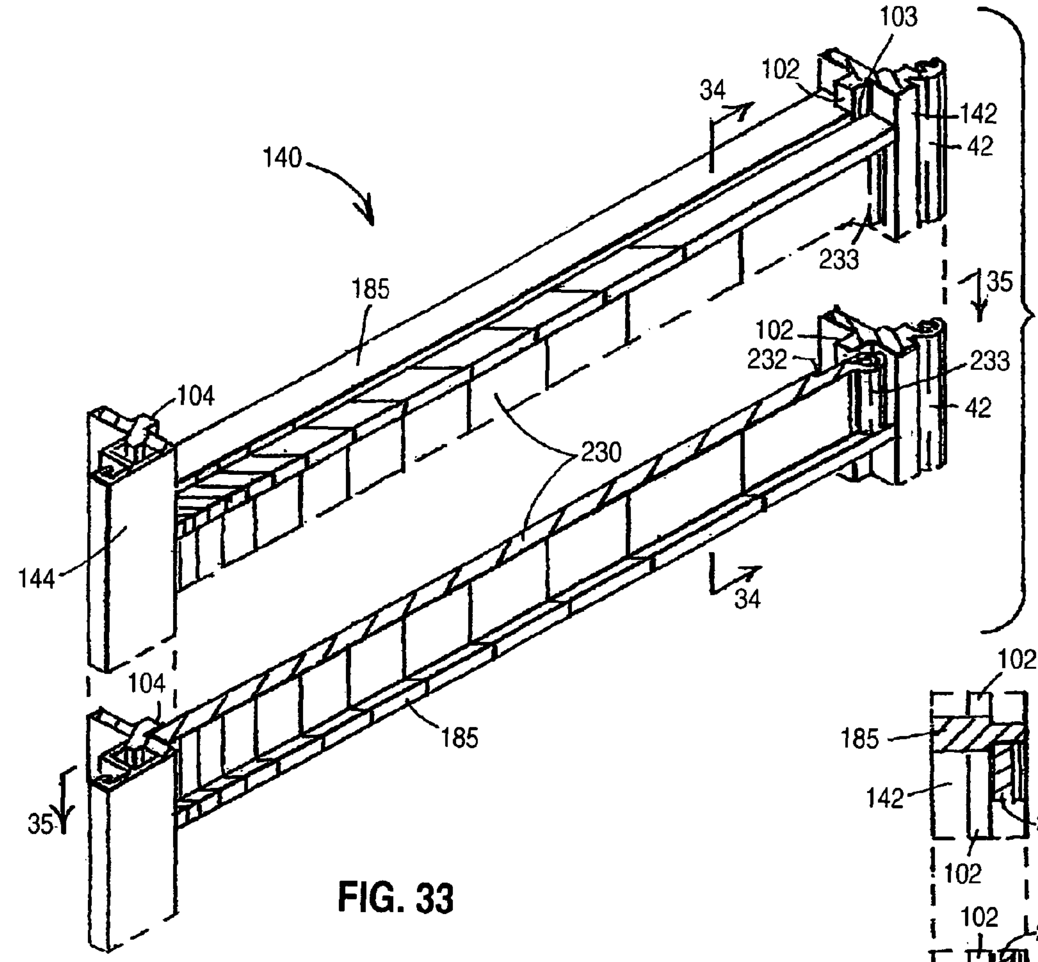
FIG. 33 is an exploded perspective view showing selected portions of the frame assembly of the right master loading door together with portions of a second form of compartment door that may be used with the frame assembly, with the compartment door in closed position in a forwardly facing recess defined by elements of the frame assembly.
Figure 34:
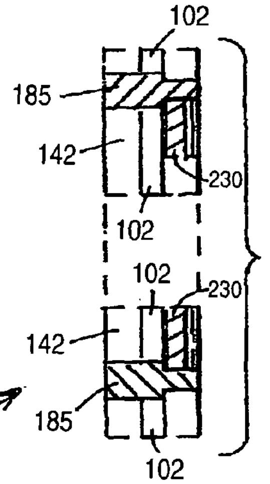
FIG. 34 is a cross-sectional view taken along line 34-34 of FIG. 33.
Figure 35:
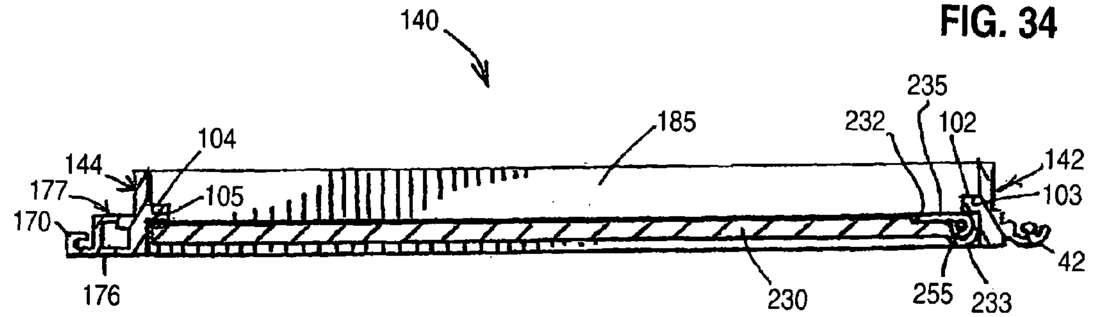
FIG. 35 is a cross-sectional view taken along line 35-35 of FIG. 33.

Referring to FIG. 26, elements of one of the master loading doors, namely the right master loading door 140 of the cluster box unit 100, are shown. The master loading door 140 has a generally rectangular framework 180 defined by the right upright 142, the left upright 144, the top bar 146 and the bottom bar 148—a framework that is rigidified and strengthened by the extrusion 147 that extends centrally between the uprights 142, 144.

Figure 12:
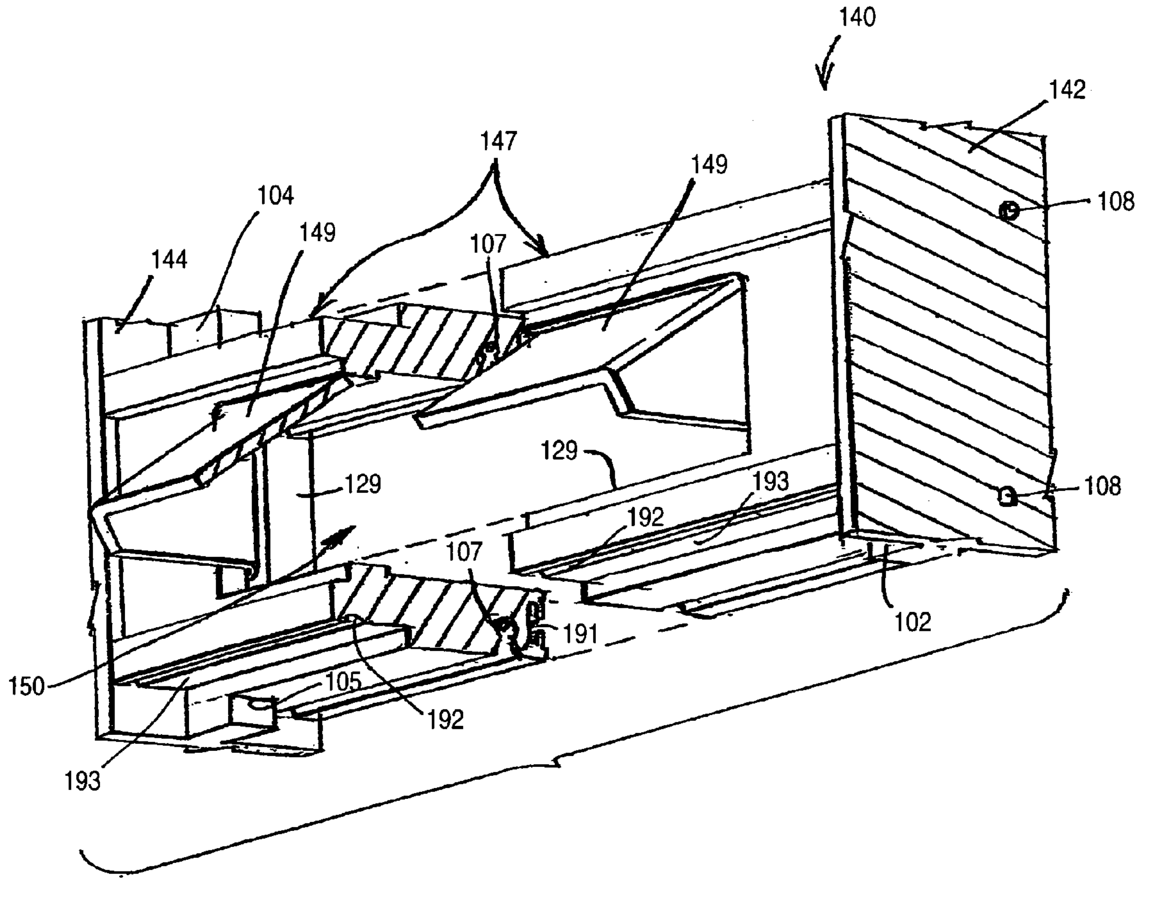
FIG. 12 is a perspective view showing selected front and right portions of the right master loading door of the CBU of FIGS. 1 and 2 including a hooded louvered mail slot through which outgoing mail is inserted into an outgoing mail compartment located behind the right master loading door.

Referring to FIGS. 11 and 12, the extrusion 147 has a somewhat complex but generally C-shaped cross-section that is uniform along the full length of the extrusion 147 (except where the mail slot 129 opens through a central upstanding web of the C-shaped cross-section of the extrusion 147). Upper and lower legs of the C-shaped cross-section of the extrusion are provided with downwardly opening recesses 107 that also run the full length of the extrusion 147. Upper portions of the recesses 107 are rounded and align with holes 108 formed through the uprights 142, 144 (in FIG. 12, the holes 108 that extend through the upright 142 can be seen; and, in FIG. 11, the holes 108 that extend through the upright 144 can be seen). Threaded fasteners, like the screws 127 depicted in FIG. 20, extend through the holes 108, are threaded into the rounded upper end regions of the recesses 107, and are tightened in place to clamp opposite end regions of the extrusion 147 into engagement with the uprights 142, 144.

Referring still to FIGS. 11 and 12, because the uprights 142, 144 have bar-like formations 102, 104 that project toward each other along the full lengths of the uprights 142, 144, opposite end regions of the extrusion 147 are provided with slots 103, 105 (the slot 103 can best be seen in FIG. 11; the slot 105 can best be seen in FIG. 12) to snugly receive the bar-like formations 102, 104. The interengagement of the bar-like formations 102, 104 with the slots 103, 105 maintains proper alignment of front and rear surfaces of the extrusion 147 with front and rear surfaces of the uprights 142, 144, and assists the extrusion 147 in rigidifying the framework 180 (FIG. 25) of the right master loading door 140.

Figure 10:
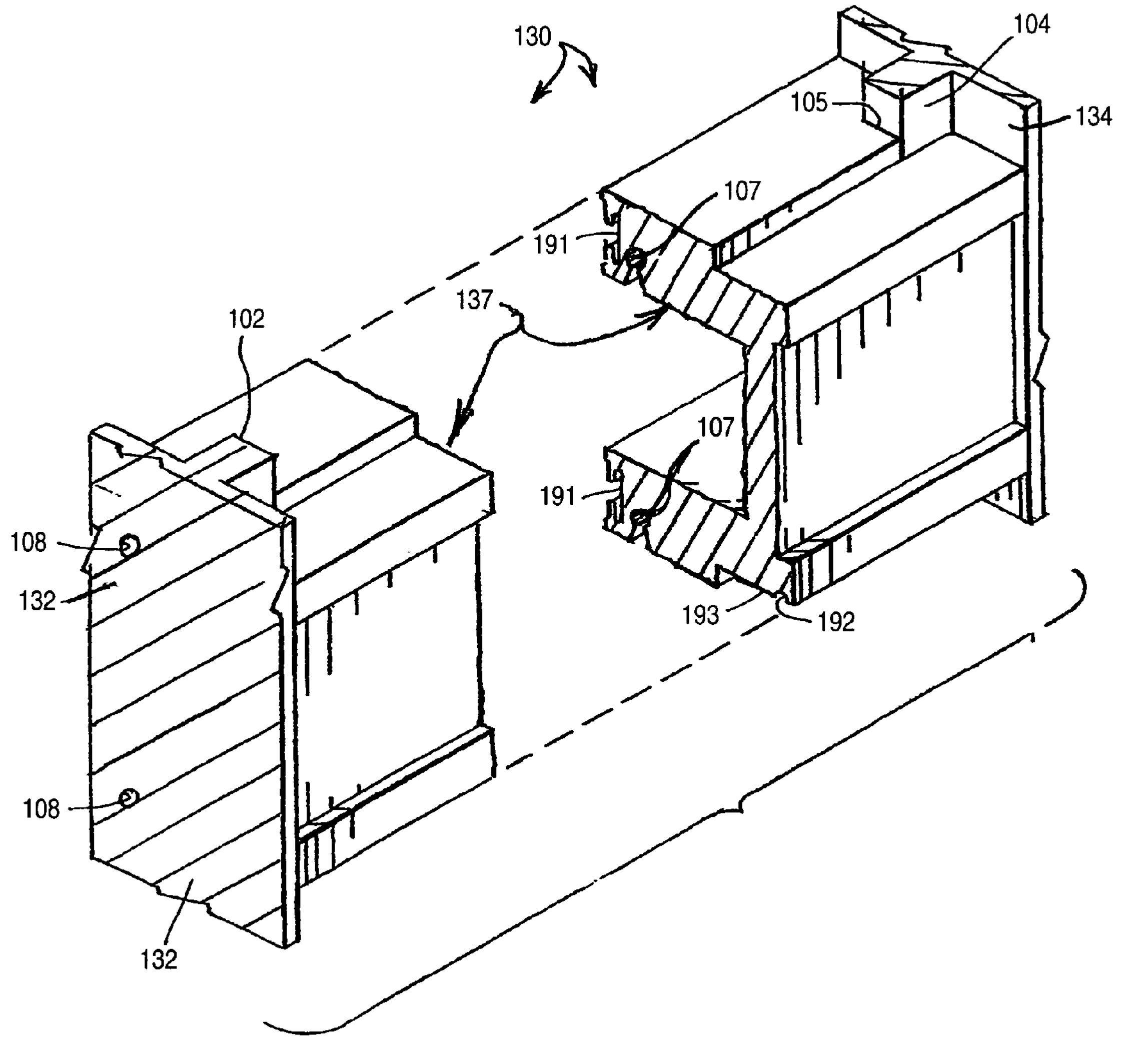
FIG. 10 is a perspective view on an enlarged scale showing selected front and left portions of the left master loading door of the CBU of FIGS. 1 and 2.

Referring to FIG. 10, the left master loading door 130 is similarly reinforced, rigidified and strengthened by the extrusion 137 which has the same C-shaped cross-section as the extrusion 147, the same recesses 107 as the extrusion 147, and the same slots (only the slot 105 is shown in FIG. 10) as the slots 103, 105 of the extrusion 147 for receiving bar-like formations 102, 104 of the uprights 132, 134 that are identical in configuration to the bar-like formations 102, 104 of the uprights 142, 144 of the right master loading door 140.

Figure 39:
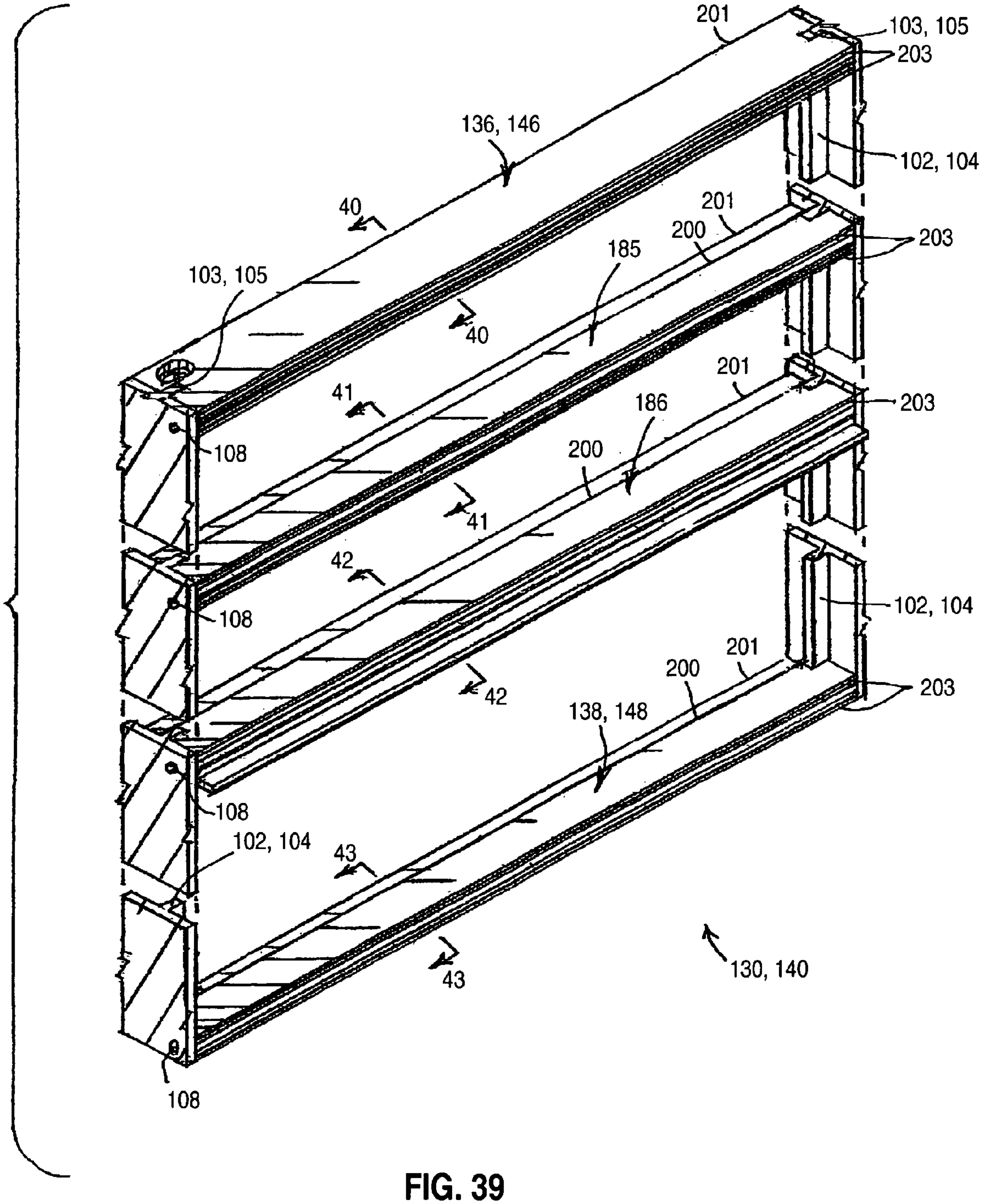
FIG. 39 is a perspective view showing selected portions of a master loading door frame assembly including four types of horizontally extending bars that may be employed as elements of the frame assembly.
Figure 40:
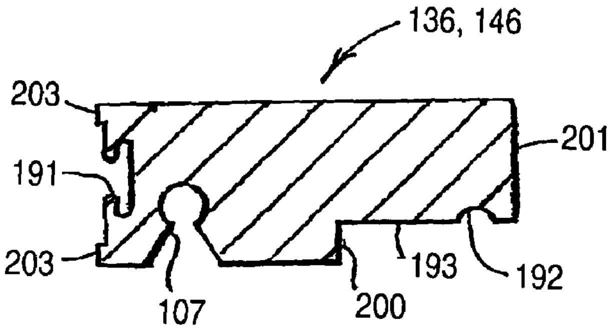
FIG. 40 is a cross-sectional view taken along line 40-40 of FIG. 39.
Figure 41:
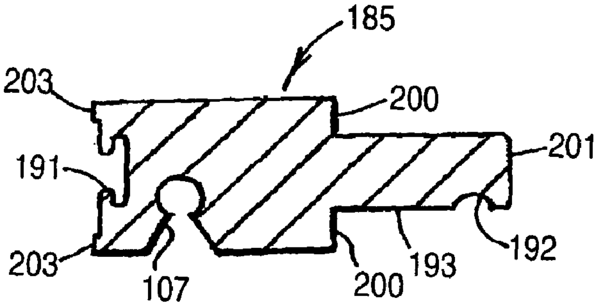
FIG. 41 is a cross-sectional view taken along line 41-41 of FIG. 39.

Referring briefly to FIG. 39 where upright portions and cross-bar elements that are common to the left and right master loading doors 130, 140 are depicted, it will be seen that the top bars 136, 146 and the bottom bars 138, 148 of the master loading doors 130 are slotted at opposite ends in the manner that the slots 103, 105 are provided in opposite end regions of the extrusions 137, 147 (as described just above) to receive the bar-like formations 102, 104 of the uprights of the doors 130, 140. Likewise, it will be seen that an upper zone cross-bar 185 and a lower zone cross bar 186 also are slotted at opposite ends in the manner that the slots 103, 105 are provided in opposite end regions of the extrusions 137, 147 (as described just above) to receive the bar-like formations 102, 104 of the uprights of the doors 130, 140.

Referring variously to FIGS. 1-9, 26 and 80, the left master loading doors 130, 1130, 2130, 3130 and the right master loading doors 140, 1140, 2140, 3140 are provided with differing arrays of the upper and lower zone cross-bars 185, 186. Referring to FIGS. 40-43 where cross-sections of the top bars 136, 146, the upper zone bars 185, the lower zone bars 186, and the bottom bars 138, 148 are shown, it will be seen that each of the bars 136, 138, 146, 148, 185, 186 defines one of the downwardly opening recesses 107 into which threaded fasteners (such as the threaded fasteners 127 shown in FIG. 20) can be threaded (after passing through upright holes such as the holes 108 shown in FIG. 39) to secure these bars to associated ones of the uprights 132, 142, 134, 144.

Other features shared by the bar cross-sections depicted in FIGS. 40-43 include rearwardly-facing undercut grooves 191 that are configured to receive elongate lengths of resilient weatherstrip material of any of a wide variety of commercially available types (see, for example, the weatherstrips 190 shown in FIGS. 44-47); and, concave recesses 192 provided in downwardly facing surfaces 193 of forward portions of the bars 136, 138, 146, 148, 185, 186 that help to prevent moisture from passing rearwardly along the downwardly facing surfaces 193 from front surfaces 201 that are exposed to rain, snow, sleet and other forms of moisture inasmuch as the front surfaces 201 constitute elements of the fronts of the cluster box units 100, 1100, 2100, 3100.

Referring to FIGS. 10-12, the extrusions 137, 147 that extend centrally across mid portions of the left and right master loading doors 130, 140 also have downwardly facing surfaces 193 that are provided with concave recesses 192 to deter the rearward passage of moisture along the downwardly facing surfaces 193 of the extrusions 137, 147. As also will be noted in FIGS. 10-12, the extrusions 137, 147 are provided with rearwardly facing undercut grooves 191 that, like the rearwardly facing undercut grooves 191 of the bars depicted in FIGS. 40-43, may provide mounting locations for lengths of weatherstripping such as the weatherstrip material 190 depicted in FIGS. 44-47.

Figure 42:
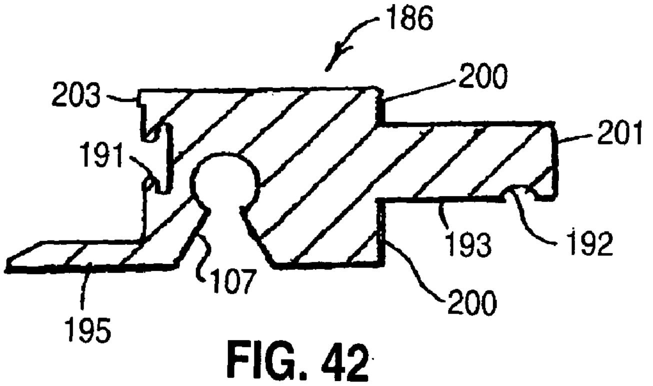
FIG. 42 is a cross-sectional view taken along line 42-42 of FIG. 39.
Figure 43:
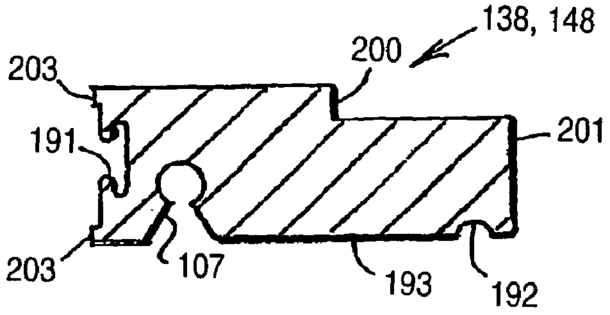
FIG. 43 is a cross-sectional view taken along line 43-43 of FIG. 39.
Figure 44:
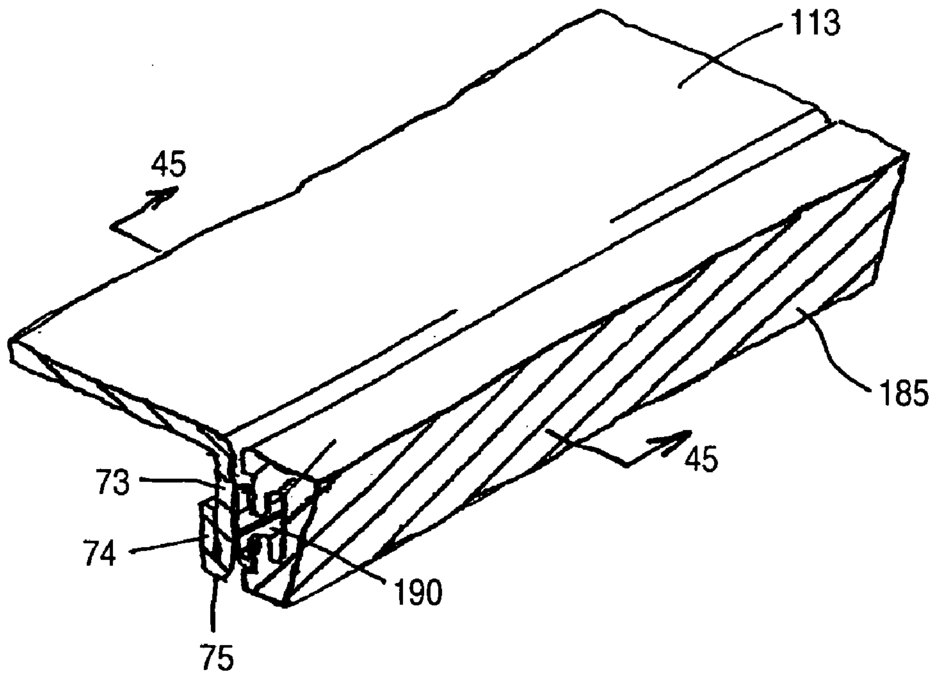
FIG. 44 is a perspective view showing portions of one of the horizontal bars of FIGS. 40, 41 and 43 carrying a weather strip closed into engagement with a shelf front of one the compartments of the CBU of FIGS. 1-2.
Figure 45:
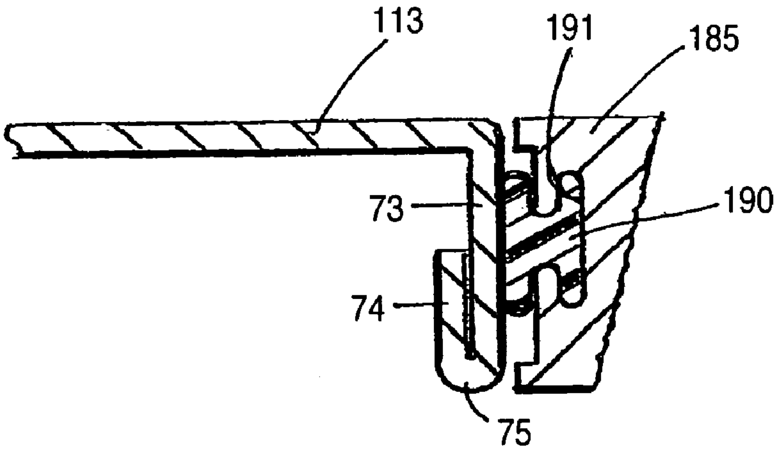
FIG. 45 is a cross-sectional view taken along line 45-45 of FIG. 44.
Figure 46:
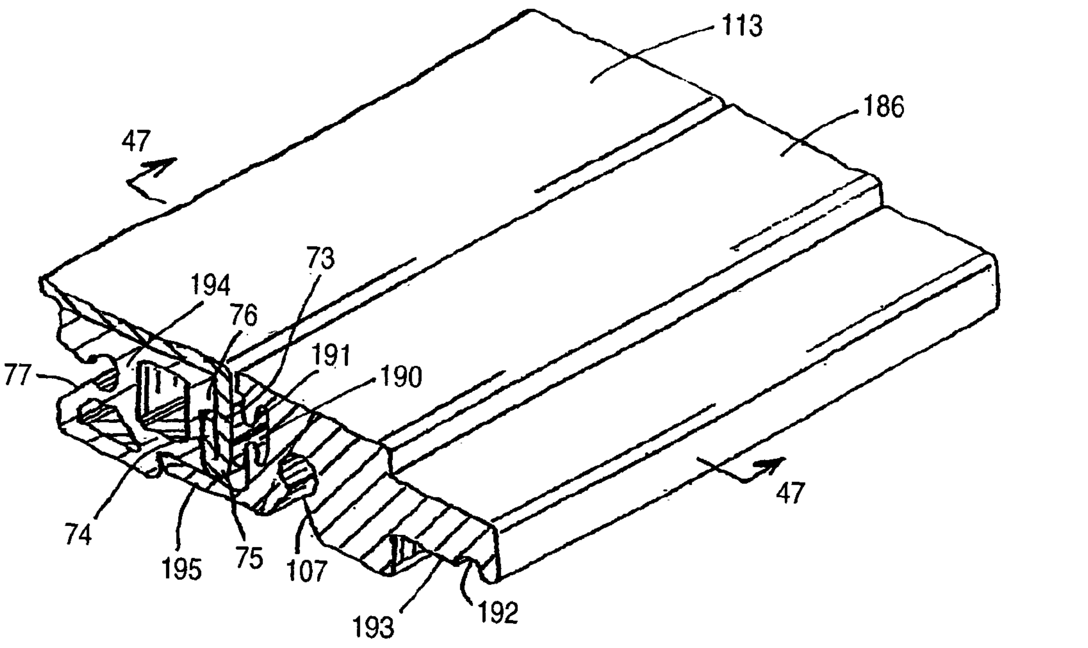
FIG. 46 is a perspective view showing portions of the horizontal bar of FIG. 42 carrying a weather strip closed into engagement with a strengthened shelf front of one the compartments of the CBU of FIGS. 1-2.
Figure 47:
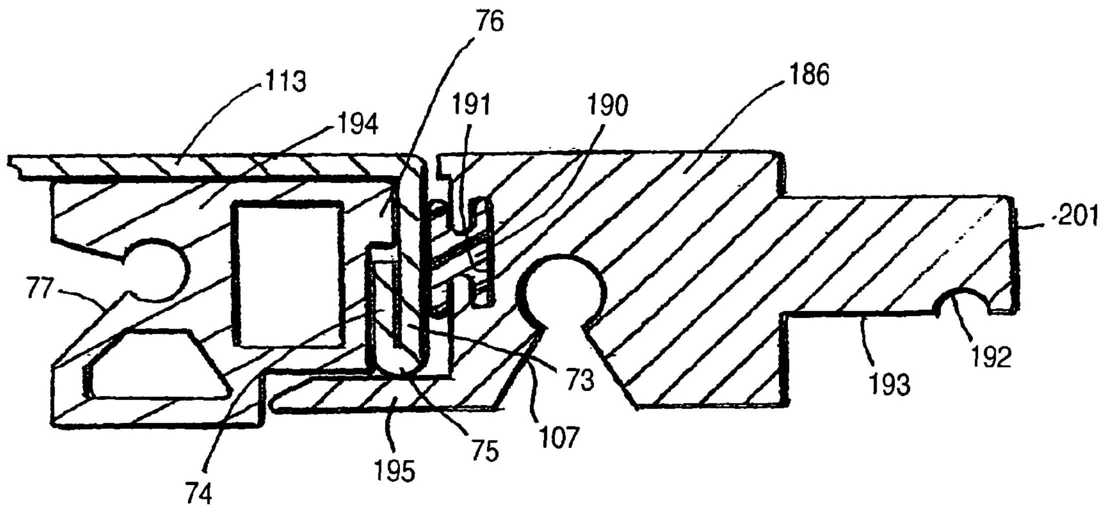
FIG. 47 is a cross-sectional view taken along line 47-47 of FIG. 46.
Figure 80:
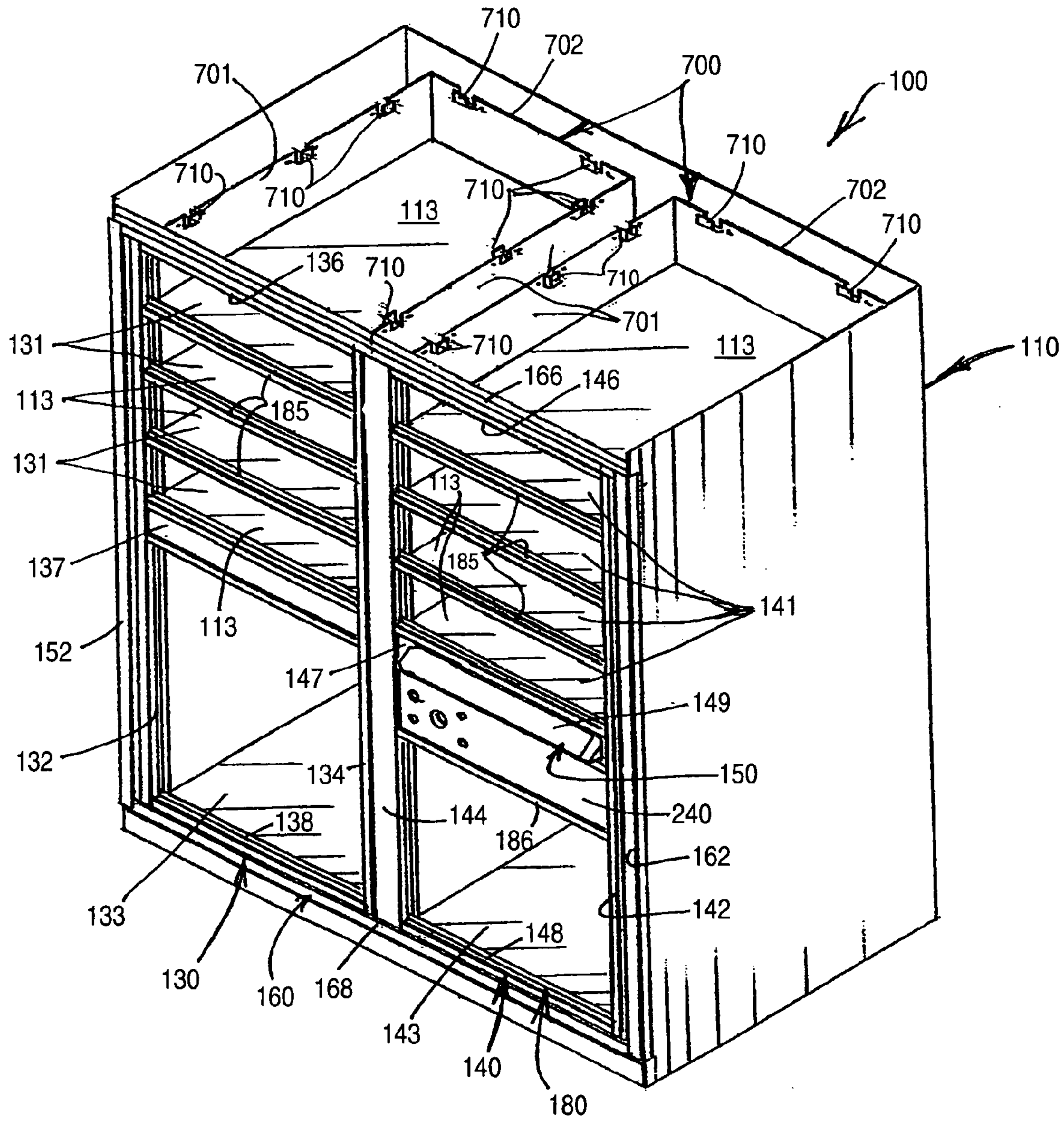
FIG. 80 is a perspective view showing front and right portions of the CBU of FIGS. 1-2 with the delivered mail compartment doors, the delivered parcel compartment doors and the top of the protective outer enclosure thereof removed to permit interior left and right shelved cabinet features of the CBU to be seen.

A feature unique to the lower zone bar 186, as seen in FIGS. 42, 46 and 47 is a rearwardly projecting formation 195 configured to extend into underlying relationship with front portions of one of the many shelves 113 that define the "floors" of the various delivered mail and outgoing mail compartments 131, 141, 145 (see FIGS. 9 and 80 wherein several of the shelves 113 are visible). The projecting formation 195 of a lower zone bar 186 is moved into underlying relationship with the front region of one of the shelves 113 when the associated master loading door (that carries the lower zone bar 186) is pivoted to its closed position.

When the projecting formation 195 of one of the lower zone bars 186 underlies a front of one of the compartment-floor-defining shelves 113, the engagement of the projecting formation 195 with portions of the front end region of the shelf 113 (or with a reinforcing bar that may be provided to stiffen the shelf front, such as the reinforcing bar 194 depicted in FIGS. 46 and 47) will help to maintain alignment of the bar 186 and the associated shelf 113, and may also help to maintain proper registry of components carried by the master loading doors with components carried by the cabinet structures of the cluster box units 100, 1100, 2100, 3100.

Engagement of any of a variety of rearwardly extending formations of the master loading doors 130, 140, 1130, 1140, 2130, 2140, 3130, 3140 with shelf front portions (for example as has just been described) also can be utilized to resist attempts to gain unauthorized access to one or more of the delivered mail or outgoing mail compartments of the CBUs 100, 1100, 2100, 3100 by forcing portions of one or more of the shelves 113 upwardly or downwardly—for example, attempts that sometimes are made by would-be thieves who try to pry upwardly one of the shelves 113 that overlies one of the delivered parcel compartments 133, 143 (depicted in FIGS. 9 and 80) in an effort to access one or more of the delivered mail compartments 131, 141.

One reason why forceful attempts sometimes are made to access the contents of delivered mail compartments by working through one of the delivered parcel compartments is that the doors to the delivered parcel compartments frequently are intentionally left "unlocked," and therefore can be opened at will—which gives would-be intruders access to lower regions of the interior of the cluster box units 100, 1100, 2100, 3100. To prevent such intrusions from succeeding, the shelves 113 that overlie the delivered parcel compartments 133, 143 of the cluster box unit 100 (and corresponding shelves of the cluster box units 1100, 2100, 3100 that overlie the delivered parcel compartments of the cluster box units 1100, 2100, 3100) preferably are securely connected to the side and rear walls 701, 702 of the cabinet structures 700 (see FIG. 80) as by rivets, by welding or other suitable fastening techniques that are not easily broken or disconnected.

Figure 81:
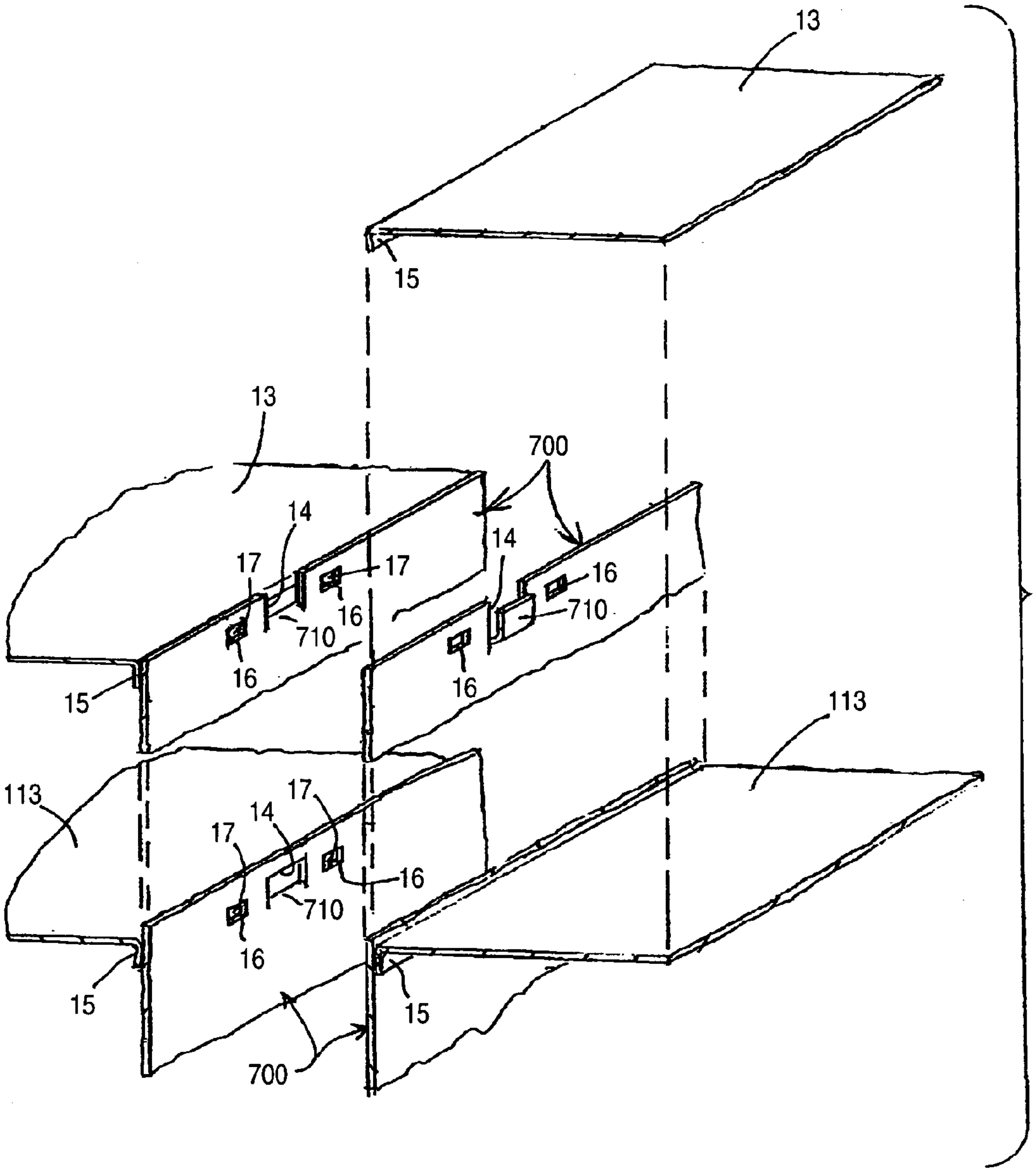
FIG. 81 is an exploded perspective view on an enlarged scale showing features of the left and right shelved cabinets of FIG. 80.

In preferred practice, all of the shelves 113 (including such ones of the shelves 113 as may be permanently fastened to the side and rear walls 701, 702 of the cabinet structures 700 as by riveting, welding or other fastening techniques), and a pair of top-most shelves 13 (FIG. 81) that overlie the uppermost delivered mail compartments 131, 141 are connected to the side and rear walls 701, 702 of the cabinet structures 700 by tab-like clips 710, best seen in FIGS. 80 and 81. The tab-like clips 710 are formed from the material of the side and back walls 701, 702 of the cabinet structures 700—material that is displaced when openings 14 (FIG. 81) are stamped through the side and back walls 701, 702 of the cabinet structures 700. The tab-like clips 710 project upwardly at locations spaced short distances inwardly from the side and back walls 701, 702—short distances that substantially equal the thicknesses of the material that defines the downwardly turned flanges 15 of the shelves 13, 113.

Referring to FIG. 81, located on opposite sides of each of the generally rectangular openings 14 are generally rectangular openings 16 that are smaller in size than the openings 14. To assist in holding the shelves 13, 113 in proper positions where the downwardly-turned flanges 15 are gripped and supported by the tab-like clips 710, convex projections 17 are formed on the flanges 15—projections that are configured to snap into the openings 16 when the shelf flanges 15 are properly engaged by the tab-like clips 710. The projections 17 can take any of a variety of configurations that are capable of snapping into and being retained within the openings 16 in a manner that will keep the shelves 13, 113 in place in the cabinet structures 700—configurations that render it difficult to lift the shelves 13, 113 out of engagement with the tab-like clips 710.

Referring to FIGS. 44-47 wherein front portions of one of the shelves 13, 113 are shown, it will be seen that the shelves 13, 113 have downwardly turned front flanges 73 that are reversely bent and turned back upwardly so that each of the flanges 73 has an associated upwardly extending reach of material 74 that is joined to the downwardly turned flange 73 by a smoothly rounded bottom formation 75 that permits a postal patron to grasp his or her deliveries from compartments located beneath the shelves 13, 113 without being scratched by sharp edges or burrs of the downwardly turned front flanges 73 of the shelves thereabove.

If a selected one of the shelves 13, 113 is provided with a reinforcing bar such as the reinforcing bar 194 depicted in FIGS. 46 and 47, the reinforcing bar 194 will help to hold the shelf 13, 113 in place both by giving the shelf additional strength to support a heavy load of compartment contents, and by reinforcing the shelf 13, 113 against being pried upwardly. A forwardly projecting portion 76 of the reinforcing bar 194 extends above the upwardly turned reach of material 74 toward a position of engagement with the backside of the downwardly turned flange 73, by which arrangement the reinforcing bar 194 is connected to the shelf front to resist upward prying of the shelf front.

The reinforcing bar 194 is supported by connecting its opposite end regions to side walls 701 of cabinet structures 700, which are best seen in FIG. 80. To assist in connecting opposite end regions of the reinforcing bar 194 to the side walls 701, the extrusion that forms the reinforcing bar 194 has a groove-like recess 77 that runs the full length of the reinforcing bar 194. The recess 77 has the same configuration as the groove-like recesses 107 provided in the extrusion-formed bars 136, 138, 146, 148, 185, 186 depicted in FIGS. 40-43—which is to say that the groove-like recess 77 has a rounded inward portion into which fasteners (preferably like the threaded fasteners 127 depicted in FIG. 20) can be threaded after passing through holes (not shown) formed through the cabinet structure side walls 701. When such fasteners are tightened in place, opposite end regions of the reinforcing bar 194 are securely connected to the associated cabinet structure 700 so the bar 194 can perform its intended function of supporting and rigidifying the front region of its associated shelf 13, 113.

Figure 82:
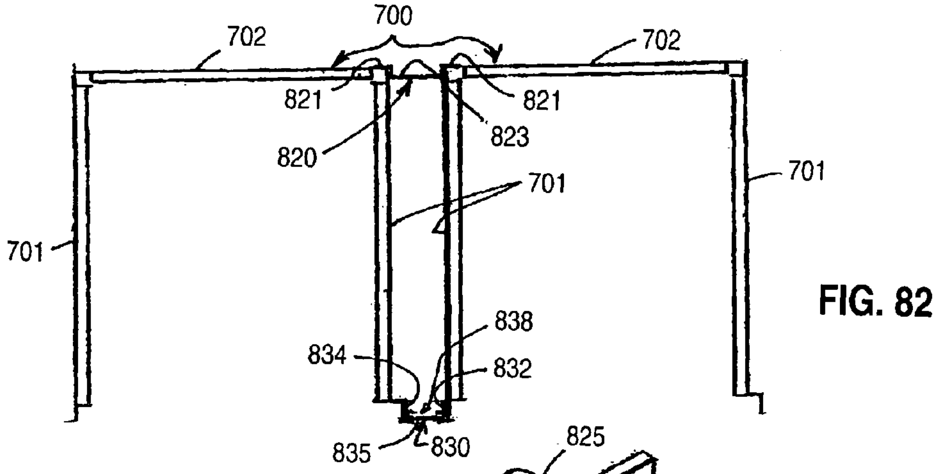
FIG. 82 is a top view of left and right shells of the shelved cabinets of FIG. 80, and showing front and rear connection members extending therebetween.
Figure 83:
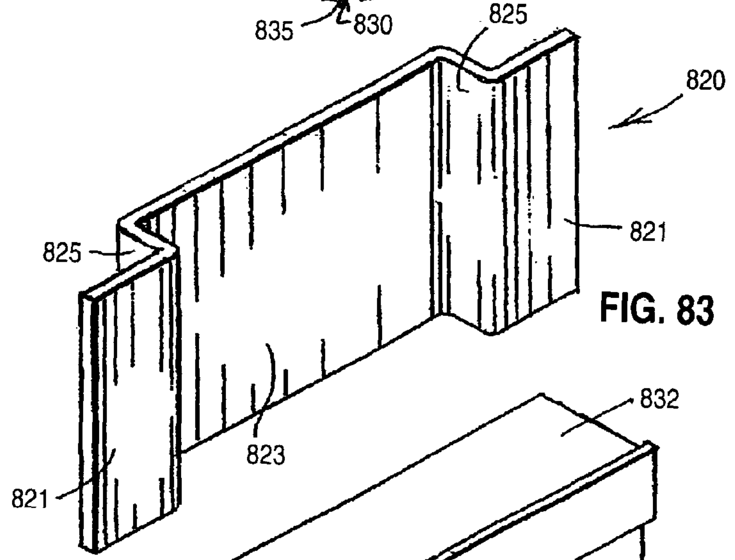
FIG. 83 is a perspective view, on an enlarged scale, of one of the rear connection members that extends between rear portions of the left and right shells.
Figure 84:
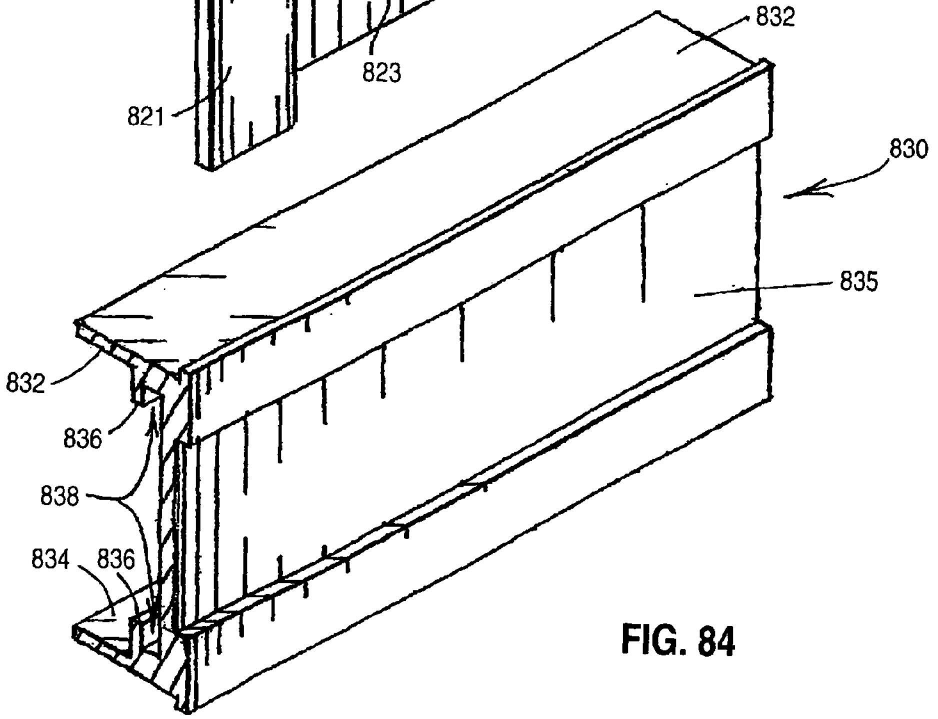
FIG. 84 is a perspective view, on an enlarged scale, of portions of a front connection member that extends between front portions of the left and right shells.
Figure 85:
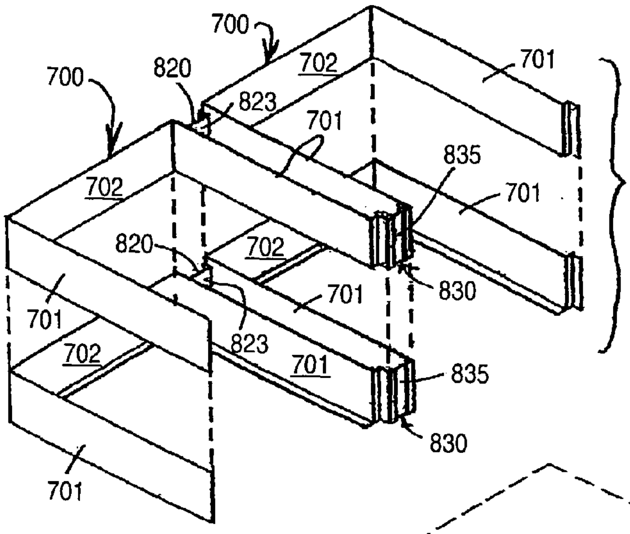
FIG. 85 is a perspective view of portions of upper and lower portions of the left and right shells coupled by the front and rear connection members.

Referring to FIGS. 80, 82 and 85, the cabinet structures 700 are substantially identical, one with the other, and are held in spaced, side-by-side relationship two or more identically configured rear connector brackets 820 (see FIG. 85), one of which is shown more clearly in FIG. 83, and by an upstanding extrusion 830 that has a substantially uniform cross-section along its length, a segment of which is depicted in FIG. 84. The full length of the extrusion 830 can be seen in FIG. 9. Segments of the extrusion 830 also are depicted in FIGS. 87 and 88.

Referring to FIG. 83, each of the rear connector brackets 820 has a pair of end regions that define substantially flat walls 821 that extend in one common plane, a central region that provides another substantially flat wall 823 that extends in another plane that parallels the first common plane of the flat walls 821, and a pair of transversely extending walls 825 that couple opposite ends of the flat wall 823 to the flat walls 821. As is best seen in FIG. 85, the connector brackets 820 are installed at vertically spaced locations where the flat walls 821 overlap and are rigidly connected to the rear walls 702 of the cabinet structures 700 (best seen in FIG. 82), and with the transversely extending walls 825 connected to rear portions of the side walls 701 of the cabinet structures.

Referring to FIG. 84, the extrusion 730 is of generally C-shaped cross-section, and includes right and left legs 832, 834 connected by a front wall 835. At locations spaced a short distance behind the front wall 835, a pair of opposed projections 836 extend toward each other. Defined between the projections 836 and the front wall 835 is a space that is utilized to slidably house a vertically extending, vertically movable, bar-like slide, portions of which are indicated by the numeral 840 in FIG. 87.

Figure 86:
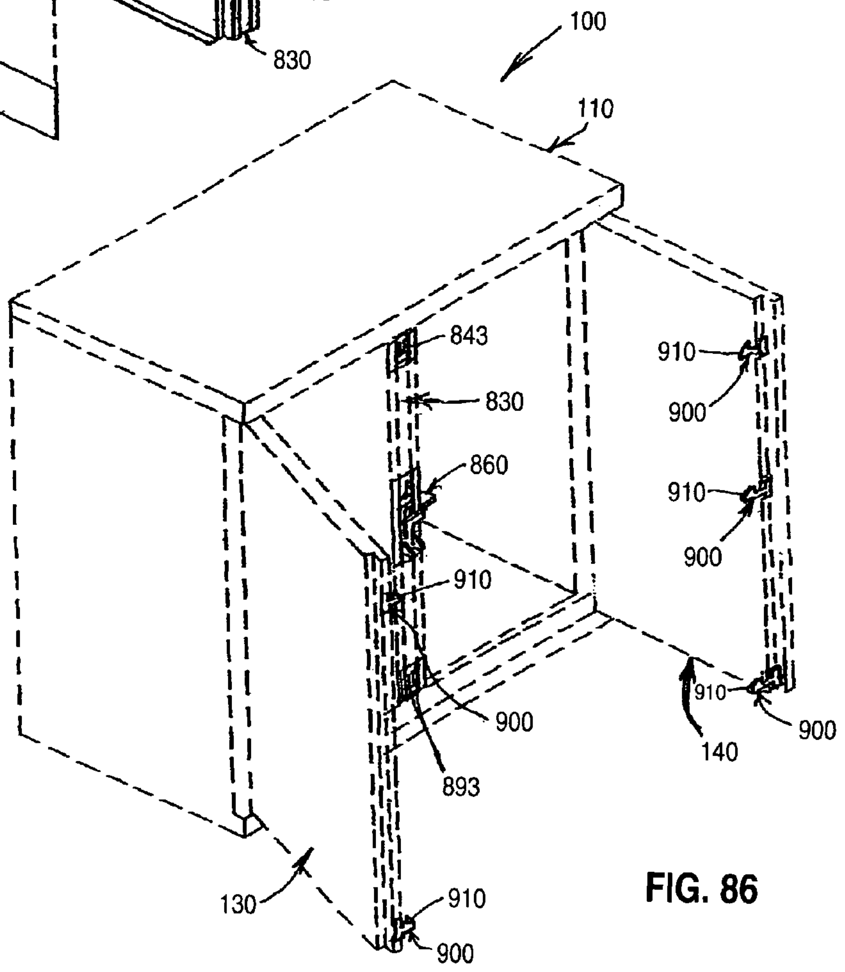
FIG. 86 is a perspective view showing in broken lines portions of the CBU of FIGS. 1-2, and in solid lines latching elements carried on the front connection member and on the master loading doors that cooperate to latch the master loading doors in closed position.
Figure 87:
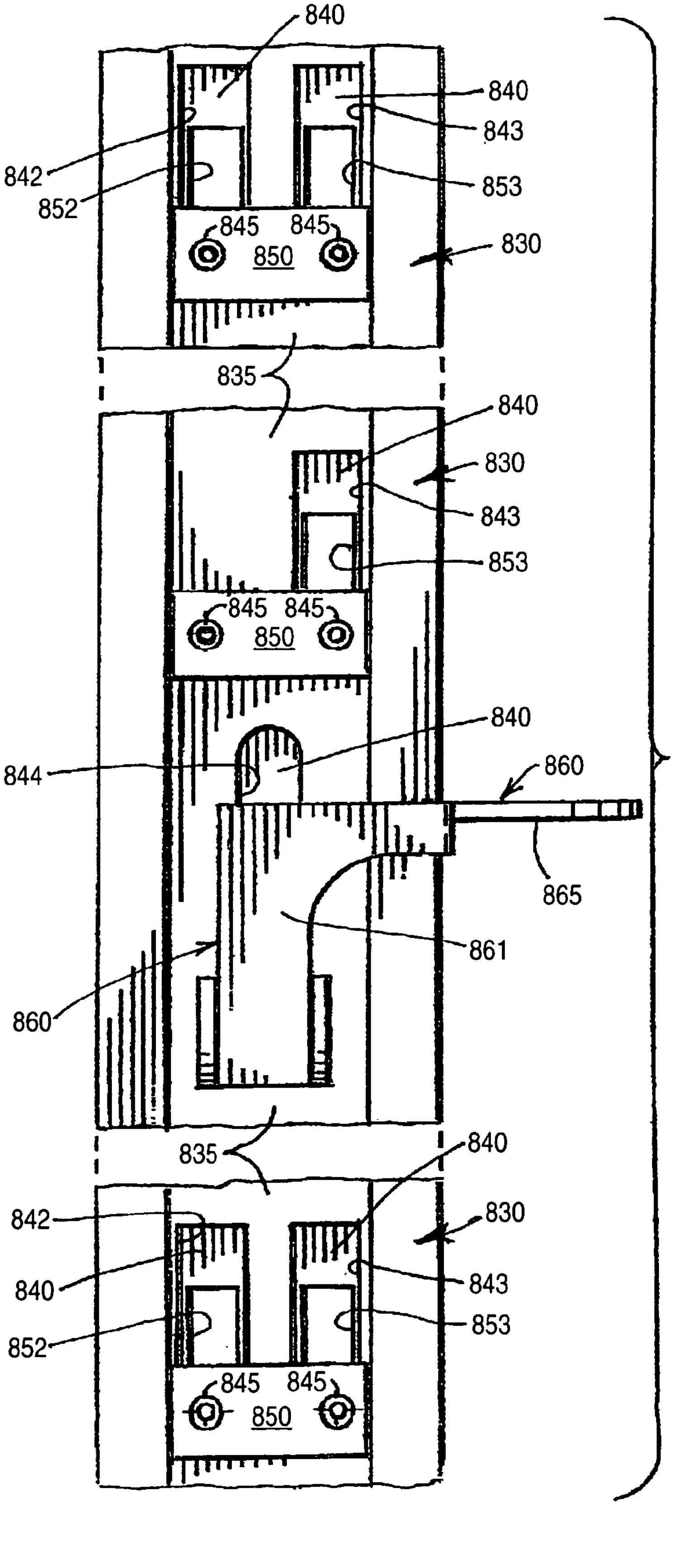
FIG. 87 is a front elevational view on an enlarged scale of latching elements of FIG. 86 that are carried on the front connection member.
Figure 88:
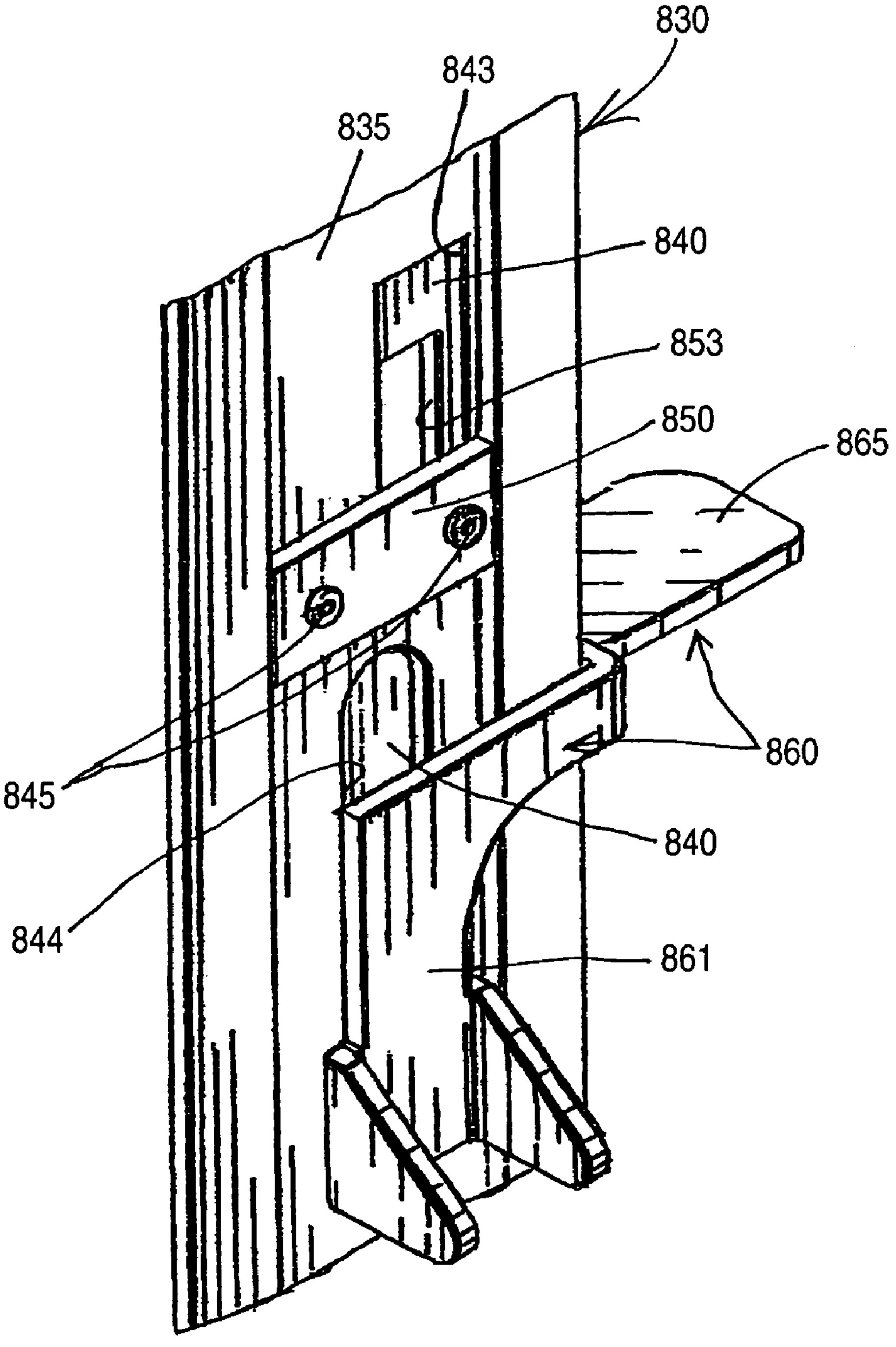
FIG. 88 is a perspective view showing central portions of the latching elements of FIG. 87.
Figure 89:
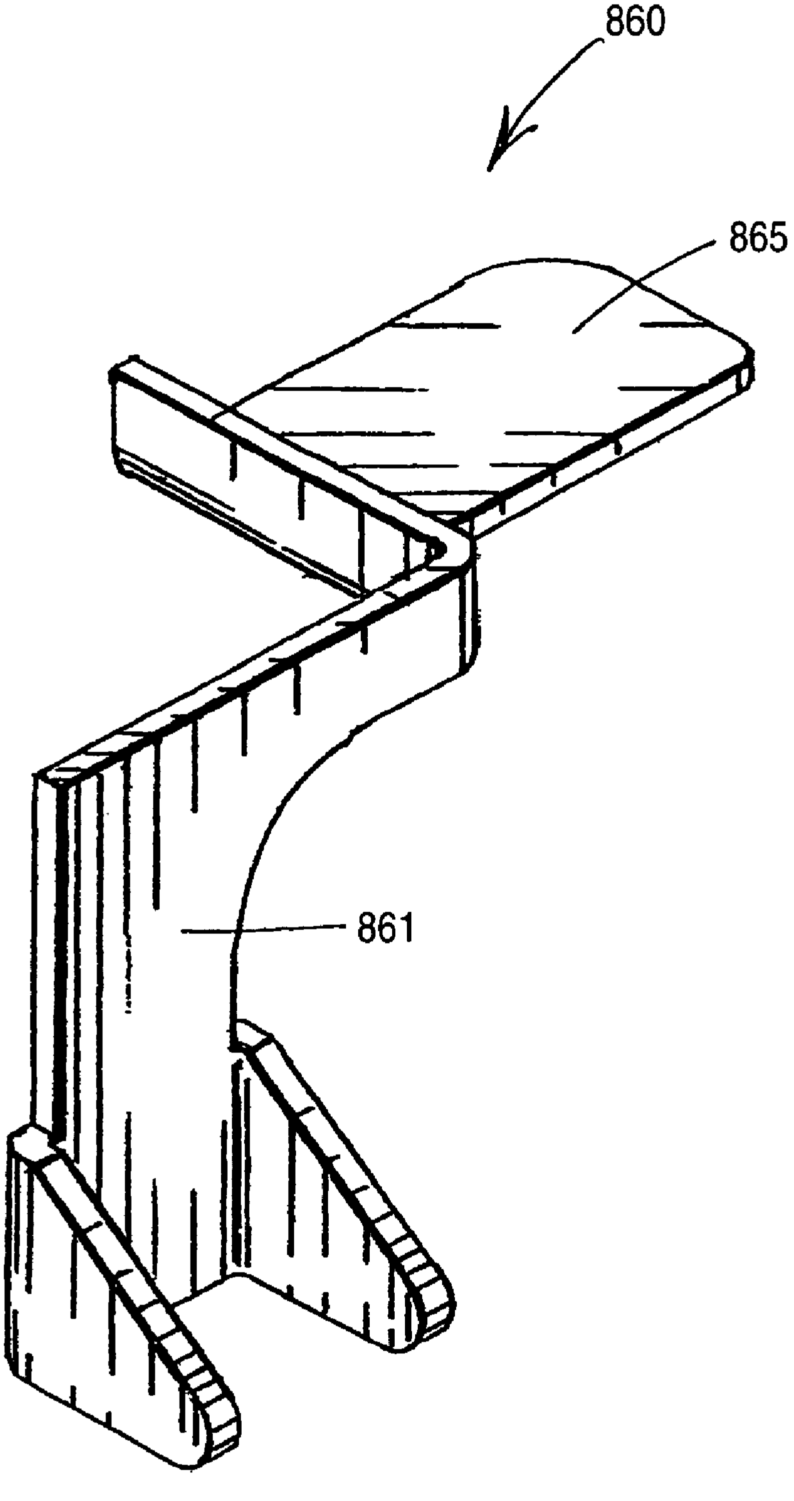
FIG. 89 is a perspective view showing one of the components of the latching elements of FIG. 88.

Referring to FIG. 87, several openings, indicated by numerals 842, 843 and 844, are formed through the front wall 835 of the extrusion 830—openings that permit portions of the bar-like slide 840 to be seen. Metal wear plates 850 are provided along bottom ends of the openings 842, 843 and are held in place by rivets 845 or other suitable fastener or fastening means. An operating handle 860, shown in FIGS. 86-89, has a front wall 861 that is connected by fasteners (not shown, that extends through the opening 844) to the slide 840 to provide a rightwardly extending finger-engageable handle formation 865 that can be grasped to manually raise the slide 840 for the purpose of causing the slide-defined openings 852, 853 (which openings are at least as tall as the openings 842, 843 that are formed through the front wall 835 of the extrusion 830) to more properly align with the openings 842, 843 so as to permit arrowhead latch formations 900 carried by the master loading doors 130, 140 (see FIGS. 9 and 86) to pass therethrough.

When the enlarged heads 910 of the arrowhead latch formations 900 have passed through the extrusion-defined openings 842, 843 and through the slide-defined openings 852, 853, the slide 840 drops back down (under the influence of the force of gravity) to a position where the slide-defined openings 852, 853 do not align sufficiently with the extrusion-defined openings 852, 853 to enable the enlarged heads 910 to move back out through the openings 852, 853. By this arrangement, the left and right master loading doors 130, 140 are latched closed.

In operation, to unlatch and open the master loading doors 130, 140, one must reach through an opening of the right master loading door 140 (namely the opening that normally is closed by the door-within-a-door element 240 that provides access to the outgoing mail compartment 145 depicted in FIG. 9) to grasp and raise the rightwardly projecting handle 865 to raise the slide 840 to a position wherein the extrusion-carried openings 842, 843 and the slide-carried openings 852, 853 align sufficiently to permit the enlarged heads 910 of the arrowhead latching formations 900 to pass back through the openings 842, 843, 852, 853 as the master loading doors 130, 140 pivot open about the axes 51, 52 (see FIG. 24)

Furthermore, to close and latch in closed position the master loading doors 130, 140, the left master loading door 130 is pivoted closed slightly ahead of the right master loading door 140 so that the centrally located uprights 134, 144 of the master loading doors 130, 140 will bring their hook-shaped formations 175, 177 into proper interengaging relationship, as depicted in FIG. 23. As the doors 130, 140 closely approach their fully closed positions, the arrowhead latching formations 900 pass through the openings 842, 843 of the central extrusion 730 (see FIG. 87) and into the openings 852, 853 of the slide 840. As tapered upwardly and rearwardly facing surfaces of the enlarged heads 910 of the latching formations 900 engage the material of the slide 840 located at the upper ends of the slide-defined openings 852, 853, continued closing movement of the doors 130, 140 causes the slide 840 to raise sufficiently into alignment with the extrusion-defined openings 842, 843 to permit the enlarged heads 910 to pass therethrough. Once the enlarged heads 910 have passed through the slide-defined openings 852, 853 during closing movement of the doors 130, 140, the slide 840 drops down (under the influence of the force of gravity) so as to block reverse movement of the enlarged heads 910, thereby latching the master loading doors 130, 140 in their closed positions.

Moreover, to lock the master loading doors 130, 140 in their closed position, the door 240 of the outgoing mail compartment 145 must be locked. The locking system for securing the outgoing mail compartment door 240 in its closed position includes a centrally located strike 950 mounted on the right side of the upstanding central extrusion 830 near the rightwardly extending portion 865 of the operating handle 860 (see FIG. 9), and a high security USPS lock 500 (see FIGS. 9, 67, 71, 72) installed on the back side of the outgoing mail compartment door 240 at a location just behind a bracket 960 that has an upper flange 966 which overlies the body 505 of the lock 500, a lower flange 968 that underlies the body 505 of the lock 500, and an end portion 962 spaced inwardly from the body 505 of the lock 500.

Figure 71:
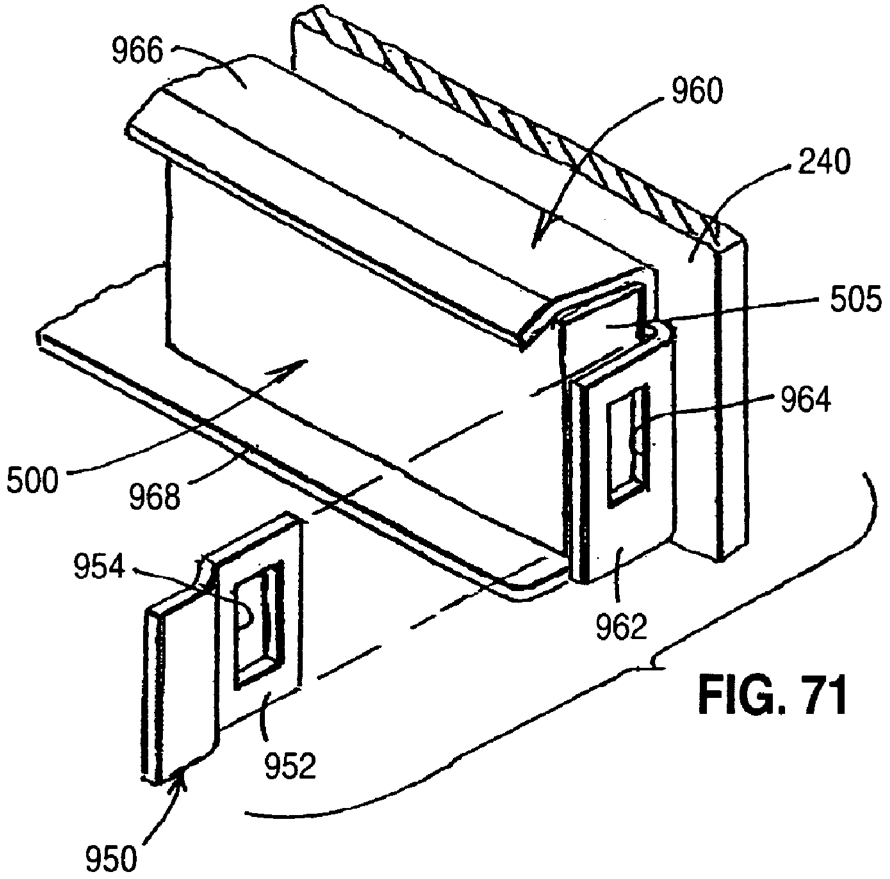
FIG. 71 is a perspective view showing rear, top and left end portions of FIG. 67, with the bolt of the door-carried lock retracted, and with a strike that can be engaged by the bolt of the door-carried lock spaced from the rear of the door, as occurs when the door is only slightly opened, or when the door is being pivoted toward a closed position.
Figure 72:
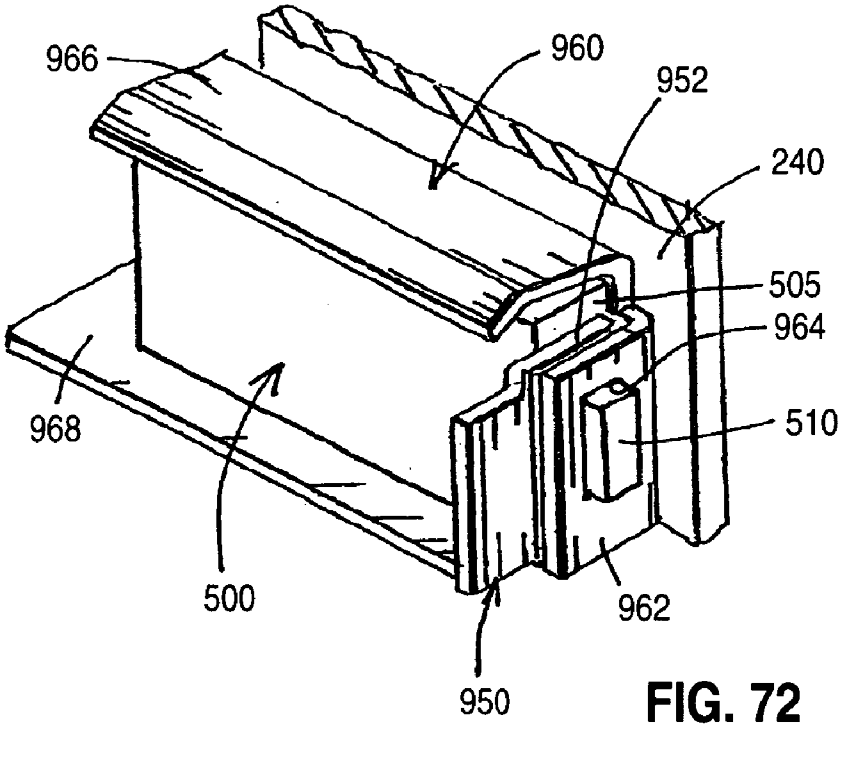
FIG. 72 is a perspective view similar to FIG. 71 but with the bolt of the door-carried lock extended through a receiving opening of the strike, as occurs when the door is locked in closed position.

Referring to FIGS. 71 and 72 where the strike 950 is shown most clearly, it will be seen that, as the outgoing mail compartment door 240 is pivoted closed (a partially open position of the door 240 is shown in FIG. 71, followed by FIG. 72 which shows a closed, locked position of the door 240), a forwardly-projecting end region 952 of the strike 950 is received between the body 505 of the lock 500 and the end portion 962 of the bracket 960. When the outgoing mail compartment door 240 is closed so that the forward end region 952 of the strike 950 is positioned as just described, an appropriately configured key (not shown) can be turned in the lock 500 to extend the bolt 510 of the lock through aligned openings 954, 964 of the forward end region 952 of the strike 950 and the end region 962 of the bracket 960 to securely lock the door 240 of the outgoing mail compartment 145 closed.

When the outgoing mail compartment door 240 is locked closed in the manner just described, the right master loading door 140 also is locked closed (i.e., the door 140 cannot be opened when the door 240 is locked in closed position against the framework 180 (FIG. 25) of the right master loading door); and, when the right master loading door 140 is locked closed, the left master loading door 130 also is locked closed (i.e., the left master loading door 130 cannot be opened when the upright 144 of the right master loading door 140 which overlies and blocks opening movement of the right upright 134 of the left master loading door 130, which blocked movement is depicted in FIG. 23 where the right door formation 170 overlies the left door formation 175).

The approach of latching closed the master loading doors of a cluster box unit by utilizing arrowhead latch formations 900 that pass through aligned openings of a slide mechanism and that are retained when the slide translates to prevent the arrowhead formations from passing back through the slide is known, as is evidenced by U.S. Pat. No. 5,794,844 issued Aug. 18, 1998, assigned to a subsidiary of the assignee of the present application. However, differences exist between the latching system of the present invention and the latching system disclosed in U.S. Pat. No. 5,794,844.

Referring to FIG. 87, one of several notable improvements and/or structural distinctions (offered by components of the latching system that releasably retains the master loading doors 130, 140 closed—features not found in the latching system of U.S. Pat. No. 5,794,844) is the provision of easily replaced wear plates 850 (preferably formed from steel, most preferably stainless steel) that are fastened by removable fasteners such as rivets 845 to central portions of the vertically extending central extrusion 830 (preferably formed from aluminum). The wear plates 850 underlie the extrusion-defined openings 842, 843 to provide upper edges that often will be engaged by bottom surfaces of the arrowhead latch formations 900 when the arrowhead latch formations move back and forth through the openings 842, 843 during opening and closing of the master loading doors 130, 140.

The hard, wear resistant upper surfaces of the wear plates 850 are not worn away (by bottom surfaces of the steel arrowhead formations 900 rubbing thereacross as the master loading doors 130, 140 open and close) nearly as quickly as would be the much softer material of the extrusion 830 (aluminum preferably is used to form the extrusion 830, hence aluminum is the material that defines the openings 842, 843). If the wear plates 850 deteriorate (due, for example, to repetitive engagement day-after-day as bottom surfaces of the arrowhead latch formations 900 rub across upwardly facing surfaces of the wear plates 850), the wear plates 850 can be quickly and easily replaced by drilling out or otherwise removing rivets 845 or other fasteners that hold the wear plates 850 in place on the extrusion 830, and by installing new wear plates 850 on the extrusion 830 by utilizing new rivets 845 or other suitable fasteners.

Another of the several improvements and/or structural distinctions offered by latching system components of the cluster box units 100, 1100, 2100, 3100 (in comparison with latching system features disclosed in U.S. Pat. No. 5,794,844) is the smoothly configured, well positioned operating member 860 and its rightwardly extending handle formation 865 that can be located easily when one reaches through the opening of the right master loading door 140 that normally is closed by the outgoing mail compartment door 240. The rightwardly extending handle formation 865 is located and configured so that it can easily be found when one inserts his or her hand through the door opening, but is located and configured so as to not obstruct the door opening should the USPS delivery person desire to remove mail through the door opening—mail that has accumulated in the outgoing mail compartment 145.

Still another feature is the location and configuration of the rightwardly extending handle formation 865 is that, when the right master loading door 140 and the outgoing mail compartment door 240 both are closed, the handle formation 865 projects beneath the upper flange 866 (seen in FIGS. 67-72) in a manner that enables the upper flange 866 of the bracket 860 to block the path of upward movement normally followed by the handle formation 865 when the handle formation is raised to elevate the slide 840 and release the arrowhead formations 900 from being retained in the openings 842, 843, 852, 853. By blocking the handle formation 865 from being raised, the overlying upper flange 866 of the bracket 860 effectively prevents the master loading doors 130, 140 from being unlatched at times when the outgoing mail compartment door 240 is closed and locked.

The delivered mail compartment doors 220 are normally kept closed and locked. Cam locks 920 (FIGS. 1, 2 and 48) that are mounted on each of the mail compartment doors 220 are operated by keys (not shown) which are maintained in the custody of postal patrons to whom the delivered mail compartments are assigned. The cam locks 920 (FIGS. 1, 2 and 48) may take the form of conventional, commercially available cam lock assemblies intended for use in turning cams between latched and unlatched positions—which typically involves about one-quarter, one-third or one-fifth of a revolution of turning movement. While conventional, relatively small, relatively thin cams of the type normally provided with cam lock assemblies by the manufacturers of cam lock assemblies may be used to engage suitably configured strike formations to hold the mail compartment doors 220 closed, in preferred practice, heavier-duty cams (that are thicker and larger in size than the relatively thin, relatively small cams normally provided with commercially available cam lock assemblies) are employed, such as the cam 922 depicted in FIGS. 54-57; or such as the cam 972 depicted in FIGS. 61 and 63-65.

Figure 48:
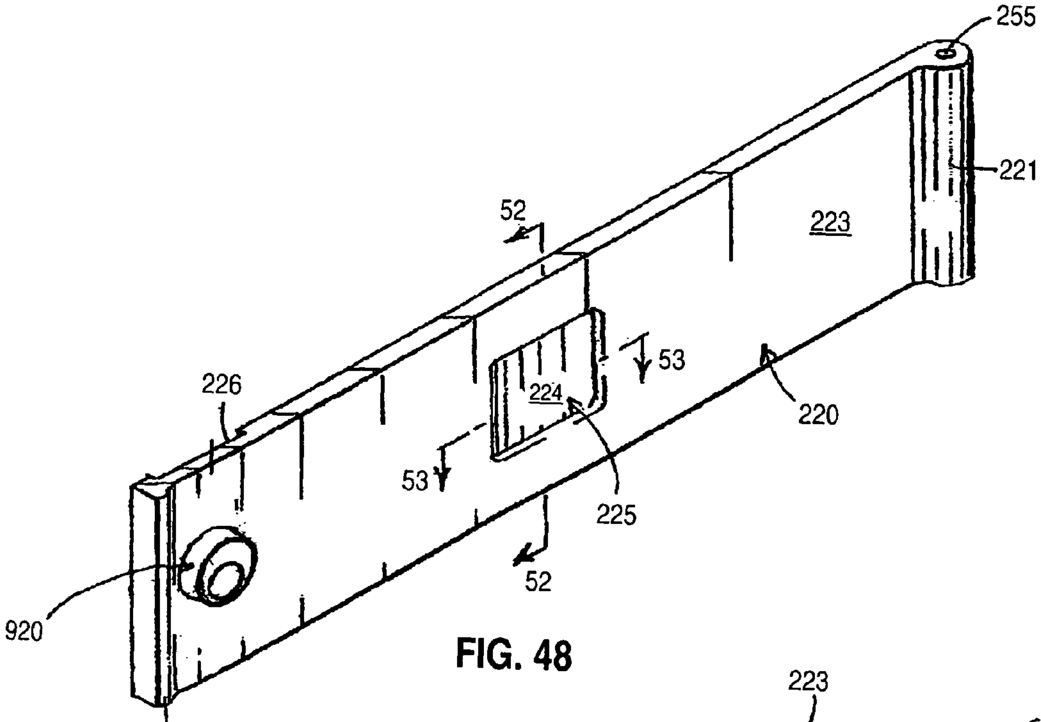
FIG. 48 is a perspective view showing portions of one of the delivered mail compartment doors that forms a door-within-a-door element of one of the left and right master loading doors of the CBU of FIGS. 1-2.
Figure 53:
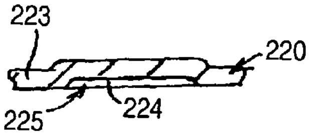
FIG. 53 is a cross-sectional view taken along line 53-53 of FIG. 48.
Figure 49:
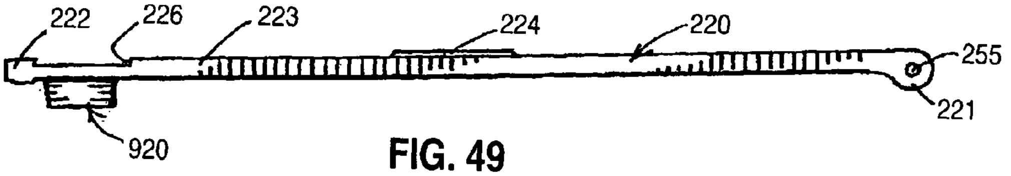
FIG. 49 is a top view of FIG. 48.
Figure 50:
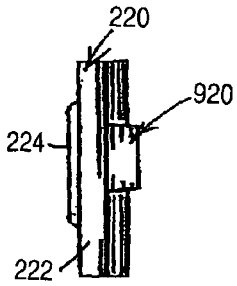
FIG. 50 is a left end view of FIG. 48.
Figure 51:
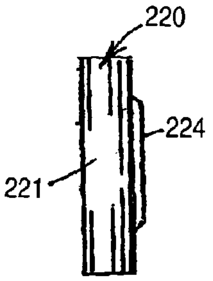
FIG. 51 is a right end view of FIG. 48.
Figure 52:
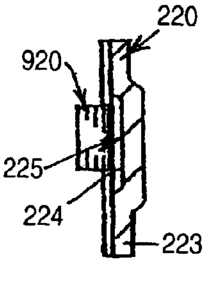
FIG. 52 is a cross-sectional view taken along line 52-52 of FIG. 48.
Figure 54:
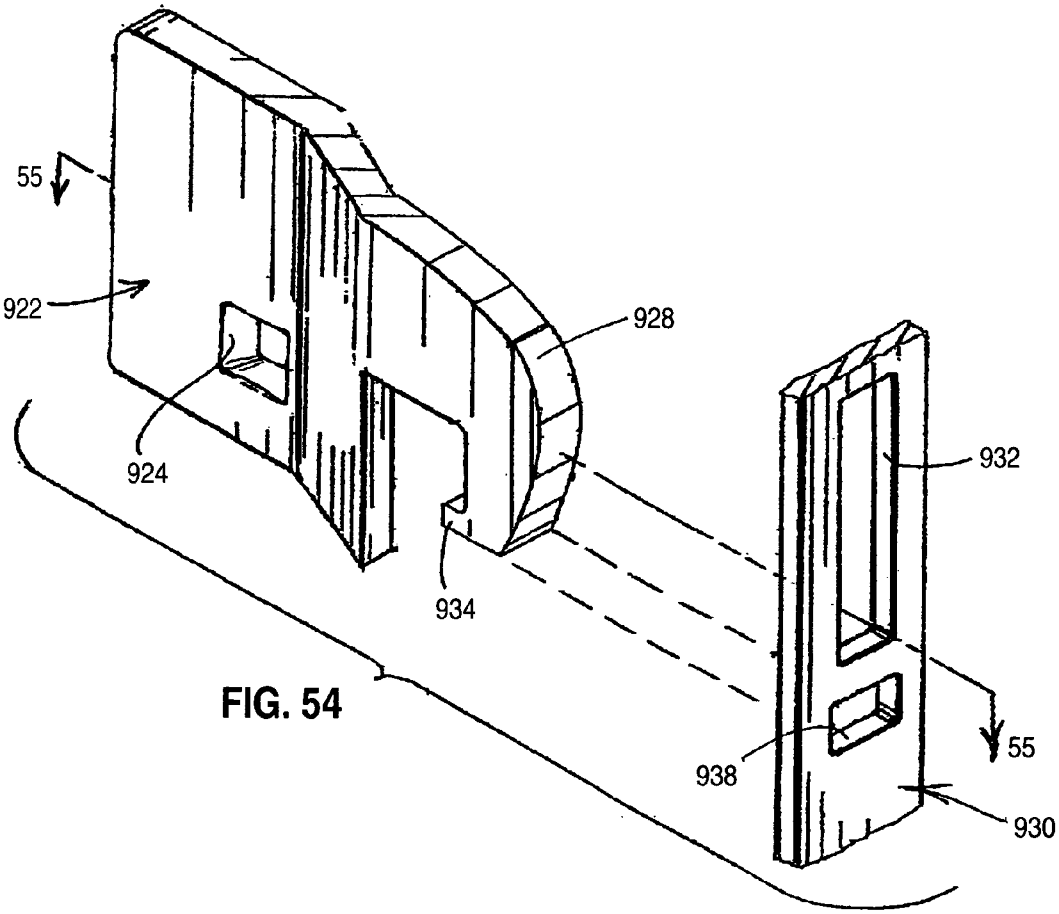
FIG. 54 is a perspective view on an enlarged scale of a cam lock cam and portions of a strike that can be engaged by the cam to lock in closed position one of the delivered mail compartment doors of the CBU of FIGS. 1-2.

Referring to FIGS. 54-57, the cam 922 preferably is formed from steel (most preferably stainless steel) and has a centrally located opening 924 that receives the rear end region of a key-turnable plug 926 (FIGS. 9 and 55-57) of the cam lock assembly 920 on which the cam 922 is mounted. The cam 922 can be pivoted by the key-turnable plug 926 about an axis 925 (FIGS. 55-57) of the plug 926 between an unlatched position depicted in FIG. 57 wherein a latching formation 928 of the cam 922 is withdrawn from engagement with a suitably configured strike 930, and a latched position depicted in FIG. 56 wherein the latching formation 928 engages the strike 930 so as to retain the delivered mail compartment door 220 (on which the cam lock assembly 920 is mounted, as shown in FIGS. 1, 2 and 48) in a closed, locked position (shown in FIGS. 1-8).

Figure 56:
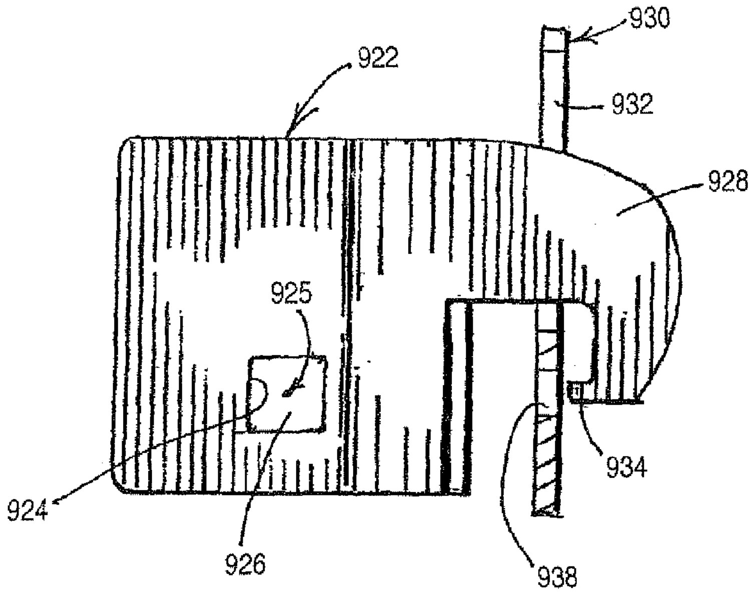
FIG. 56 is a side view of the cam and a cross-sectional view of the strike taken along line 56-56 of FIG. 55, but with latching portions of the cam extending through a elongate slot-like receiving opening of the strike, as the cam appears when pivoted to its latched position by a cam lock of a delivered mail compartment door.
Figure 57:
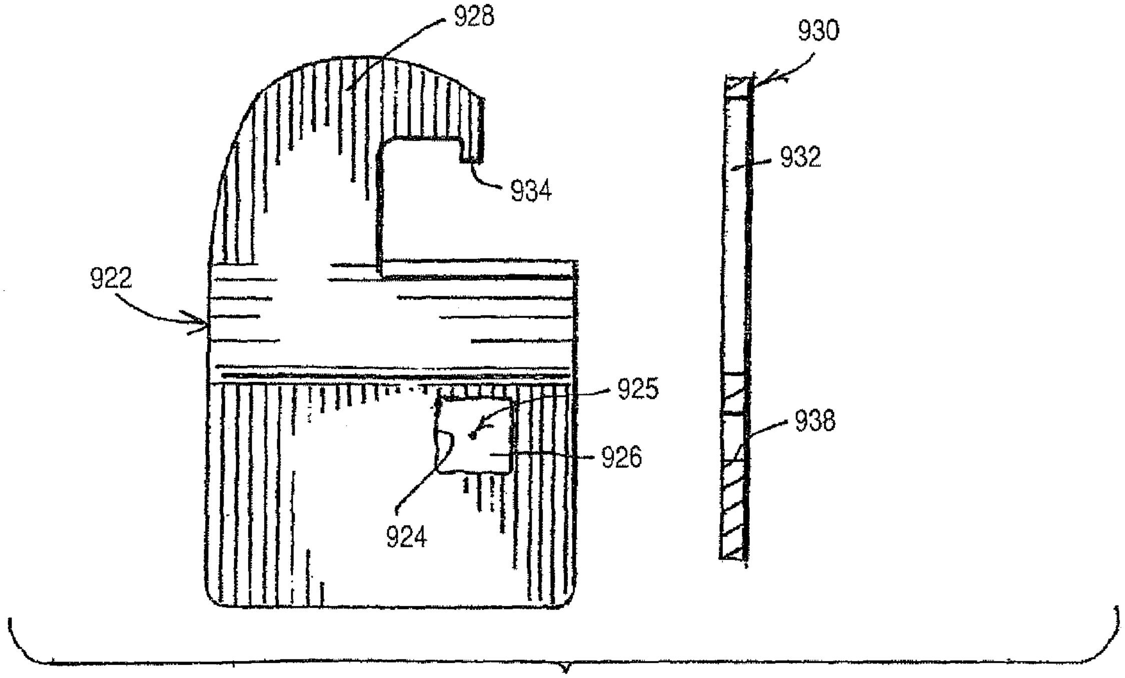
FIG. 57 is a view thereof similar to FIG. 56 but with the cam turned a quarter-turn to disengage the strike, as the cam appears when pivoted to its unlatched position by a cam lock of a delivered mail compartment door.

While the strike 930 may take any of a wide variety of conventional configurations, and while the latching formation 928 may take any of a wide variety of configurations offered by the cams that typically are provided by the manufacturers of cam lock assemblies, in preferred practice the latching formation 928 is of hook-shaped configuration and is positioned to extend through an elongate slot-like formation 932 of the strike 930 so that, when the cam 922 is in the latched position shown in FIG. 56, a reversely turned projecting element 934 of the hook-shaped latching formation 928 is positioned close to and in alignment with an opening 938 of the strike 930. By this arrangement, if the door 220 on which the cam lock assembly 920 is mounted is pried away from the strike 930 at a time when the cam 922 is in its latched position, the projecting element 934 of the latching formation 928 of the cam 922 will be drawn into the opening 938 to securely couple the cam-lock-carrying door 220 to the strike 930 to strongly resist attempts to defeat the action of the cam lock assembly 920 by prying the locked mail compartment door 220 open.

Cam lock assemblies 920 (FIGS. 1, 2 and 48) selected for use on the delivered mail compartment doors 220 preferably are of the type that have keys which can be removed only when the cams they carry are pivoted to their latched positions. Selecting cam lock assemblies that have only one key removal position (i.e., their key-turned plugs must position their cams in latched positions in order for the keys to be removed from their key-turned plugs) ensures that the delivered mail compartment doors 220 cannot be left unlocked when postal patrons remove their keys from the cam locks (unless, of course, a postal patron fails to properly close the door 220 to his or her delivered mail compartment 131, 141 when leaving the vicinity of the cluster box unit 100—however, this is unlikely inasmuch as the cam 922 will be seen to project from the end of the door 220, and the door 220 will be seen to project outwardly from the front plane of the collection box unit 100 if the cam 922 is turned to the locked position at a time when the door 220 is improperly closed).

Cam configurations, strike configurations and other features of the type just described are disclosed in greater detail in the above-referenced Rugged Cam Lock Cases, with still other features disclosed in the non-provisional application Ser. No. 10/879,570 entitled LINKAGE OPERATED CAM LOCK FOR A CLOSURE, filed Jun. 29, 2004, the disclosure of which is incorporated herein by reference.

Although the delivered mail compartment doors 220 are not normally provided with return springs to assist postal patrons in closing, and in maintaining closed, the doors 220, return springs can be provided, if desired. One possible approach to providing return springs on compartment doors of cluster box units is illustrated in FIGS. 59 and 60 in conjunction with the delivered parcel compartment doors 230.

Figure 59:
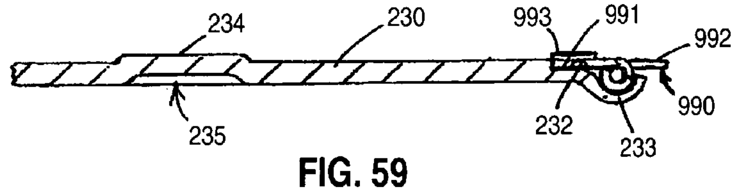
FIG. 59 is a cross-sectional view taken along line 59-59 of FIG. 58.
Figure 60:
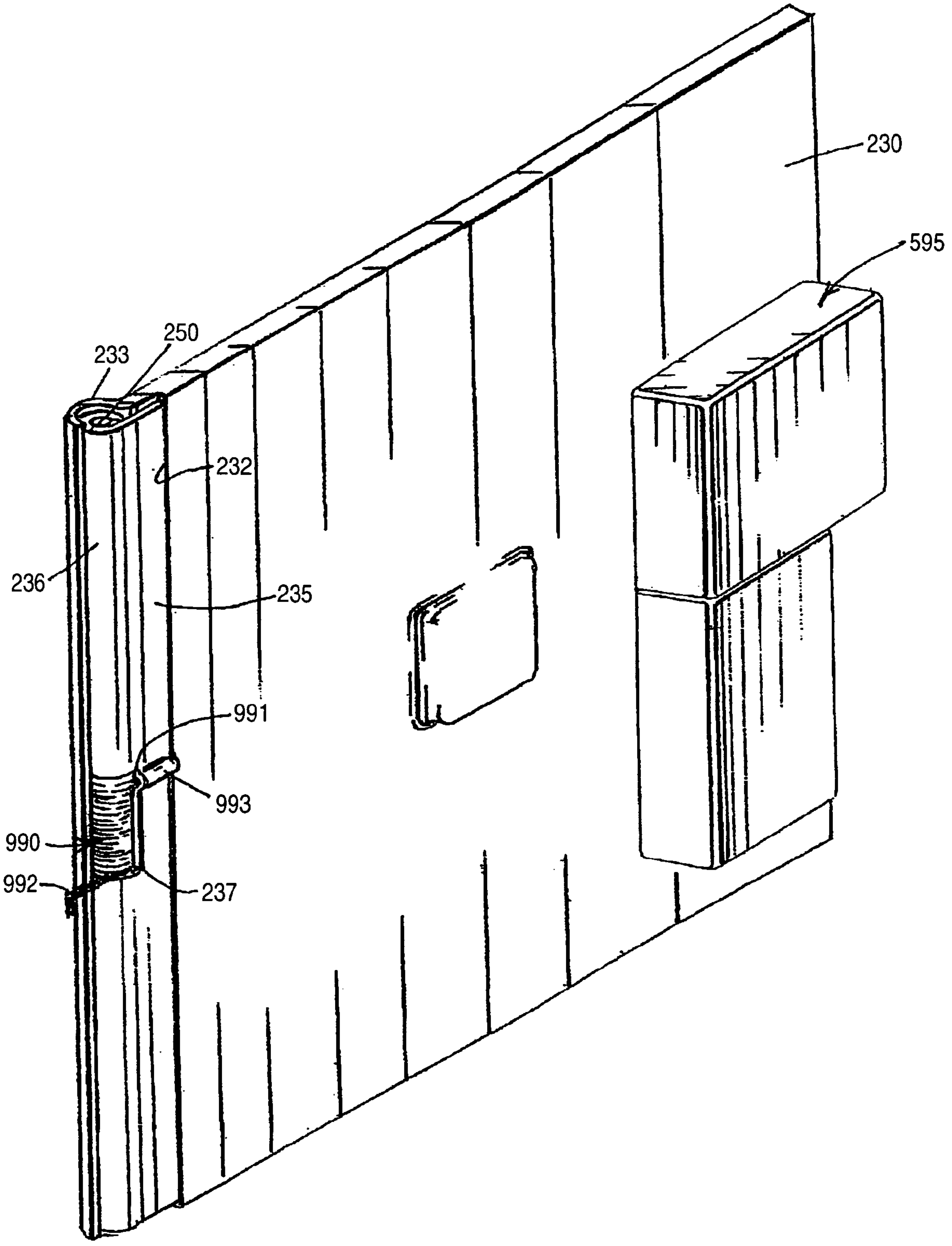
FIG. 60 is a perspective view showing rear and right portions of the larger of two delivered parcel compartment doors that forms a door-within-a-door element of one of the master loading doors of the CBU of FIGS. 1-2.

Turning to FIGS. 59 and 60, each of the delivered parcel compartment doors 230 is provided with a torsion return spring 990. The torsion return spring 990 has an upper end region 991 (best seen in FIG. 59) connected by an overlapping plate portion 993 to the parcel door 230, and a lower end region 992 that bears against a framework element of the associated master loading door, typically one of the uprights 132, 134, 142, 144. The torsion springs 990 bias the parcel doors 230 toward their closed positions—a biasing action that is needed inasmuch as the parcel compartment doors 230 normally are not locked, normally are openable at will, and might stand open (if not biased toward their closed positions) so as to admit moisture and unwanted debris into the associated parcel compartments.

Each of the delivered parcel compartment doors 230, 1230, 2230, 3230 is provided with a dual-lock, dual-key-operated locking system that permits the parcel door to be locked only by a USPS employee; and USPS employees lock a selected parcel compartment only when they insert into the selected parcel compartment a parcel that is too large to be inserted into the delivered mail compartment of the postal patron to whom the parcel is addressed.

Figure 58:
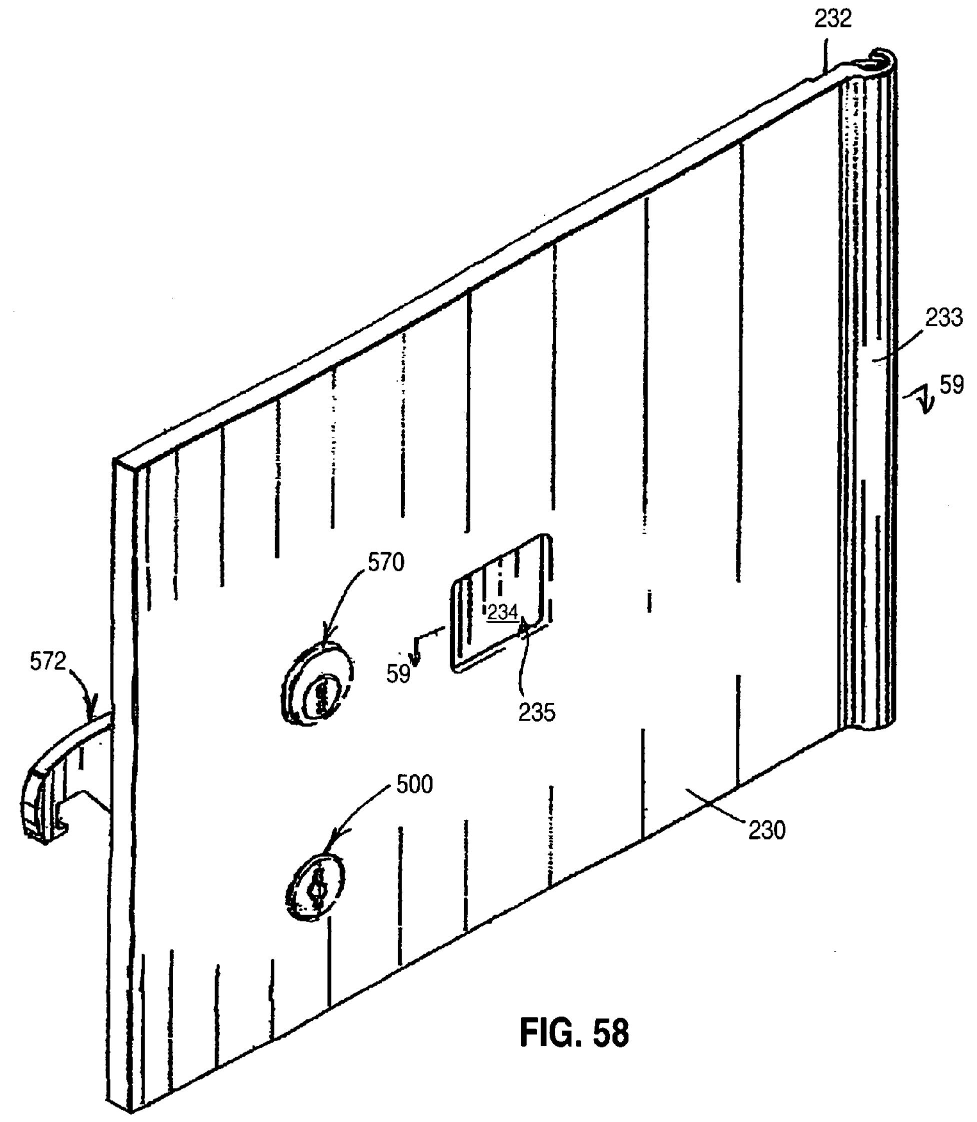
FIG. 58 is a perspective view showing front and left portions of the smaller of two delivered parcel compartment doors that forms a door-within-a-door element of one of the master loading doors of the CBU of FIGS. 1-2.
Figure 63:
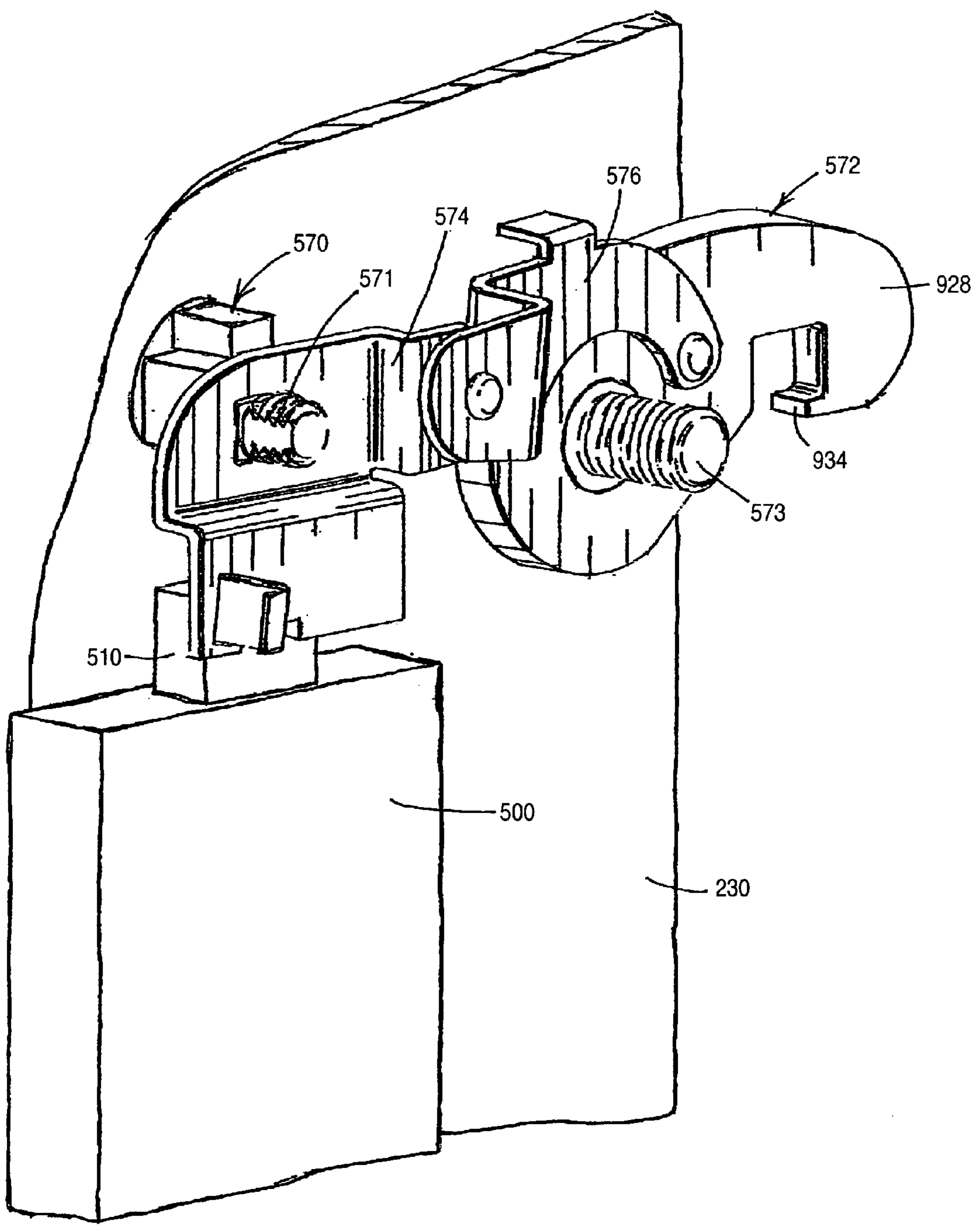
FIG. 63 is a perspective view of one embodiment of locking system for delivered parcel compartment doors, with a cam thereof pivoted to a latched position.
Figure 64:
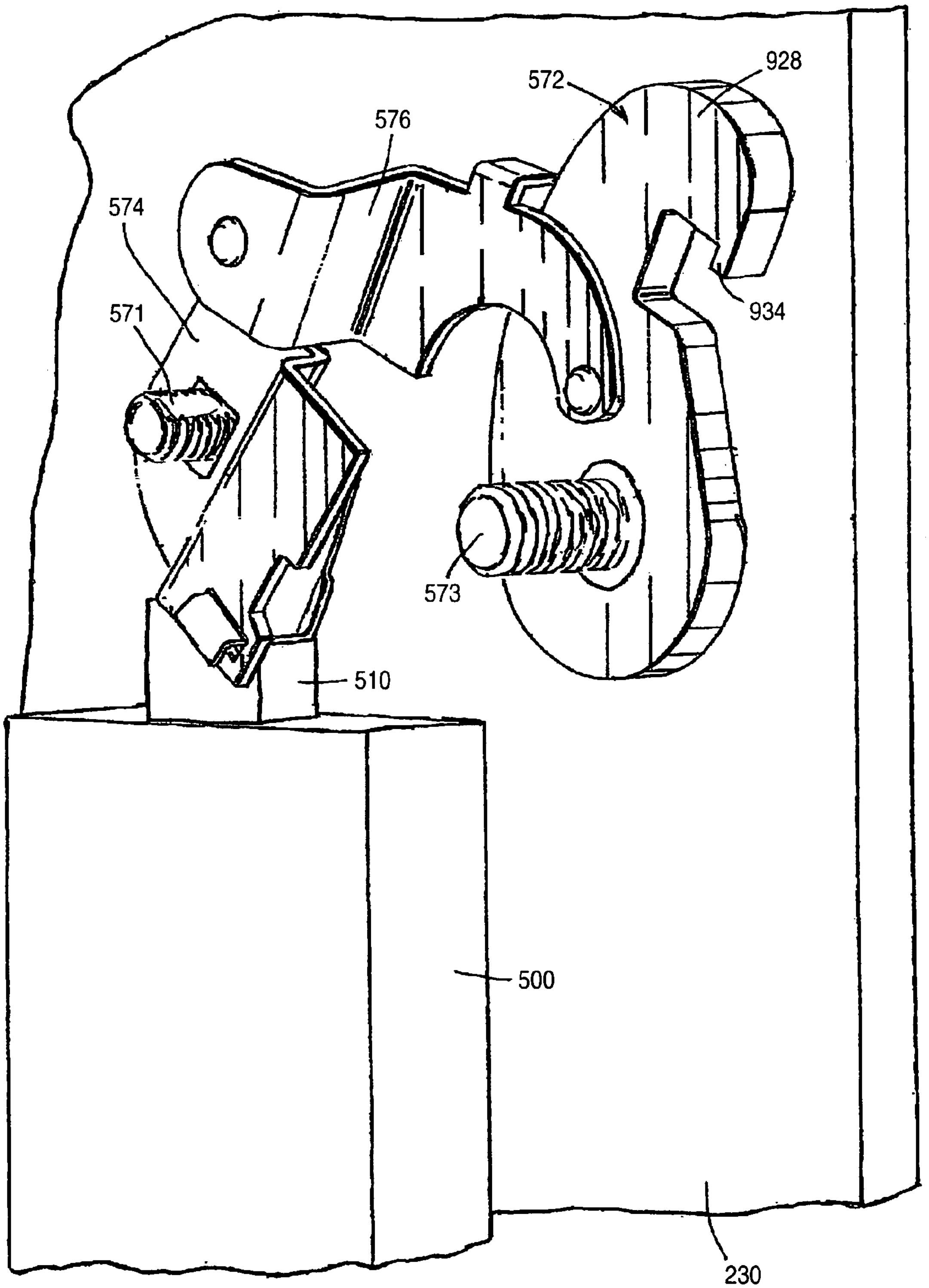
FIG. 64 is another perspective view thereof, but with cam thereof pivoted to an unlatched position.

Referring to FIGS. 58, 63 and 64, the dual-lock locking system installed on each parcel compartment door 230 includes a USPS installed high security lock 500 that can only be operated by a restricted access key kept continuously in the custody of USPS personnel, and a lower security cam lock assembly 570 (a commercially available cam lock) of the type that has a key-turnable plug 571, 4571 (see FIGS. 63-66) that will permit the key of the cam lock 570 to be removed from the key-turnable plug 571, 4571 only when the plug 571, 4571 is rotated to one particular angular orientation—namely a "door locked" orientation wherein a cam 572 or cams 4572 that is/are operated by the cam lock 570 is/are pivoted into engagement with a strike formation 930 (see FIGS. 65, 66) so as to lock the associated parcel compartment door 230 closed.

Thus, when a parcel compartment door 230 is closed and locked, the key of the cam lock 570 is removed from the cam lock 570 by the USPS employee who has inserted a parcel into the associated parcel compartment. The USPS employee then inserts the parcel compartment door key into the delivered mail compartment of the postal patron to whom the parcel is addressed, and the postal patron (upon finding the key) utilizes it to retrieve his or her parcel by unlocking and opening the associated parcel compartment door 230.

Figure 61:
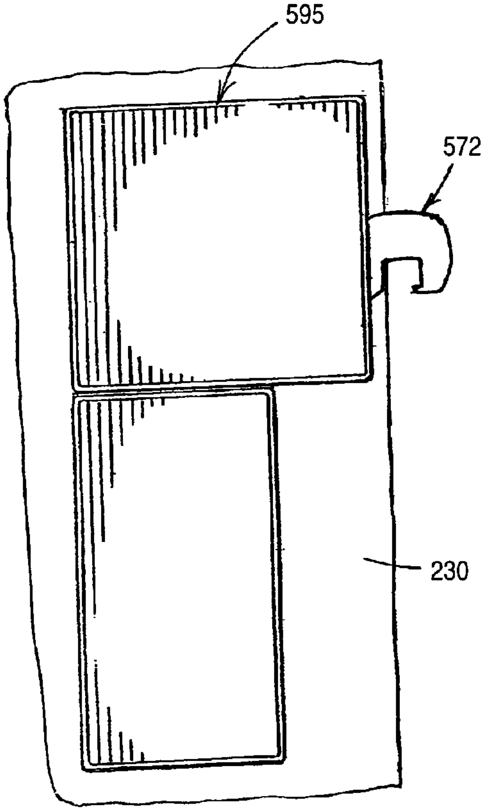
FIG. 61 is a rear elevational view of portions of a delivered parcel compartment door showing a guard assembly that may be used to protectively enclose components of one form of locking system for retaining the parcel door in closed position.

In operation, to lock one of the parcel compartment doors 230, a USPS employee inserts and turns a first key (namely a restricted access key that is maintained continuously in the custody of USPS personnel—usually the same key that is used by USPS personnel to operate the USPS installed high security lock 500 mounted on the outgoing mail compartment door 240) to operate the USPS high security lock 500 carried on the parcel compartment door 230. When the high security lock 500 is operated by a USPS employee, this releases the mechanism of the cam lock 570 so the key of the cam lock 570 can be turned to pivot a cam 572 (FIG. 61) from an unlatched position (where the cam 572 is retracted into a guard assembly 595 carried on the back side of the parcel door 230, as depicted in FIGS. 60 and 61; or where the cams 4572 are retracted into a guard assembly 4595, depicted in FIG. 62) to the latched position depicted in FIGS. 61, 62 to lock the associated parcel compartment door 230.

Once the parcel compartment door 230 is locked, the keys of both of the locks 500, 570 are removed. The key to the USPS high security lock 500 is retained by USPS personnel. The key to the lower security cam lock 570 is deposited by USPS personnel in the delivered mail compartment of the postal patron who needs to open the parcel compartment to collect his or her parcel.

Once the postal patron inserts and turns the key (that he or she finds in his or her delivered mail compartment) in the cam lock 570 of the parcel compartment door 230, the high security USPS lock 500 prevents the lower security cam lock 570 from re-locking the parcel compartment door 230, and the key of the lower security cam lock 570 (which has been turned by the postal patron to an unlocked position) is retained in the cam lock 570 until a USPS employee next takes action to relock the parcel compartment door 230 because he or she has delivered a new parcel into the associated parcel compartment 133, 143. The dual-key, dual-locking system used on the parcel compartment doors 230 is (in the manner just described) put through one cycle of operation after another as new parcels (too big to be inserted into the delivered mail compartments 131, 141 of the postal patrons to whom the parcels are addressed) are, from time to time, delivered to the parcel compartments 133, 143 and retrieved by the postal patrons to whom the parcels are addressed.

One form of a dual-key, dual-locking system for parcel compartment doors is disclosed in U.S. Pat. No. 4,865,248 issued Sep. 12, 1989, the disclosure of which is incorporated herein by reference. A more preferred form of a dual-key, dual-locking system for use with the parcel compartment doors 230 is disclosed in the referenced non-provisional application Ser. No. 10/879,570 entitled LINKAGE OPERATED CAM LOCK FOR A CLOSURE, filed Jun. 29, 2004, the disclosure of which is incorporated herein by reference.

Figure 62:
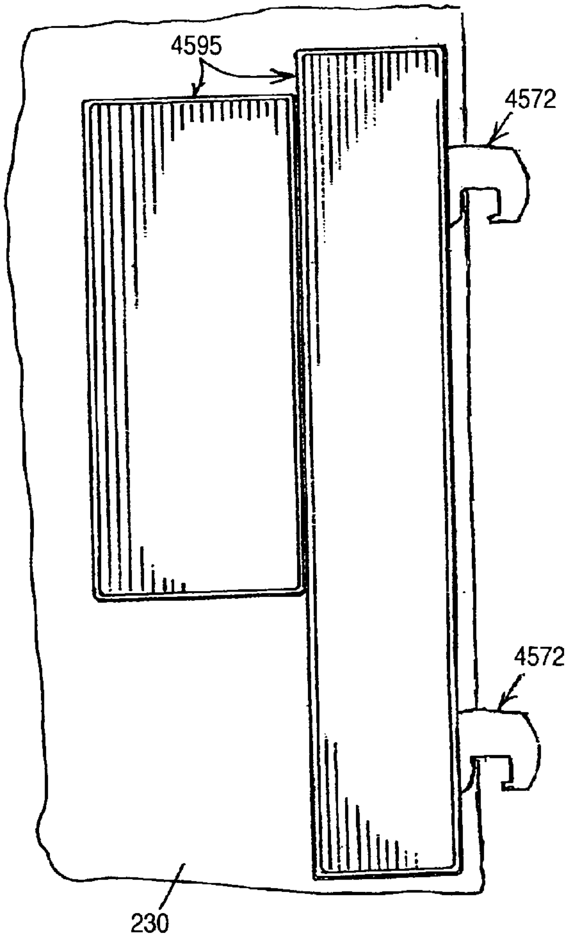
FIG. 62 is a rear elevational view of portions of a delivered parcel compartment door showing a different guard assembly that may be used to protectively enclose components of another form of locking system for retaining the parcel door in closed position.
Figure 65:
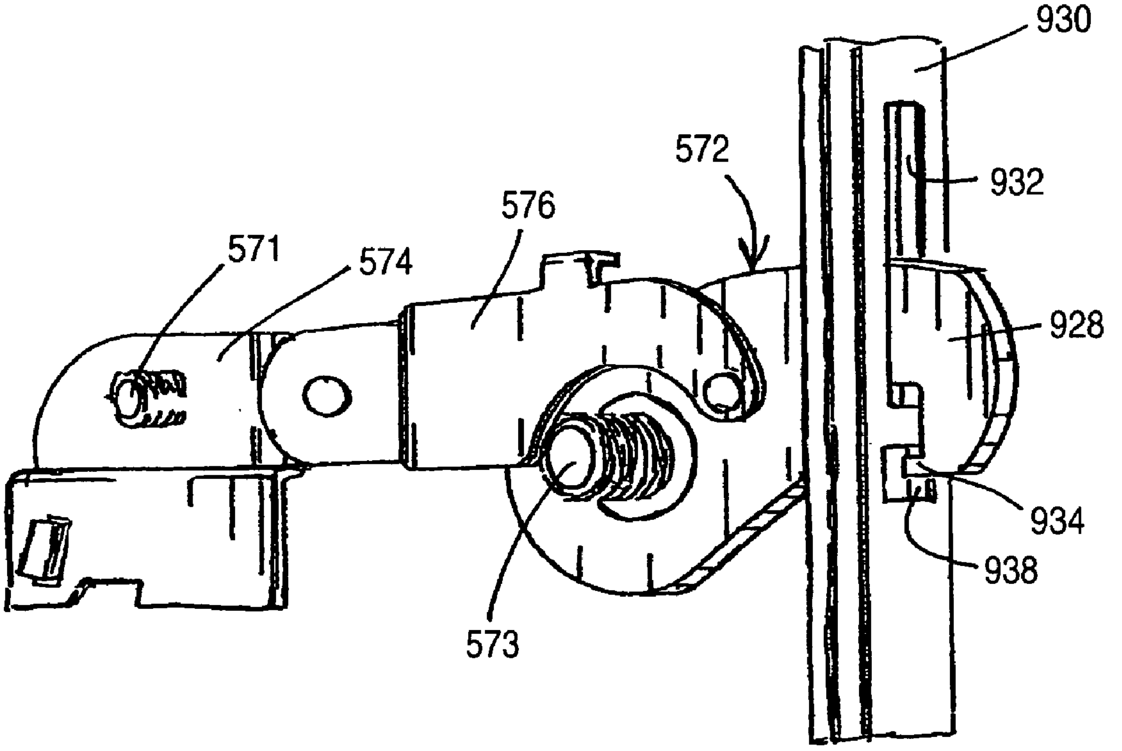
FIG. 65 is yet another perspective view thereof, with the cam pivoted to a latched position wherein latching portions of the cam extend through an elongate slot-like receiving formation of a strike.
Figure 66:
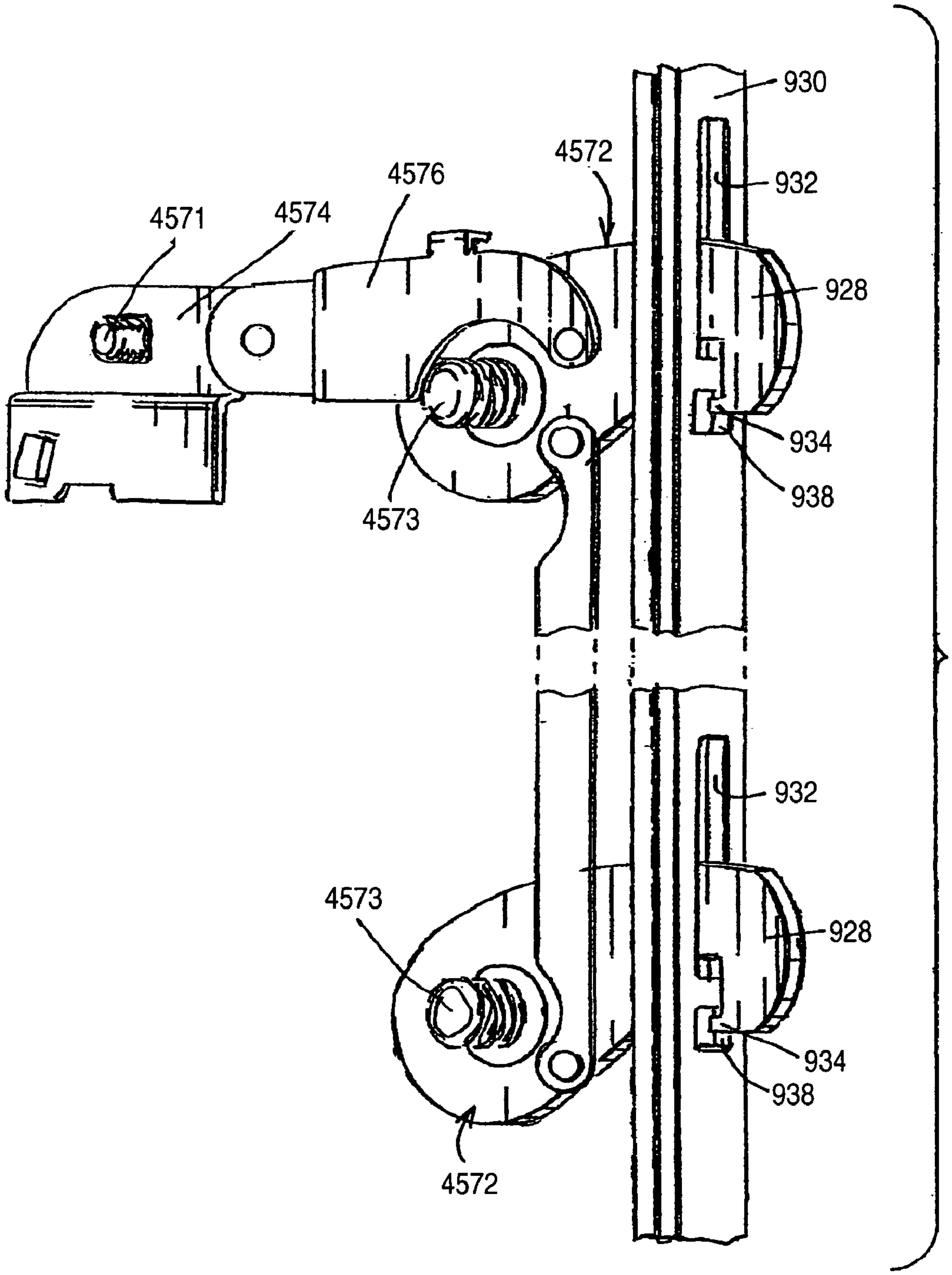
FIG. 66 is a perspective view similar to FIG. 65 showing an alternate form of locking system for delivered parcel compartment doors, with a pair of linkage connected cams thereof pivoted to latched positions wherein latching portions of the cams extend through elongate slot-like receiving formations of a strike.
Figure 67:
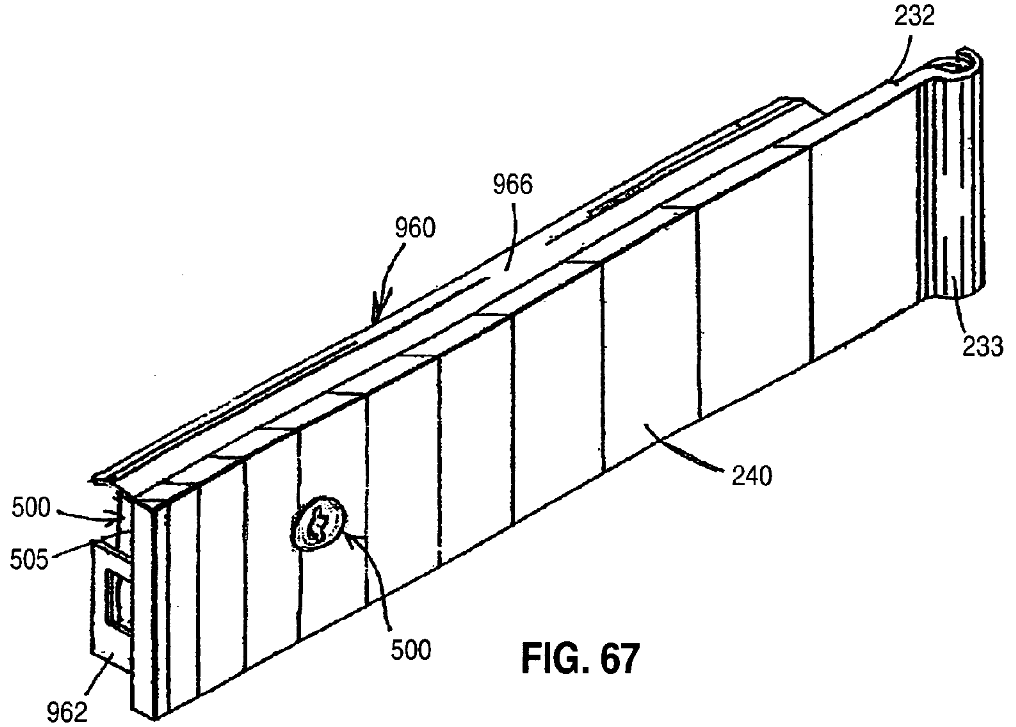
FIG. 67 is a perspective view showing front, top and left end portions of an outgoing mail compartment door which serves as a door-within-a-door element of the right master loading door of the CBU of FIGS. 1-2, with a bolt of a USPS lock mounted on the back of the door retracted.
Figure 68:
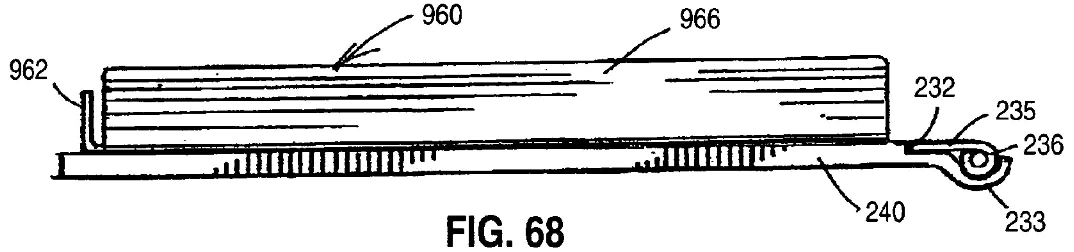
FIG. 68 is a top view of FIG. 67.
Figure 69:
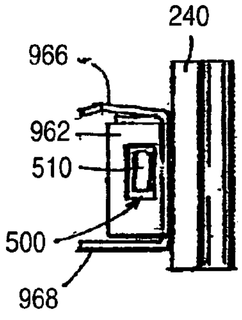
FIG. 69 is a left end view of FIG. 67.
Figure 70:
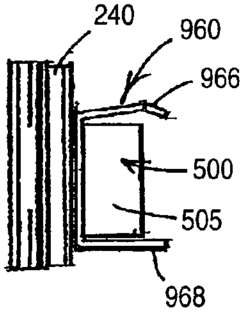
FIG. 70 is a right end view of FIG. 67.

Among the types of dual-key, dual-locking system features are linkage operated single-cam locking systems of the type depicted in FIGS. 61 and 63-65 hereof, and linkage operated plural-cam locking systems of the type depicted in FIGS. 62 and 66 hereof. To provide a quick overview of these linkage operated cam locking systems, reference is made to FIGS. 63-65 where a single cam 572 is shown, and to FIG. 66 wherein plural cams 4572 are shown. The cams 572, 4572 are mounted on door-carried, post-like pedestals 573, 4573 to pivot between latched positions shown in FIGS. 63, 65 and 66, and an unlatched position shown in FIG. 64. Pivoting of the cams 572, 4572 between the depicted latched and unlatched positions is caused by pivotal movement of operating arms 574, 4574 carried on the key-turned plugs 571, 4571 of associated cam lock assemblies (for example, the cam lock 570 that is depicted in FIGS. 58 and 63).

Referring to FIGS. 65 and 66, it will be seen that the cams 572, 4572 (like the cam 928 depicted in FIGS. 54-57) have latching portions 928 that, when in the depicted latched positions of the cams 572, 4572, preferably extend through elongate slot-like receiving formations 932 of the strikes 930. When in the depicted latched positions shown in FIGS. 65 and 66, reversely turned projections 934 of the cams 572, 4572 reside close to and in alignment with openings 938 formed through the strikes 930 so that, if the parcel compartment doors 230 on which the cams 572, 4572 are supported are pried away from the depicted strikes 930, the projections 934 will be drawn into the openings 938 to aid in securely holding the parcel compartment doors 230 closed.

The operating arms 574, 4574 pivot between normal positions depicted in FIGS. 63, 65 and 66, and an operated position shown in FIG. 64 to cause links 576, 4576 (that couple the operating arms 574, 4574 to the cams 572, 4572) to pivot the cam 572 or the link interconnected cams 4572 between their latched positions shown in FIGS. 63, 65 and 66, and an unlatched position shown in FIG. 64. The operating arms 574, 4574 carry spring members 577, 4577 that interact with the retractable-extensible latch bolts 510 of the associated USPS installed high security locks 500 to control when the operating arms 574, 4574 can pivot from their operated positions (shown typically in FIG. 64) to their normal, non-operated positions (shown in FIGS. 63, 65 and 66) to pivot the cam 572 or cams 4572 from their unlatched positions (one of which is shown in FIG. 64) to their latched positions (shown in FIGS. 63, 65 and 66). Structural features that may be utilized in single and/or plural cam locking systems of this general type are shown in FIGS. 65-66 accordingly.

Figure 73:
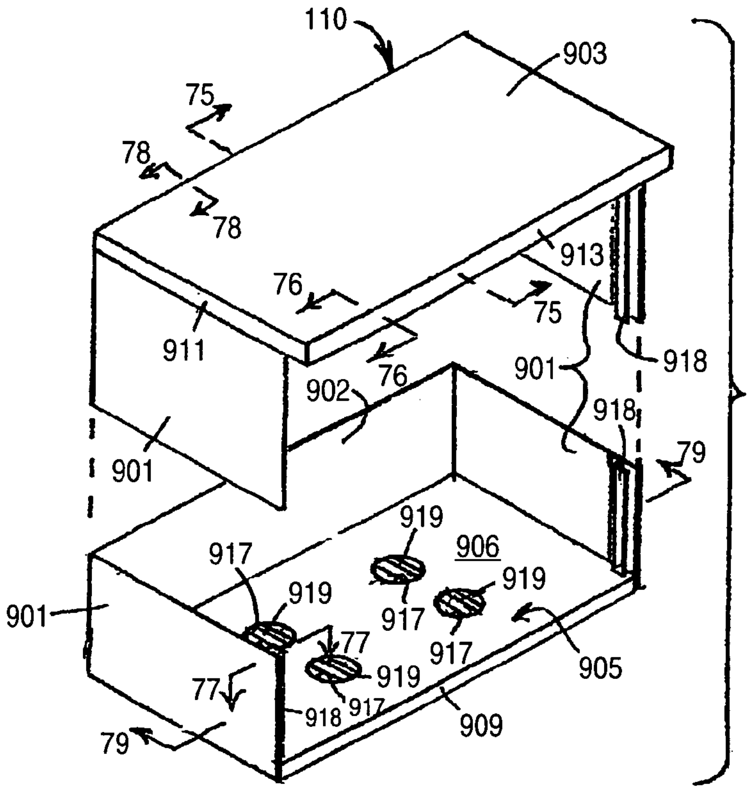
FIG. 73 is a perspective view showing front, top and left side portions of a protective outer enclosure of the CBU of FIGS. 1-2.
Figure 74:
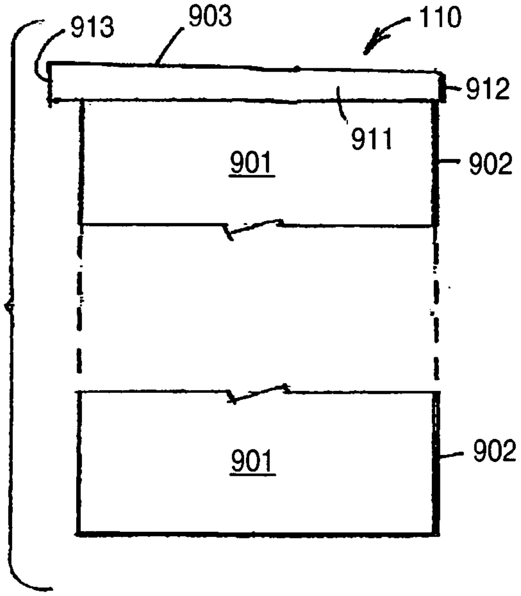
FIG. 74 is a right side view of FIG. 73.
Figure 75:
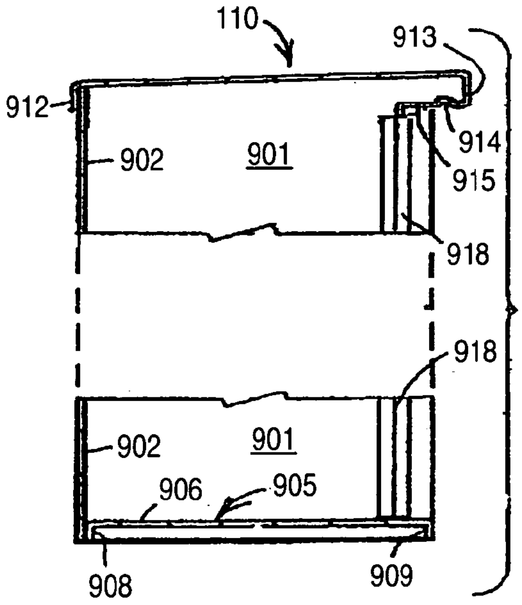
FIG. 75 is a cross-sectional view taken along line 75-75 of FIG. 73.

The protective outer enclosure 110 that houses, surrounds and encloses the various interior components of the cluster box unit 100 has several features that merit mention. Referring to FIGS. 73-75, the enclosure 110 has opposed side walls 901, a rear wall 902 and a top wall 903 that cooperate with a bottom assembly 905 to define a forwardly-opening compartment 906 into which most of the interior components of the cluster box unit 100 are inserted after the interior components are assembled. The side and rear walls 901, 902 are integrally formed, as by bending a sheet of metal (preferably aluminum or stainless steel) to provide right-angle corners that connect the rear wall 902 to tie side walls 901.

Figure 76:
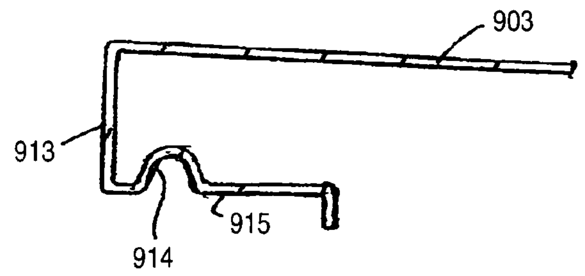
FIG. 76 is a cross-sectional view on an enlarged scale taken along line 76-76 of FIG. 73.

The top wall 903 is formed from a sheet of metal (preferably aluminum or stainless steel) that is bent to provide depending side and rear flanges 911, 912 (see FIGS. 73-75 and 78) that overlie upper portions of the side and rear walls 901, 902, respectively; and to provide a downwardly extending, reversely turned front portion 913 (see FIG. 76) having an upwardly concave formation 914 that functions in the manner of the concave recesses 192 of the cross-bars 136, 138, 146, 148, 185, 186 (see FIGS. 40-43) to prevent moisture from traveling rearwardly along downwardly facing surfaces, such as the downwardly facing surface 915 shown in FIG. 76.

Figure 77:
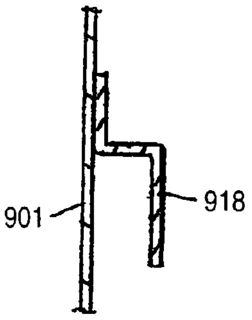
FIG. 77 is a cross-sectional view on an enlarged scale taken along line 77-77 of FIG. 73.
Figure 78:
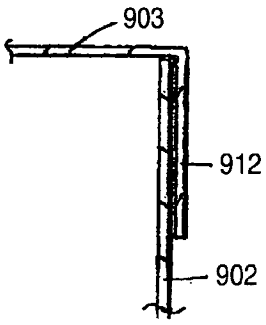
FIG. 78 is a cross-sectional view on an enlarged scale taken along line 78-78 of FIG. 73.

The side walls 901 are provided with vertically extending members 918 (see FIGS. 73, 75 and 77) that are configured to be engaged by edge portions 919 of the upstanding extrusions 152, 162 (see FIGS. 18 and 19) of the rectangular frame 160 (see FIG. 15) when the frame 160 (with the master loading doors 130, 140 installed thereon) is secured by threaded fasteners (not shown) to the enclosure 110 after other internal components of the cluster box unit 100 have been inserted into the interior of the enclosure 110. All fasteners used to fasten the interior components of the cluster box unit 100 in place within the enclosure 110 are accessible only when the master loading doors 130, 140 are unlocked and open—an arrangement that prevents unauthorized access by those who would utilize tools to remove fasteners that hold together components of the cluster box unit 100 if such fasteners were accessible from the exterior of the unit 100.

Figure 79:
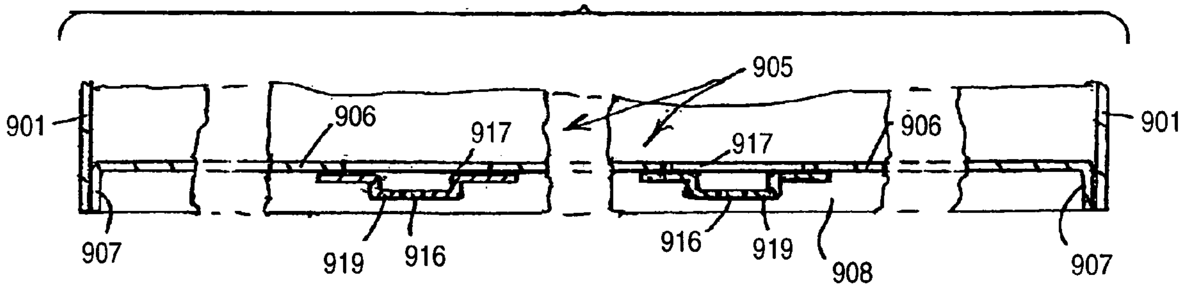
FIG. 79 is a cross-sectional view taken along line 79-79 of FIG. 73.

Referring to FIG. 79, the bottom assembly 905 includes a bottom wall member 906 having downwardly turned side and rear flanges 907, 908 that are fastened to the side and rear walls 901, 902, and a downwardly turned front flange 909 (see FIG. 75) that defines a forwardly facing surface at the bottom of the enclosure 110. Referring to FIGS. 73 and 79, a pair of floor reinforcing members 919 extend forwardly-rearwardly between the downwardly turned rear and front flanges 908, 909 to define mounting holes 916 (FIG. 79) that are accessible through bottom wall openings 917 (FIG. 73) when bolts (not shown) are to be installed that connect the enclosure 110 to the pedestal support 120 (FIG. 1).

Figure 25:
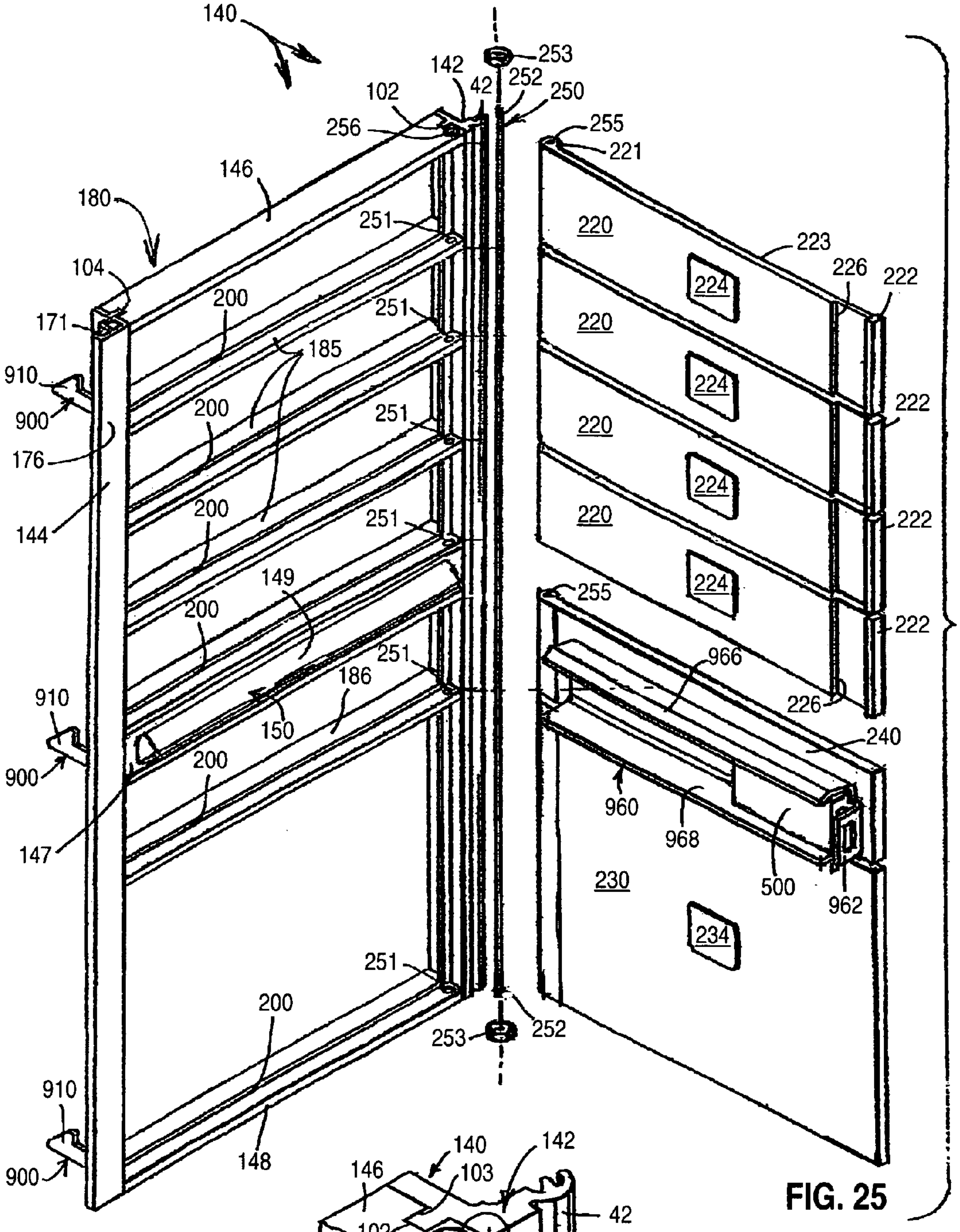
FIG. 25 is an exploded perspective view showing door-within-a-door elements of the right master loading door of the CBU of FIGS. 1-2 separated from a frame assembly of the right master loading door, and showing a hinge rod for pivotally coupling the door-within-a-door elements to the frame assembly.

Referring to FIGS. 40-43, the bars 136, 138, 146, 148, 185, 186 that are utilized in the frameworks of all of the master loading doors 130, 1130, 2130, 3130, 140, 1140, 2140, 3140 all have forwardly-facing surfaces 200. Referring to FIG. 25 (wherein the framework 180 of one of the master loading doors 130, 140, 1130, 1140, 2130, 2140, 3130, 3140 is depicted), the forwardly-facing surfaces 200 align with forwardly facing surfaces 202, 204 of the bar-like formations 102, 104 of the left and right uprights of the associated master loading door. The alignment of the surfaces 200, 202, 204 (i.e., the fact that the surfaces 200, 202, 204) extend in a common plane) provides a perimetrically extending backstop against which the doors 220, 230, 240 that individually serve the various delivered mail, delivered parcel and outgoing mail compartments (such as the compartments 131, 133, 141, 143, 145 depicted in FIG. 9) of the cluster box unit mail delivery receptacles 100, 1100, 2100, 3100.

Referring still to FIG. 25, to pivotally connect the doors 220, 230, 240 to the framework 180, an elongate hinge rod 250 is provided that extends through aligned holes 251 formed through right end regions of the various horizontally extending bars 146, 148, 185, 186, and through a right end region of the extrusion 147. The hinge rod 250 has threaded end regions 252 onto which lock nuts 253 may be threaded. The hinge rod 250 is held in place (after being inserted through the aligned holes 251 of the framework 180 and through hinge-rod-receiving passages 255 provided in right end regions of the doors 220, 230, 240) by installing the lock nuts 253 on the threaded end regions 252 and tightening the nuts 253 to draw the nuts into cylindrical recesses defined by the top and bottom bars 146, 148 of the framework 180, such as the cylindrical recess 256 provided in the top bar 146 as depicted in FIG. 26.

In practice, the doors 220, 230, 240 are formed as extrusions that have uniform cross-sections that extend from top to bottom of each of the doors 220, 230, 240. However, the fact that each of the doors 220, 230, 240 preferably is formed as an extrusion that, when extruded, features a uniform cross-section from top to bottom should not be misinterpreted to mean that the doors 220, 230, 240 all have the same cross-sections; or that the extrusion-formed uniform cross-sections of the doors 220, 230, 240 remain unmodified after the extrusions that forms the various doors 220, 230, 240 are cut into appropriate lengths that correspond to the top-to-bottom dimensions of the doors 220, 230, 240.

Stated in another way, blanks that are used to form the doors 220, 230, 240 may be cut from extrusions that all have the same cross-section, or from extrusions that feature a variety of different cross-sections. After door blanks are extrusion-formed and cut to appropriate lengths, the blanks may be stamped or machined or otherwise reconfigured so that, when in final form and ready for installation, they do not necessarily have cross-sections that are uniform along the top-to-bottom lengths of the doors 220, 230, 240, 1220, 1230, 1240, 2220, 2230, 2240, 3220, 3230, 3240 of the CBUs 100, 1100, 2100, 3100.

Referring to FIGS. 48-52 wherein one preferred form of delivered mail compartment door is indicated generally by the numeral 220, it will be seen that the door 220 has an enlarged, rounded right end region 221, an enlarged left end region 222, and a central reach 223 that is substantially flat and of substantially uniform thickness except 1) where a generally rectangular indentation 224 has been formed at a central location to provide a forwardly facing recess 225 that can receive a compartment identification label (not shown), and 2) at a location near the left end region 222 where a rearwardly-opening groove 226 has been provided to diminish the thickness of the door in the vicinity where the cam lock 920 is mounted in an opening (not shown) formed through the door 220. In FIGS. 48-52, only front portions of the cam lock 920 are depicted inasmuch as the nature of the conventional, commercially available cam lock 920 that ordinarily is mounted on the mail compartment doors 920 has been disclosed earlier herein.

Referring to FIGS. 33-38 and 58-60, an alternate form of door cross-section (that is thicker than the delivered mail compartment doors 220) is used to form the delivered parcel compartment doors 230. The doors 230 have a cross-section that is of uniform thickness except 1) where a generally rectangular indentation 234 (FIG. 58) has been formed at a central location to provide a forwardly facing recess 235 that can receive a compartment identification label (not shown), and 2) at a location near the right end region where a region 232 of diminished cross-section extends rightwardly, terminating in a relatively thin hook-like formation 233 that extends the full height of the right end region of the door 230. The hook-shaped formation 233 (FIG. 59) preferably is configured so that, from the front side of the doors 230, the doors 230 have an appearance that is almost completely identical to the appearances of the right end regions 221 of the delivered mail compartment doors 220.

On the back side of the door 230 (in the region 232 of diminished cross-section), a vertically extending sheet of metal 235 (best seen in FIGS. 35, 38 and 60) is mounted that extends nearly, but not completely, the full height of the right end region of the door 230. The sheet of metal 235 has a curved formation 236 (FIG. 60) that encircles the hinge rod 250 (FIG. 25) that pivotally mounts the doors 220, 230, 240 on the frameworks of the left and right master loading doors 130, 140 (and on the other master loading doors 1130, 1140, 2130, 2140, 3130, 3140). As is best seen in FIG. 60, a portion 237 of the curved formation 236 may be cut away to provide room for the torsion return spring 990 that biases the parcel doors 230 closed, and a portion 993 of the metal sheet 235 may be configured to receive a leg 991 of the return spring 990.

Referring to FIGS. 67-72, the same thick cross-section used to form the parcel doors 230 also is preferably used to form the outgoing mail compartment door 240—and a curved metal sheet 235 of the type employed on the doors 230 is used to define a hinge rod passage 255 for mounting the door 240 on the hinge rod 250.

As will be apparent from the foregoing description taken together with the accompanying drawings, the cluster box units 100, 1100, 2100, 3100 preferably incorporate a wide variety of improvement features that enhance security and attack resistance while utilizing components that can be assembled quickly and easily, and that can be serviced as needed in order to keep the units 100, 1100, 2100, 3100 functioning properly for service lives that last many years. Included among the many features disclosed herein are protective enclosure improvements, internal cabinetry improvements, door, hinge and locking system improvements, and a host of other features that are not found in present day cluster box units—features that are intended to provide units that function smoothly throughout lengthy service lives, that resist corrosion, offer good appearances, and that shield mail and parcels from inclement weather and from unauthorized access or attack.

The cluster box units 100, 1100, 2100, 3100 have outgoing mail compartment doors that are heavily constructed and rigidly reinforced, with the locks carried thereon protectively shielded, and with the extensible bolts of these locks being engaged by brackets that not only lock the outgoing mail compartment doors but also the master loading doors of the cluster box units.

Master loading doors are provided with hinges that extend the full height of the doors—hinges that are defined by pivotally interfitting elements of extrusions that very sturdily mount the master loading doors, that prevent prying or bending the doors in the vicinities of their hinges. The interfitting elements of the hinge extrusions also permit the doors to be installed on their surrounding door frames quickly and easily, and permit one or both of the master loading doors to be quickly and easily removed for service or replacement when necessary.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention. It is intended to protect whatever features of patentable novelty exist in the invention disclosed.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cluster box mail delivery unit comprising:

an enclosure comprising two sidewalls, a top wall, a bottom wall, a front face, and a back face;

at least two door assemblies on the front face of the enclosure, wherein each door assembly comprises a first inner edge and a first outer edge;

at least one compartment door within each door assembly configured to pivot relative to the door assembly; and at least one fastening member formed along the first inner edge of each door assembly for securing the at least two door assemblies in a closed position;

wherein each door assembly pivots relative to the enclosure along the first outer edge of each door assembly;

each fastening member further comprising an upright portion, an extending portion, and a hook portion;

each upright portion further comprising a second inner edge and a second outer edge;

each extending portion protruding outward from the respective second inner edge of the upright portion; and each hook portion extending from the respective extending portion and engaging with an opposing hook portion, forming a gap between at least one second inner edge of the upright portion and the engaged hook portions.

2. The cluster box mail delivery unit of claim 1, wherein one hook portion comprises at least one rearwardly turned hook portion and a second hook portion comprises at least one forwardly turned hook portion.

3. The cluster box mail delivery unit of claim 1, wherein the second outer edge of the upright portion comprises a bar portion for anchoring the fastening member into the door assembly.

4. The cluster box mail delivery unit of claim 1, wherein at least one of the extending portions comprises a box-shaped cross-section.

5. The cluster box unit of claim 1, wherein the hook portions are configured to rigidly interlock as the gap is widened between the at least one second inner edge of the upright portion.

6. A fastening apparatus for securing at least two door assemblies of a cluster box mail delivery unit comprising:

a first fastening member for securing to a first of the door assemblies, the first fastening member comprising a vertical upright portion, a vertical extending portion, and a vertical first hook portion;

a second fastening member for securing to an opposing second of the door assemblies, the second fastening member comprising a vertical upright portion, a vertical extending portion, and an opposing vertical second hook portion, wherein the upright portion of each fastening member comprises an inner edge and an outer edge, the outer edge for securing to the respective door assembly;

wherein the extending portion of each fastening member protrudes outward from the inner edge of the respective upright portion; and wherein the hook portion of each fastening member protrudes outward from the respective extending portion such that the first hook portion of the first fastening member engages with and interlocks with the opposing second hook portion of the second fastening member, forming a gap between the inner edge of the upright portion of the first fastening member and the engaged hook portions.

7. The fastening apparatus of claim 6, wherein the first hook portion comprises at least one forwardly turned hook portion and the opposing second hook portion comprises at least one rearwardly turned hook portion.

8. The fastening apparatus of claim 6, wherein the outer edge of the upright portion of at least one of the fastening members comprises a bar portion for anchoring the at least one fastening member into the respective door assembly.

9. The fastening device of claim 6, wherein the first hook portion is configured to rigidly interlock with the opposing second hook portion as the gap is widened between the inner edge of the upright portion of the first fastening member and the engaged hook portions.

* * * * *